United States Patent [19]
Seto et al.

[11] Patent Number: 5,828,396
[45] Date of Patent: Oct. 27, 1998

[54] INFORMATION RECORDING APPARATUS FOR RECORDING IMAGES USING PLURAL INFORMATION SIGNALS CORRESPONDING TO RESPECTIVE PLURAL COLORS

[75] Inventors: Kaoru Seto, Chigasaki; Atsushi Kashihara, Hachioji; Manabu Takebayashi, Yokohama, all of Japan

[73] Assignee: Canon Kabushiki Kaisha, Tokyo, Japan

[21] Appl. No.: 83,497

[22] Filed: Jun. 29, 1993

[30] Foreign Application Priority Data

Jun. 30, 1992  [JP]  Japan .................................. 4-173442

[51] Int. Cl.⁶ .......................... B41J 2/385; B41J 2/205; G01D 15/06; H04N 1/21
[52] U.S. Cl. ............................. 347/111; 347/15; 358/298
[58] Field of Search .................................. 347/3, 10, 68, 347/43, 15, 111; 358/298

[56] References Cited

U.S. PATENT DOCUMENTS

| 4,437,122 | 3/1984 | Walsh et al. ............................. 358/445 |
| 4,604,654 | 8/1986 | Sakurada et al. ......................... 347/15 |
| 4,700,201 | 10/1987 | Sato ........................................ 347/247 |
| 4,847,641 | 7/1989 | Tung ....................................... 347/131 |

FOREIGN PATENT DOCUMENTS

| 0277036 | 8/1988 | European Pat. Off. . |
| 0359463 | 3/1990 | European Pat. Off. . |
| 0474985 | 3/1992 | European Pat. Off. . |
| 0488534 | 6/1992 | European Pat. Off. . |
| 0569657 | 11/1993 | European Pat. Off. . |
| 5050935 | 7/1975 | Japan . |

*Primary Examiner*—N. Le
*Assistant Examiner*—Raquel Yvette Gordon
*Attorney, Agent, or Firm*—Fitzpatrick, Cella, Harper & Scinto

[57] ABSTRACT

An information recording apparatus for recording a color image with improved resolving power and image quality is disclosed. Color image data are temporarily stored in a memory and compared with predetermined patterns in a wide reference area. If they coincide, indicating the presence of a contour of a pattern, an object pixel is modified to finer dots, in order to smooth the contour. There are also provided patterns indicating the features of dither images, in order to identify whether the color image data correspond to such dither image, and to avoid erroneous smoothing process that deteriorates the image quality of such dither image.

14 Claims, 72 Drawing Sheets

FIG. 10
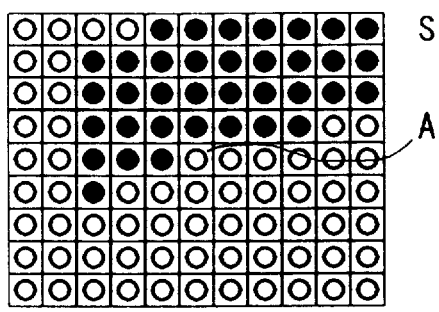
FIG. 15
SHIFT
REFERENCE
SMALL WINDOW
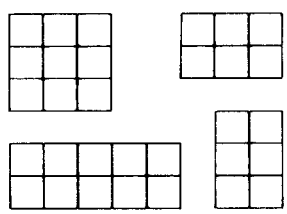  — EXAMINING DOTS WITHIN LEFT-MENTIONED AREAS
IF ALL DOTS ARE THE SAME : $X_n=0$ OR $Y_n=0$
IF EVEN ONE DOT IS DIFFERENT: $X_n=1$ OR $Y_n=1$

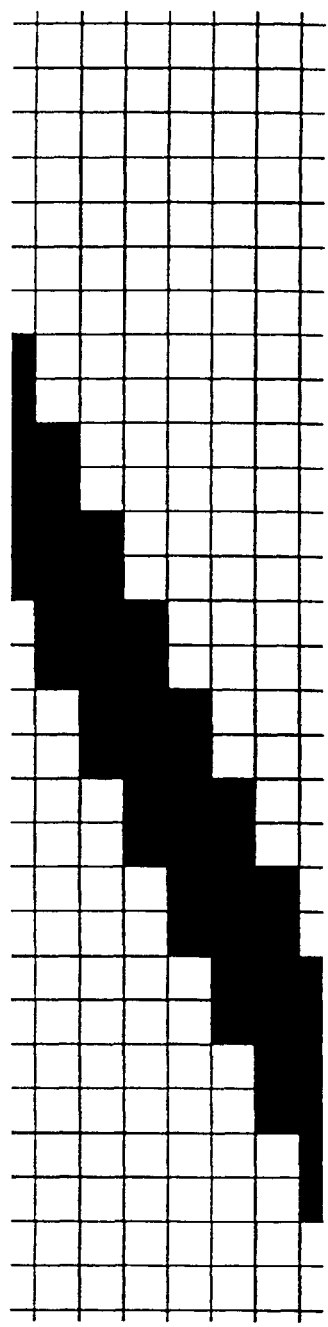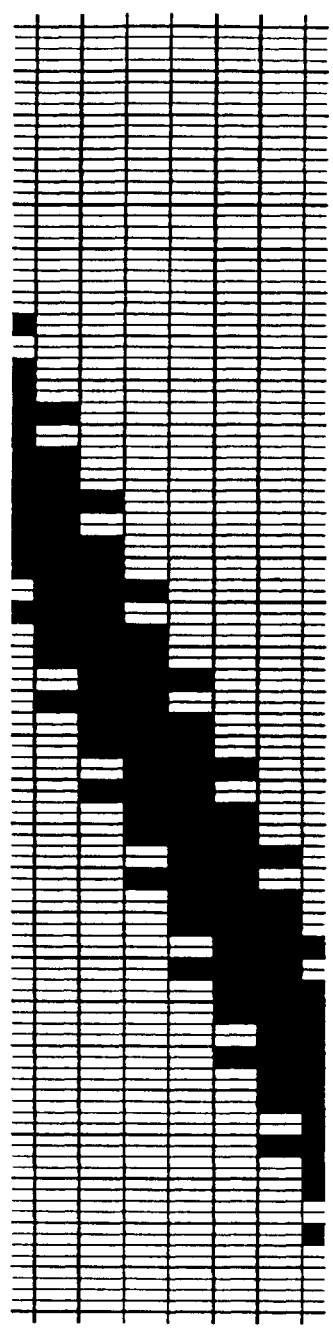
FIG. 25A    FIG. 25B

- X5 = X2 = 0
- AT LEAST ONE OF Y1 ~ Y8, X3, X4 IS "0"

THEN

- X1=0
- AT LEAST ONE OF Y1 ~ Y8, X7, X3, X4 IS "0"

THEN

FIG. 30A
FIG. 30B
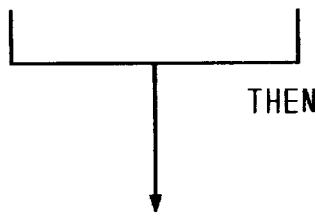
- X8 = X3 = 0
- AT LEAST ONE OF Y1 ~ Y8, X1, X2 IS "0"
THEN
FIG. 30C
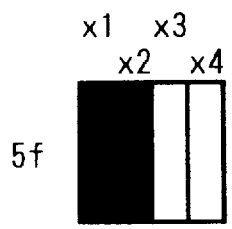

FIG. 31A
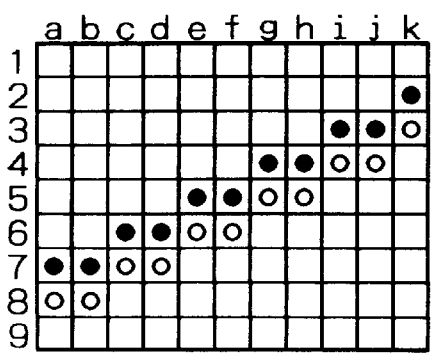
FIG. 31B
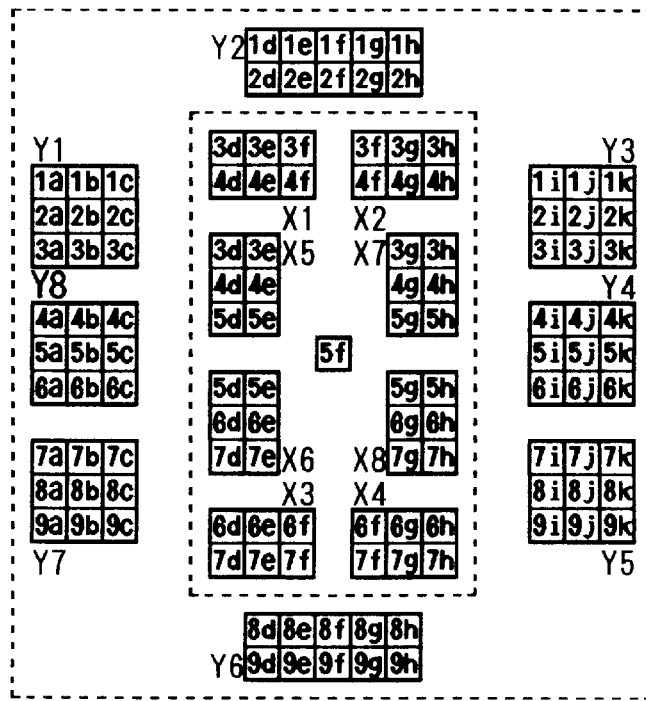
- X4 = X8 = 0
- AT LEAST ONE OF Y1 ~ Y8, X1, X2, X6 IS "0"
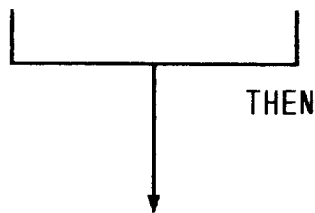
THEN
FIG. 31C
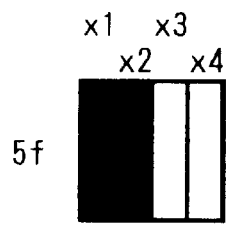

FIG. 36A
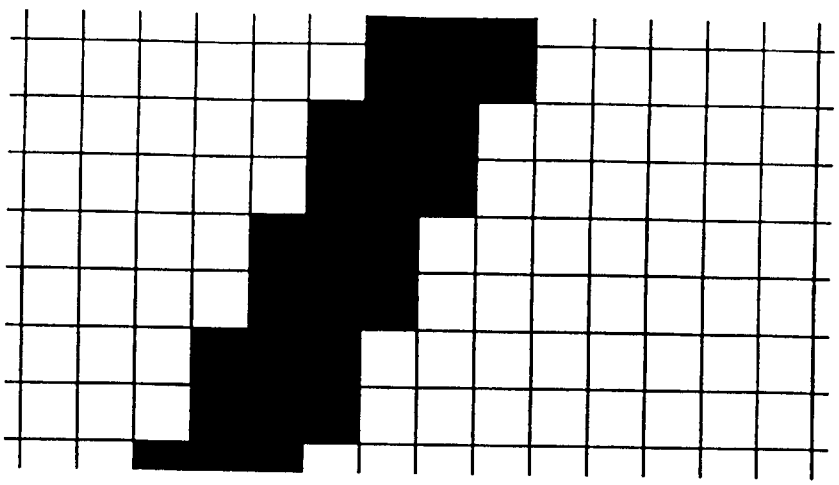
FIG. 36B
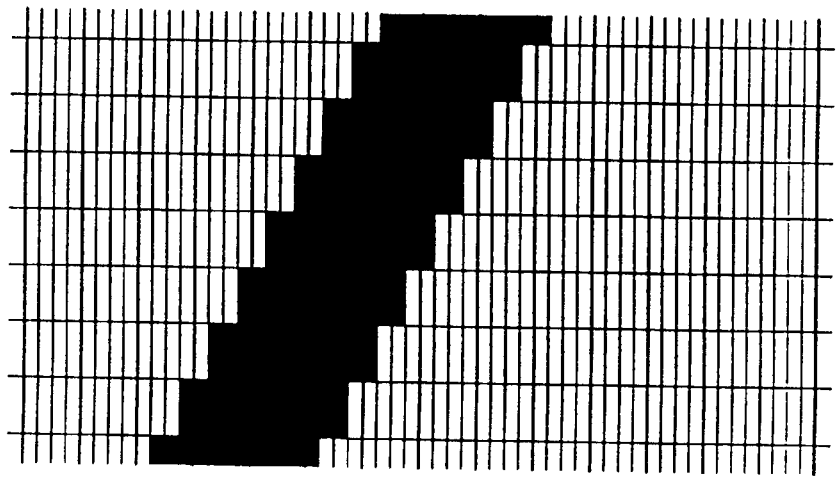

FIG. 38A
FIG. 38B
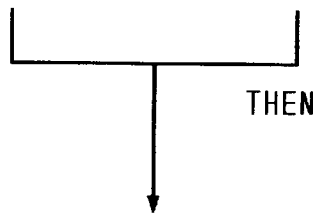
- X1 = X6 = 0
- AT LEAST ONE OF Y1 ~ Y8, X4, X7 IS "0"
THEN
FIG. 38C
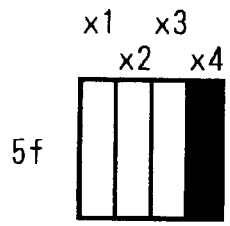

FIG. 39A
FIG. 39B
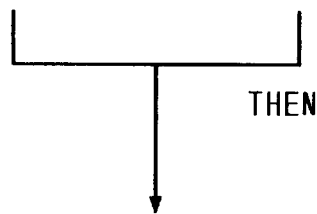
- X5=0
- AT LEAST ONE OF Y1 ~ Y8, X3, X8, X7 IS "0"
THEN
FIG. 39C
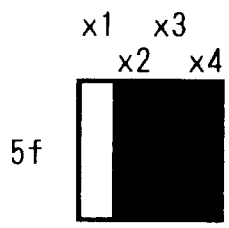

FIG. 40A
FIG. 40B
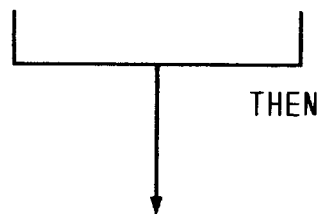
- X4 = X7 = 0
- AT LEAST ONE OF Y1 ~ Y8, X1, X6 IS "0"
THEN
FIG. 40C
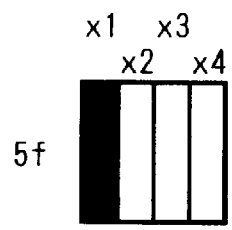

- X4 = X8 = 0
- AT LEAST ONE OF Y1 ~ Y8, X1, X6 IS "0"

THEN

DOT CONCENTRATION TYPE

DOT DIFFUSION TYPE

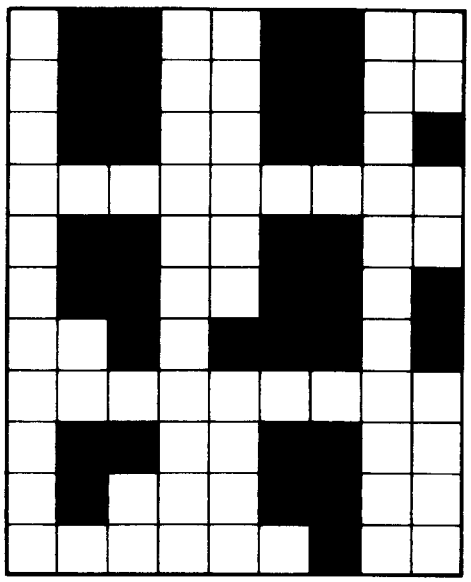
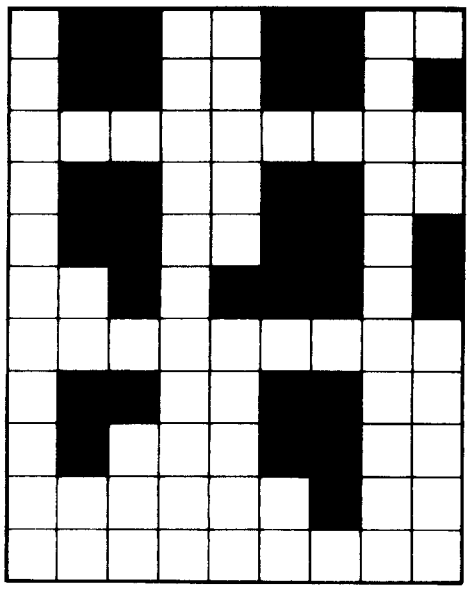
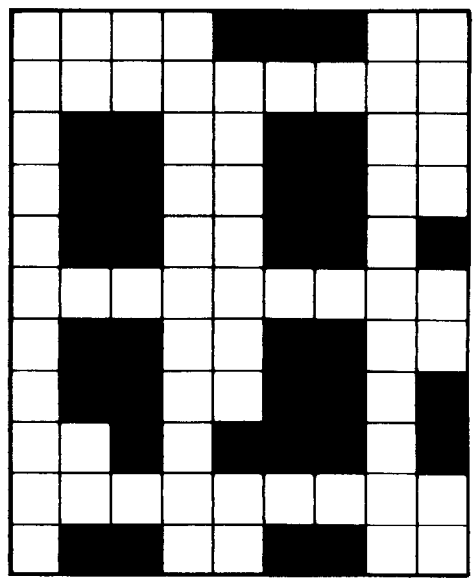
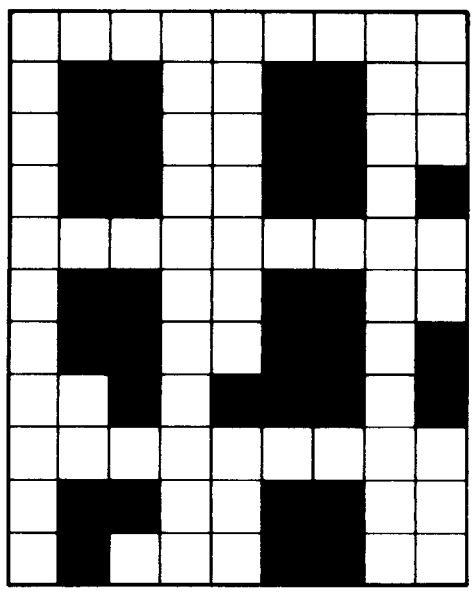

FIG. 60A
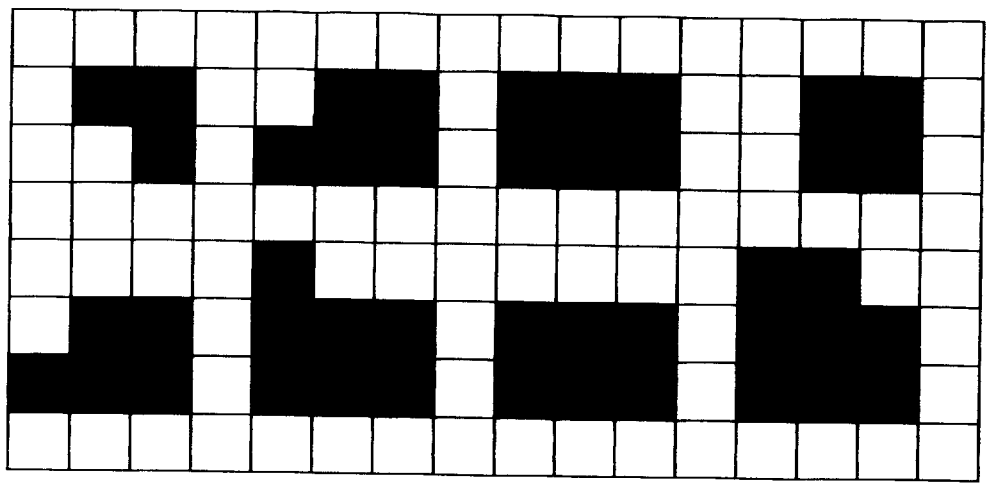
FIG. 60B
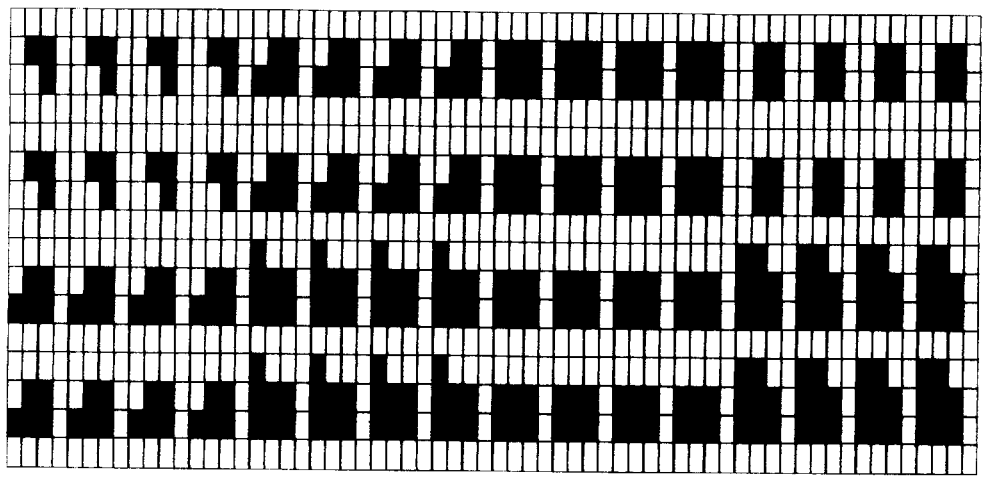

FIG. 61A
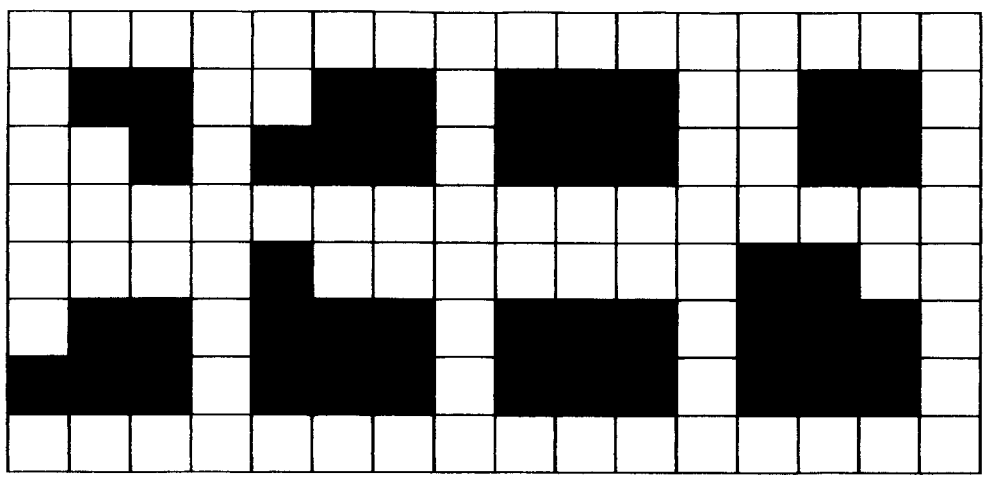
FIG. 61B
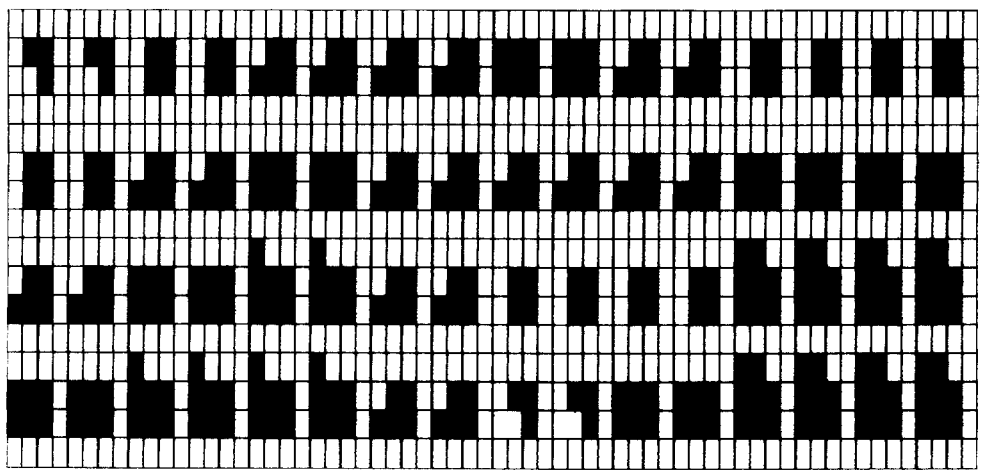

300dpi → 600dpi

FIG. 75
SYSTEMATIC DITHER 8×8
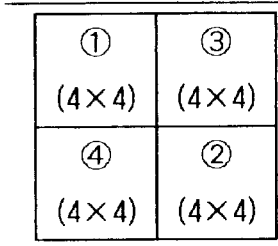
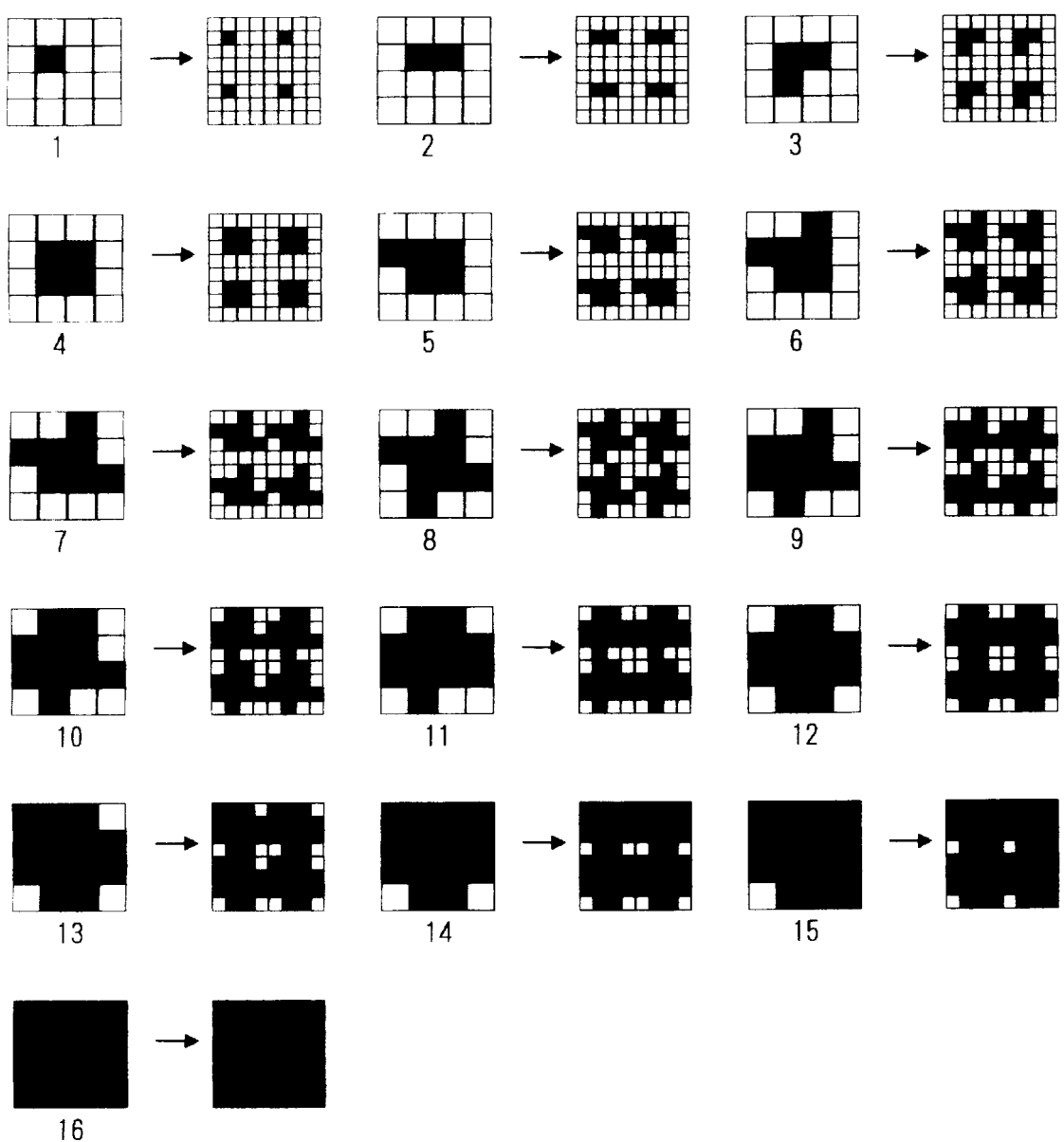

FIG. 77

|   | A | B | C | D | E | F | G | H | I | J | K |
|---|---|---|---|---|---|---|---|---|---|---|---|
| 1 | × | × | × | × | × | × | × | × | × | × | × |
| 2 | × | × | × | × | × | ○ | ○ | ○ | ○ | × | × |
| 3 | × | × | × | × | × | ○ | ● | ○ | ○ | × | × |
| 4 | × | × | × | × | × | ○ | ○ | ○ | ○ | × | × |
| 5 | × | × | × | × | × | ○ | ○ | ○ | ○ | × | × |
| 6 | × | × | × | × | × | × | × | × | × | × | × |
| 7 | × | × | × | × | × | × | × | × | × | × | × |
| 8 | × | × | × | × | × | × | × | × | × | × | × |
| 9 | × | × | × | × | × | × | × | × | × | × | × |

● : BLACK DOT
○ : WHITE DOT
× : DON'T CARE

FIG. 79

| 14 | 10 | 6  | 15 |
|----|----|----|----|
| 5  | 1  | 2  | 11 |
| 9  | 4  | 3  | 7  |
| 13 | 8  | 12 | 16 |

THRESHOLD VALUE MATRIX

INFORMATION RECORDING APPARATUS FOR RECORDING IMAGES USING PLURAL INFORMATION SIGNALS CORRESPONDING TO RESPECTIVE PLURAL COLORS

BACKGROUND OF THE INVENTION

1. Field of the Invention

The present invention relates to an information recording apparatus, and more particularly an information recording apparatus of electrophotographic process such as a laser beam printer, or of ink jet process.

2. Related Background Art

A color laser beam printer utilizing electrophotographic process is recently utilized in the output device of a computer, the output unit of a facsimile apparatus, or in so-called digital color copying machine for printing image data read by a color image scanner.

In such color image forming apparatus there may be employed a process of repeating, plural times, a sequence of transferring an image, formed by charging, exposure and development on an image bearing member, onto a recording sheet, thereby forming a superposed image of plural colors on the recording sheet, thus obtaining a color image.

Such color image forming apparatus have been commercialized in a configuration disclosed, for example, in the DSA 2607727 or in the Japanese Patent Application Laid-open No. 50-50935.

The color laser beam printer employed in such apparatus achieves color printing by superposing four image planes, corresponding to the color toners of Y (yellow), M (magenta), C (cyan) and K (black), with printing dot arrangement of a resolving power for example of 300 dot/inch. The concept of said image planes is shown in FIG. 5.

As illustrated in FIGS. 5 and 6, the characters and patterns are formed on a grating pattern of 300 dot/inch, provided on each image plane of Y, M, C or K. Stated differently, said characters or patterns are composed of printed color dots (represented by solid circles "●") and unprinted dots (represented by white circles "○") positioned on the grid points of 300 dot/inch. Such characters or patterns are printed in each color, and a color image is obtained by superposing these four image planes of Y, M, C and K.

FIG. 6 shows a dot pattern of a character "a" as an example of one of the image planes shown in FIG. 5.

Also a halftone color image utilizing the dither method or the like can be obtained by recording a halftone image, on each of the color image planes of Y, M, C and K, by the area of color dot groups positioned on the grid points of 300 dot/inch as shown in FIG. 42, and superposing these four image planes.

For reproducing a halftone image with binarized data, there are already known the dither method, the density pattern method and the error diffusion method as representative ones.

Among these methods, the dither method and the density pattern method are to represent a multi-value image with binary data, employing a threshold value matrix.

In the dither method, a pixel of a multi-value image is made to correspond to a threshold value in an m×m threshold matrix as shown in FIG. 78A. In the density pattern method, a pixel of a multi-value image is made to correspond to an m×m threshold matrix as shown in FIG. 78C.

Also as an intermediate between said dither method and said density pattern method, there is known a method, as shown in FIG. 78B, for rendering a pixel of a multi-value image to correspond to an l×l sub-matrix in an m×m matrix (hereinafter called density dither method).

In these three methods for representing a multi-value image with binary data, if a same threshold matrix is employed, the microscopic arrangement of dots is alike among these methods, though the image quality is different from method to method. In the following description there will be explained the reproduction of a multi-value image with the binary data employing the dither method, but the situation is similar in the density pattern method or in the density dither method.

A multi-value color image is represented by luminance values of three elementary colors of light (red, green and blue) or by density values of three elementary colors (yellow, magenta and cyan). As in the case of representing a multi-value image by binary data with the dither method, a multi-value color image can be represented with 8-value data by binarizing each elementary color by the dither method.

These methods employ binarizing each of the image planes corresponding to the toner colors (Y, M, C, K) by the above-mentioned methods of halftone representation and superposing four image planes. In such halftone representation with binary data, the gradation can be represented either by concentrated dots where the dots are generated as a cluster which grows larger with an increase in the density, or by scattered dots where the dots are so generated as to have a spatial frequency as high as possible.

An example of the concentrated dots is shown in FIG. 43A, while an example of the scattered dots is shown in FIG. 43B.

At the resolving power of 300 dot/inch, the dot pitch becomes 85 microns. The human vision is generally considered to resolve down to about 20 microns. In comparison, the contour of characters or patterns formed by the dots of the above-mentioned resolving power (85 microns) appears in staggered manner, so that such characters or patterns cannot be considered of a sufficiently high image quality.

For achieving high image quality in the characters and patterns, there have been employed following methods.

A first approach is to simply improve the resolving power (for example to 1200 dot/inch) for each color. However, this method requires a bit map memory of 4×4=16 times for a same image area, so that the apparatus becomes extremely expensive.

A second approach, conceived in the monochromatic laser beam printer, is to equally improve the resolving power in the main and sub scanning directions, by modulating the print data of the object pixel by referring to the data of the surrounding dots, and this approach is achievable by the addition of a limited buffer memory, without increasing the capacity of the bit map memory. Related to this technology there are known U.S. Pat. Nos. 4,437,122, 4,700,201 and 4,847,641.

The technology disclosed in the U.S. Pat. Nos. 4,437,122 and 4,700,201 is to correct the object pixel to be printed, by referring to said object pixel and all the eight surrounding pixels around the object pixel. Since the reference area is narrow, this technology allows to recognize that the object pixel is a part of a curved line but is unable to recognize the radius of curvature of said line. Particularly it cannot recognize a nearly horizontal or vertical contour, and is unable to effect optimum correction according to the radius of curvature. For this reason sufficient smoothing effect cannot be attained.

On the other hand, the technology disclosed in the U.S. Pat. No. 4,847,641 is to refer to a wider reference area around the object pixel, in comparison with the above-mentioned technologies, and is capable of recognizing the radius of curvature of the curve to which the object pixel belongs.

In this technology, however, although the reference area is certainly wider, each matching pattern used in each reference is limited to a part of said reference area. For this reason, said technology is associated with the following drawbacks.

Firstly, it cannot recognize whether the object pixel is a part of a binary halftone image, obtained for example by the dither method or the error diffusion method. For this reason, this method can effect smoothing for a character image, but may erroneously smooth a part of the dots constituting a halftone pixel in the dither method or the error diffusion method. As an example, FIG. 12A shows a part of a 4×4 dither image. In the processing of an object pixel 5f, the reference to a limited surrounding area causes erroneous recognition that said object pixel is a part of a character or a pattern, thereby varying said object pixel 5f from a white pixel to a pixel with density. Thus there is generated a local variation of image density in the halftone image, and there may be induced deterioration of image quality such as the generation of pseudo contours.

Secondly, it cannot recognize whether the object pixel belongs to a part of a concentrated image. As an example, let us consider an image shown in FIG. 12B, consisting of a concentrated group of one-dot lines. In this case, for smoothing each line, the variation of dot density is required in the pixels marked with Δ or X in FIG. 12C. Thus each varied pixel becomes adjacent or close to another pixel which is varied by an adjacent pixel, and, for this reason, the resolving power of the image becomes lower.

Such situation of concentrated pixels in complicated manner appears not only in concentrated line patterns but also in characters of small sizes. In such case, an object pixel varied for smoothing becomes positioned close to another pixel varied for an adjacent image, so that said object pixel cannot be clearly separated from the adjacent pixel. As a result, the resolving power of the image is extremely lowered in such portion, thus providing a blurred image or generating moire fringes, thereby resulting in a loss of image quality.

Furthermore, if a halftone representation is made within a pixel for smoothing in such concentrated image portion, the density reproduction becomes unstable due to the interaction with the nearby pixels, and the smoothing effect tends to be affected by the ambient conditions such as temperature and humidity. For this reason the shape of a character may become different at each printing. Such drawbacks can naturally be resolved by employing a sufficiently wide reference area in each matching pattern, but such solution will sacrifice the effect of the simpler processing circuit intended by said technology.

For resolving the drawbacks in such conventional technologies, the present applicant already filed the U.S. patent application. Ser. No. 838,871.

The technology disclosed in said patent application consists of extracting the feature of the dot pattern in the entire surrounding area around the object pixel, also matching the dot pattern of a boundary portion of a pattern to which the object pixel belongs with plural predetermined matching patterns obtained by the combination of predetermined features and dot patterns of the boundary area, and varying the object pixel in case of coincidence of the patterns, thereby enabling to refer to a wide reference area with a simple logic circuit.

It is therefore rendered possible to detect a nearly horizontal or vertical contour, and to effect optimum smoothing according to the radius of curvature of the contour of the character or pattern. It is furthermore possible to add a function of identifying a concentrated area of binary halftone images or patterns such as dither images and inhibiting the smoothing process on such images or patterns, thereby preventing the deterioration of such halftone image. Furthermore, the pixel variation for smoothing is executed only when a predetermined white area is present around the object pixel, thereby reducing the influence of the ambient conditions on the smoothing effect. The above-explained technology is excellent in these regards.

As explained in the foregoing, various methods have been proposed for detecting the feature of the boundary of the character or pattern to which the object pixel belongs and modifying said object pixel according to the detected feature of said boundary.

However, in case the input image is a color image, there has not been paid much attention for improving the image quality of the characters or dither image in such color input image.

SUMMARY OF THE INVENTION

The present invention is to resolve the above-explained drawbacks in the conventional technologies, and an object thereof is to provide an information recording apparatus capable of providing a color character image or a color halftone image of high image quality.

Another object of the present invention is to provide an information recording apparatus capable of providing a color image of high quality with a simple configuration, by realizing image quality improvement for a color character image and that for a color halftone image by a common circuit.

Still another object of the present invention is to provide an information recording apparatus capable of improving image quality not only of a character image but also of a color halftone image, by smoothly printing the contour of a character or a pattern and also by recognizing a binary halftone image such as a dither image and converting such image into another pattern composed of finer dots.

Still another object of the present invention is to provide an information recording apparatus capable of extracting dither image information from color image information signal and converting said information into an image of a higher resolving power in each color, thereby printing a color dither image with high image quality.

The foregoing and still other objects of the present invention, and the features thereof, will become fully apparent from the following description, which is to be taken in conjunction with the attached drawings.

BRIEF DESCRIPTION OF THE DRAWINGS

FIG. 8 is a view of a matrix memory;

FIGS. 9 and 10 are views showing the storage of image data from the dot pattern shown in FIG. 6 to the matrix memory;

FIGS. 14A, 14B and 15 are views for explaining an algorithm for extracting the feature of data, to be employed in the present embodiment;

FIGS. 25A and 25B are views showing the smoothing effect of the present embodiment for a horizontal line with an angle not exceeding 45°;

FIGS. 28A to 31C are views showing examples of the feature extracting algorithm in the present embodiment;

FIGS. 36 and 36B are views showing the smoothing effect of the present embodiment for a vertical line with an angle exceeding 45°;

FIGS. 38A to 41C are views showing examples of the feature extracting algorithm of the present embodiment;

Figures 48A, 48B, 48C, 48D:
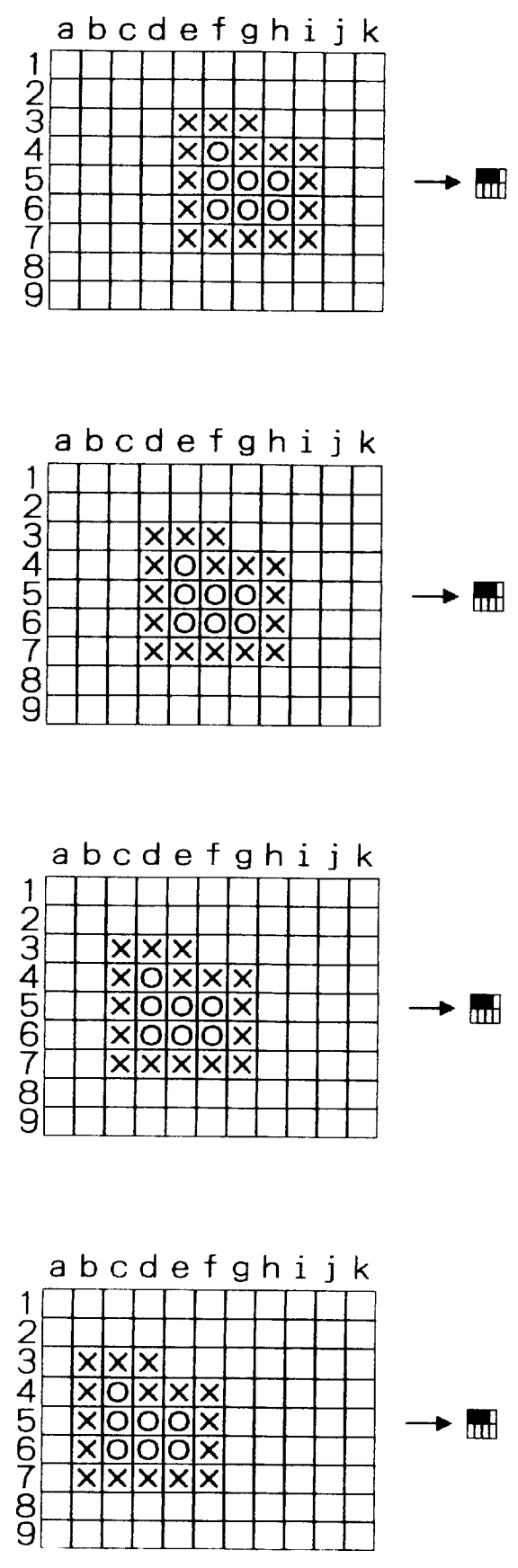
Figures 49A, 49B, 49C, 49D:
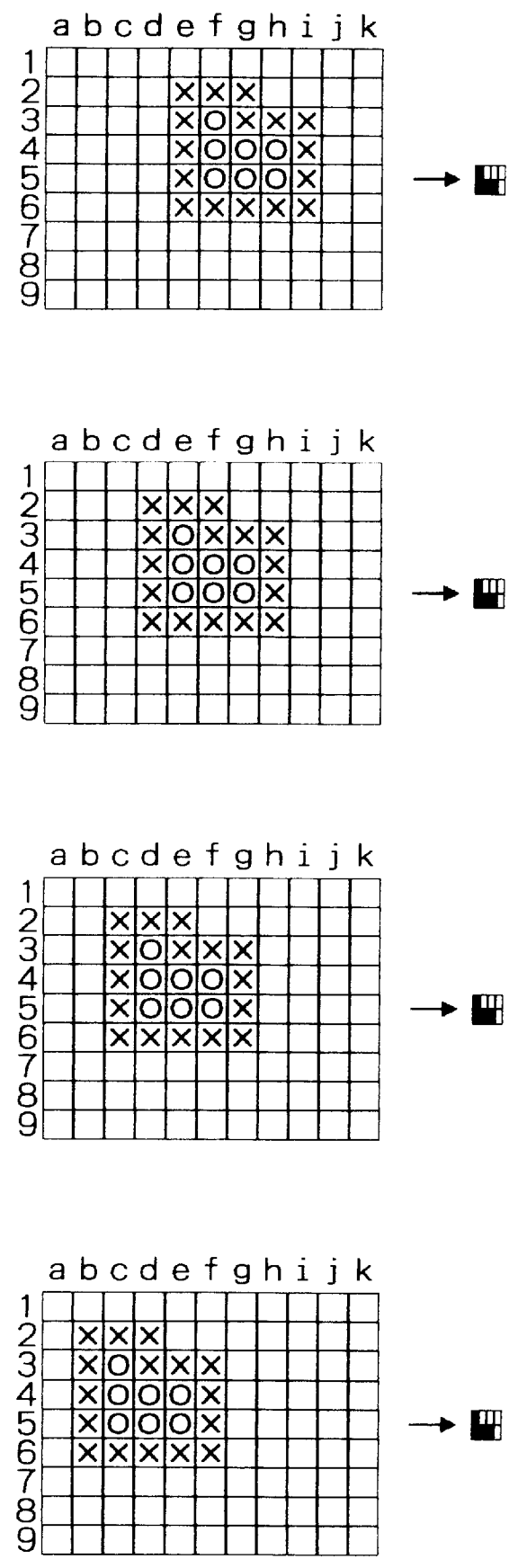

FIGS. 47A to 50D are views showing examples of the reference pattern for conversion of the binary halftone patterns in the present embodiment;

FIGS. 56A to 59D are views showing examples of dot data of the reference window area extracted from the dot data group of a binary halftone image in the present embodiment;

FIGS. 60A to 66(8) are views showing examples of conversion of the binary halftone pattern in the present embodiment;

FIGS. 75 to 77 are views showing the dither smoothing algorithm in the 4th embodiment;

FIG. 79 is a view showing an example of the threshold matrix in the 4th embodiment;

DETAILED DESCRIPTION OF THE PREFERRED EMBODIMENTS

In the following there will be detailed explanation on an embodiment of the present invention, with reference to the attached drawings.

[1st embodiment]

Figure 1:
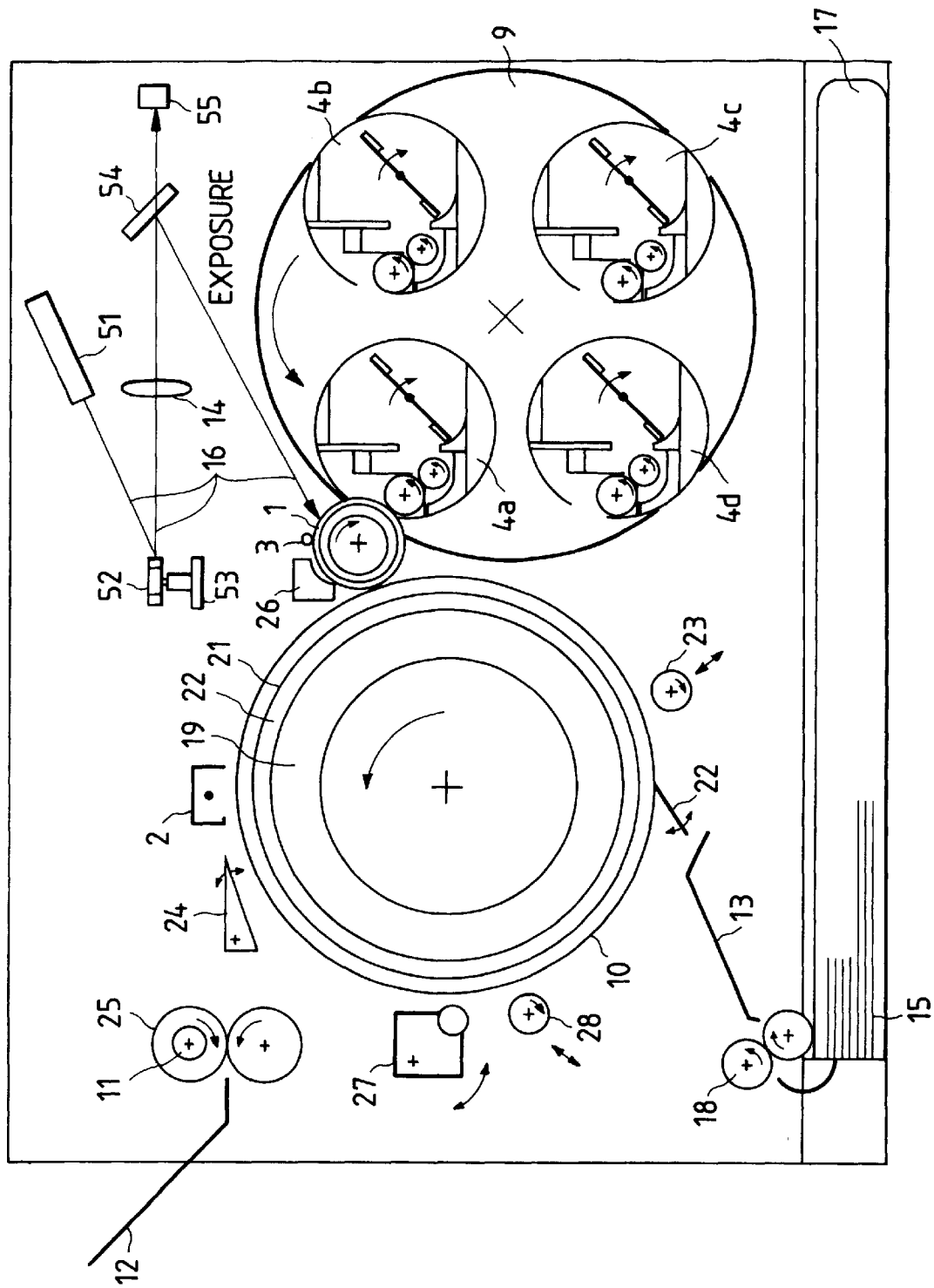
FIG. 1 is a view of an engine unit for a laser beam printer, constituting an embodiment of the present invention.
Figure 2:
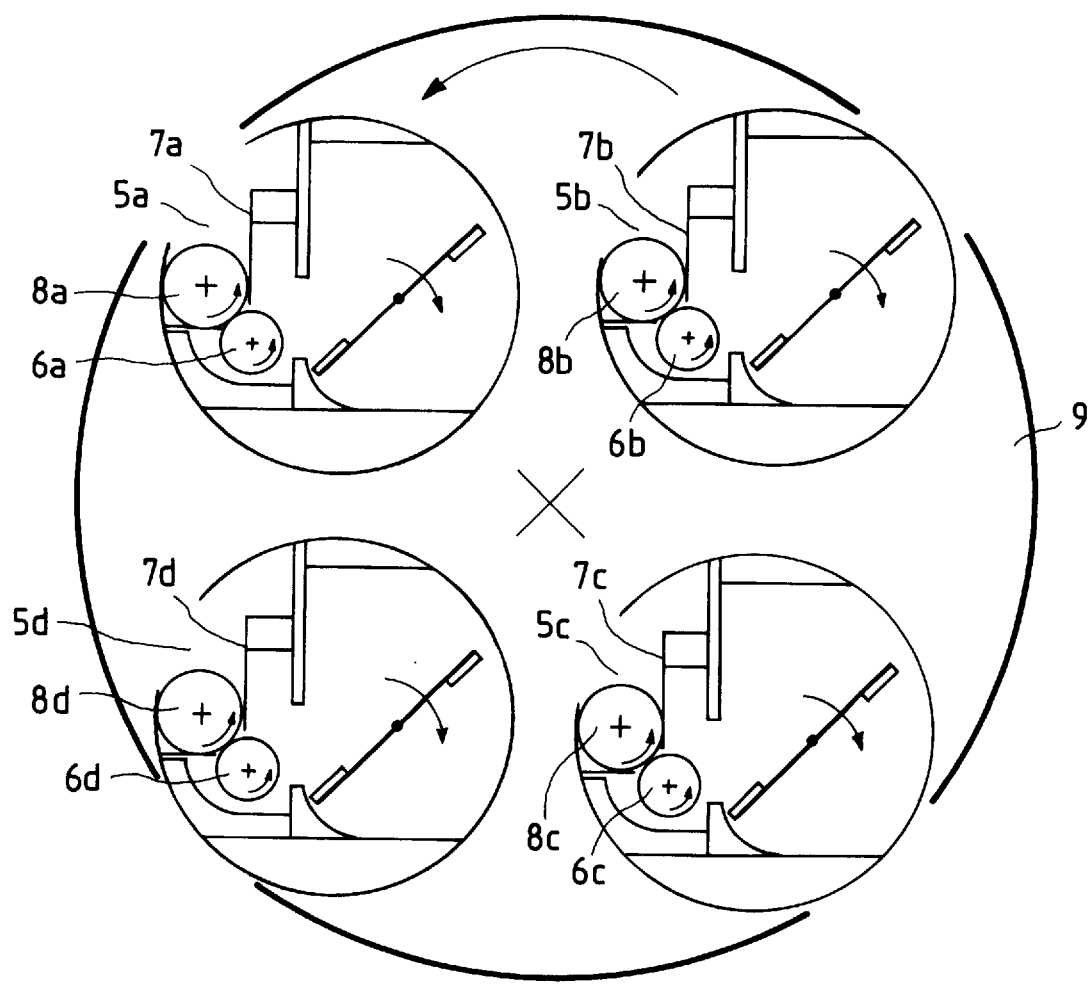
FIG. 2 is a detailed view of a rotary support member and developing cartridges in the engine unit shown in FIG. 1.
Figure 3:
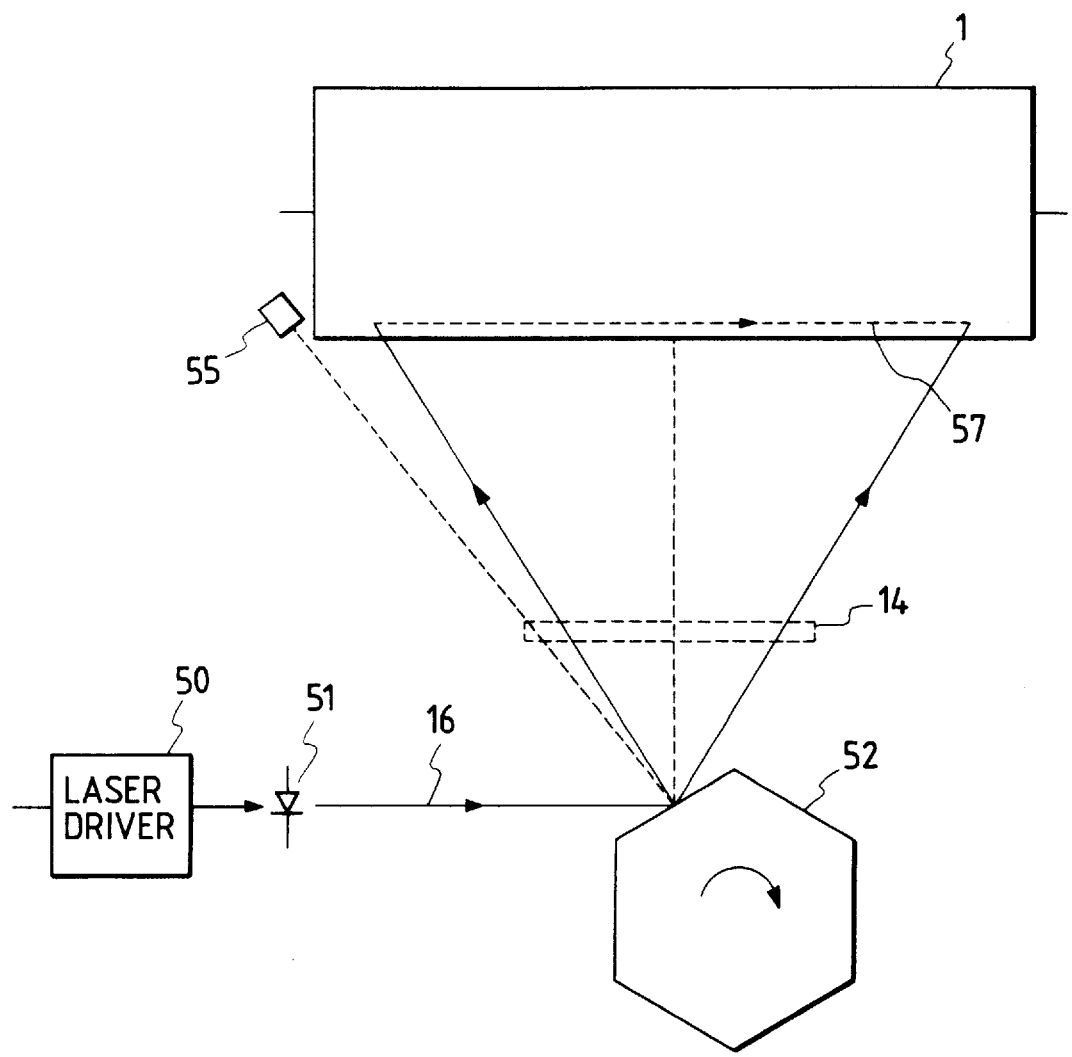
FIG. 3 is a view showing the configuration of an optical system in the engine unit shown in FIG. 1.

FIGS. 1 to 3 are cross-sectional views of an engine unit of a color laser beam printer, constituting an embodiment of the present invention.

There are shown sheets 15 constituting recording media; a sheet cassette 17 containing said sheets 15; and a pick-up roller 18 for separating the uppermost one of the sheets 15 stacked on the cassette 17 and feeding the front end of thus separated sheet through a transport path 13 to a gripper 12. Said roller 18 is intermittently rotated at each sheet feeding.

The sheet thus fed is supported by the gripper 12 at the front end, and is sucked to a transfer roller 10, which is composed of a metal cylinder 19 of a diameter of 156 mm, an elastic layer 20 of a thickness of 2 mm wound thereon, and a PVDF layer of a thickness of 100 μm provided thereon, and is rotated in a direction indicated by an arrow, with a speed substantially same as that of a photosensitive drum 1.

In the apparatus there are further provided a photosensitive drum 1, a charging roller 3, and four developing cartridges 4a, 4b, 4c, 4d which are detachable for replacement by the user when the toner contained therein is exhausted and which are supported by a rotatable support member in the vicinity of the photosensitive drum in such a manner that developing apertures 5a, 5b, 5c, 5d are positioned on a same circle about the rotary shaft of said support member. Each of said cartridges 4a, 4b, 4c, 4d is provided with toner, a container therefor and developing means in an integral structure and is rendered replaceable by the user when the toner contained therein is used up.

The charging roller 3 is given a DC voltage of −700 V superposed with an AC voltage of −1500 Vpp of a frequency of 700 Hz, whereby said roller 3 is uniformly charged to about −700 V.

The developing cartridges 4a, 4b, 4c, 4d respectively contain toner of Y (yellow), M (magenta), C (cyan) and K (black) color, and are provided with coating rollers 6a, 6b, 6c, 6d, toner limiting members 7a, 7b, 7c, 7d and developing rollers 8a, 8b, 8c, 8d. With the rotation of the developing roller, toner is applied thereon by the coating roller, and a required triboelectric charge is given to the toner by the toner limiting member.

Said limiting member is preferably made of a material which is charged to a polarity opposite to that of the toner, and is composed for example of nylon for negatively charged toner, or silicone rubber for positively charged toner. The developing rollers are rotated with a peripheral speed preferably selected within a range from 1.0 to 2.0 times of that of the photosensitive drum 1.

The developing cartridges 4a, 4b, 4c, 4d mounted on the support member 9 are so driven that the developing apertures 5a, 5b, 5c, 5d are always positioned toward the photosensitive drum. Such driving can be attained by a method disclosed for example in the Japanese Patent Application Laid-open No. 50-93437.

The photosensitive drum 1 is driven, by unrepresented driving means, with a peripheral speed of 100 mm/sec, in a direction indicated by an arrow in FIG. 1. Said photosensitive drum 1 is composed of an aluminum cylinder of a diameter of 40 mm, coated thereon with a photoconductive layer of an organic photoconductor (OPC), but there may be employed other photoconductors such as a-Si, CdS or Se.

There are also shown a laser driver 50, a semiconductor laser 51, and a rotary polygon mirror 52 driven by a motor 53.

Figure 44:
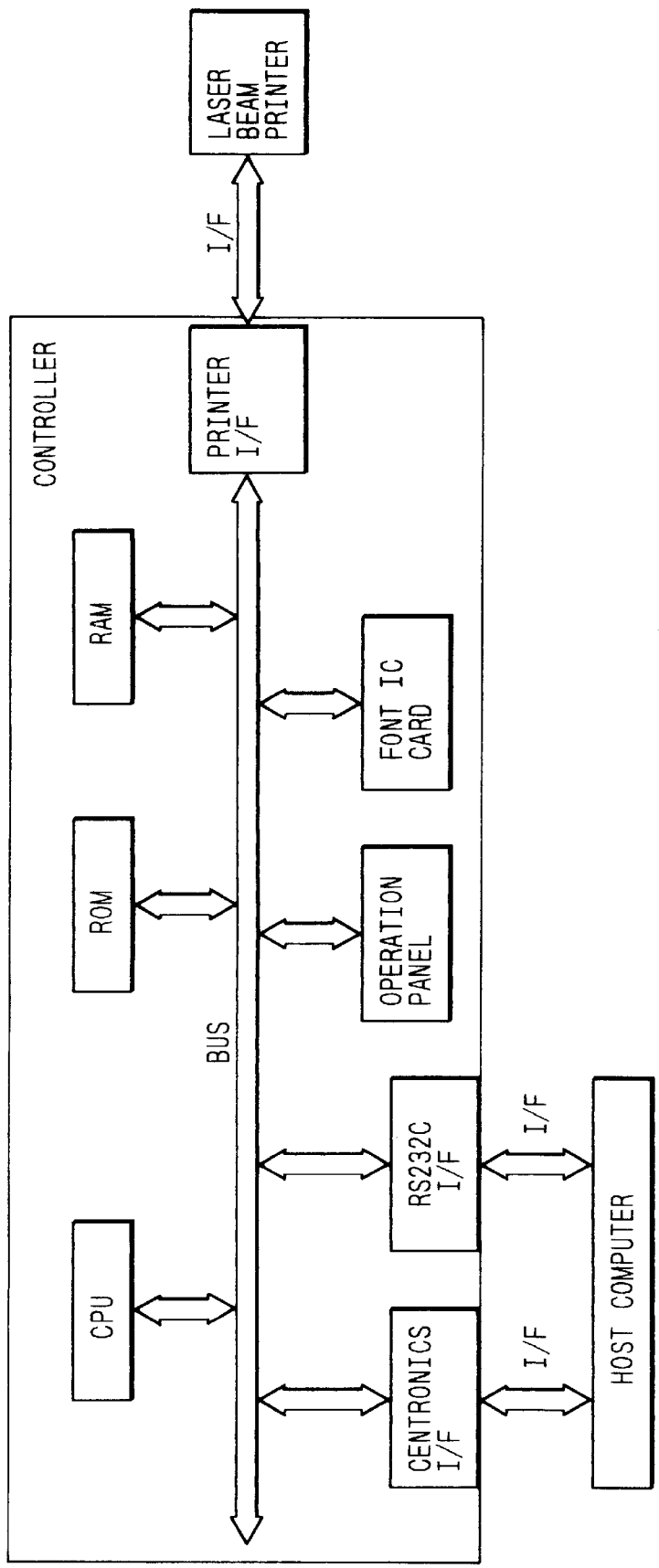
FIG. 44 is a block diagram showing the details of the controller in the present embodiment.

FIG. 44 shows the configuration of the present embodiment, in which a controller is provided with a CPU for effecting read-out, storage and processing of data; a ROM storing data of a character generator and program data; a RAM for data storage; a font IC card storing font data; an operation panel for entering instructions for operations and displaying the function status; a Centronics interface (parallel I/F) or a RS232C interface (serial I/F), connected to a host computer for the overall control of the information recording apparatus of the present embodiment and receiving data from said host computer; and a printer interface for supplying the laser beam printer with bit data of respective image planes corresponding to the different toner colors, in succession in the order of Y, M, C and K according to the electrophotographic process.

The character generator contained in said ROM can generate color bit data not only of alphabetical characters but also of Japanese kanji characters. The laser driver 50 drives a semiconductor laser 51, corresponding to dot data of each image plane, representing a character or a pattern from said character generator, or to dot data of each image plane, representing a binarized photographic image or half-tone image obtained for example by the dither method.

A laser beam 16, emitted from the semiconductor laser 51 driven by the laser driver 50, is deflected by the rotary polygon mirror 52 in the main scanning direction, then guided through an f-θ lens 14 positioned between the polygon mirror 52 and a mirror 54, and is guided by said mirror 54 onto the photosensitive drum 1, thereby being focused thereon and scanning said drum, thus forming a latent image on a main scanning line 57.

For a printing speed of 2 sheet/min (A4 size or letter size) with a printing density of 300 dot/inch, the lighting time of the laser for recording a dot is about 540 ns; for a printing speed of 4 sheet/min. with a printing density of 300 dot/inch, said lighting time is about 270 ns; for a printing speed of 2 sheet/min. with a printing density of 600 dot/inch, said lighting time is about 135 ns; and for a printing speed of 4 sheet/min. with a printing density of 600 dot/inch, said light time is about 68 ns.

With the current technology level, the laser driver 50 employed in the laser beam printers can achieve a shortest pulsed lighting time of about 4 ns (with a lighting start-up time of ca. 1 ns and a lighting extinguishing time of ca. 1 ns). Therefore, a shorter lighting is either impossible or unstable in the duration and light amount. Consequently, the pulse duration for laser modulation for the smoothing to be explained later should be about 4 ns at shortest.

A beam detector 55, placed at the scanning start position of the laser beam 16, detects said laser beam 16 and generates a BD signal, serving as a synchronization signal for determining the image writing timing in the main scanning direction.

The semiconductor laser 51, upon receiving the image signal of Y at first, generates a laser beam modulated by said signal, thereby irradiating, through an optical path 16, the photosensitive drum 1, of which potential is shifted to ca. −100 V in the irradiated portion. As the photosensitive drum 1 rotates further in the direction of arrow in FIG. 1, the latent image thus formed is rendered visible by yellow toner, in the developing cartridge 4a.

The toner image on the photosensitive drum 1 is transferred, by a high voltage, applied by an unrepresented high voltage source, between the photosensitive drum 1 and the transfer roller 10, onto the sheet wound on said transfer roller 10.

In more details, in synchronization with the image formed on the photosensitive drum 1, a sheet is fed from the cassette 17 by the pickup roller 18, and is adhered onto the transfer drum 10. For this purpose the transfer roller 10 is composed of a metal cylinder 19 of a diameter of 156 mm, an elastic layer of a thickness of 2 mm wound thereon and a PVDF layer 21 of a thickness of 100 μm, and is rotated at a speed substantially same as that of the photosensitive drum 1. Said elastic layer is composed of foamed polyurethane, made by Inoac.

Said recording sheet, upon supply onto the transfer roller 10, is supported by the gripper 22, and the toner image on the photosensitive drum is transferred onto said recording sheet, by a voltage applied between the photosensitive drum 1 and the transfer roller 10 by an unrepresented power source. At the same time the recording sheet is adhered, by charge injection thereto, to the transfer roller 10. If necessary, the adhesion may be achieved in advance, by a voltage application to a suction roller 23.

The above-explained process is repeated for magenta, cyan and black colors, whereby toner images of plural colors are formed on the recording sheet. Said recording sheet is then separated by a separating finger 24 from the transfer roller 10, and is subjected to the fusion of toner images in a known fixing device 25 employing pressure and heat, whereby a color image is obtained.

Toner remaining on the photosensitive drum 1 is removed by a cleaning device 26, composed for example of a fur brush or a cleaning blade. Also the toner on the transfer roller 10 is preferably cleaned by a cleaning device 27, composed also of a fur brush or a web.

The fixing roller 25 contains therein a fixing heater 11, which controls the fixing roller 25 at a predetermined surface temperature, according to the temperature detection by an unrepresented thermistor maintained in slip contact with the surface of the fixing roller, thereby thermally fixing the toner images on the recording sheet 15.

The above-explained printer is connected with the controller through interface means, and executes a printing sequence according to a printing command and an image signal received from said controller. In the following there will be briefly explained the signals exchanged through said interface means.

Figure 4:
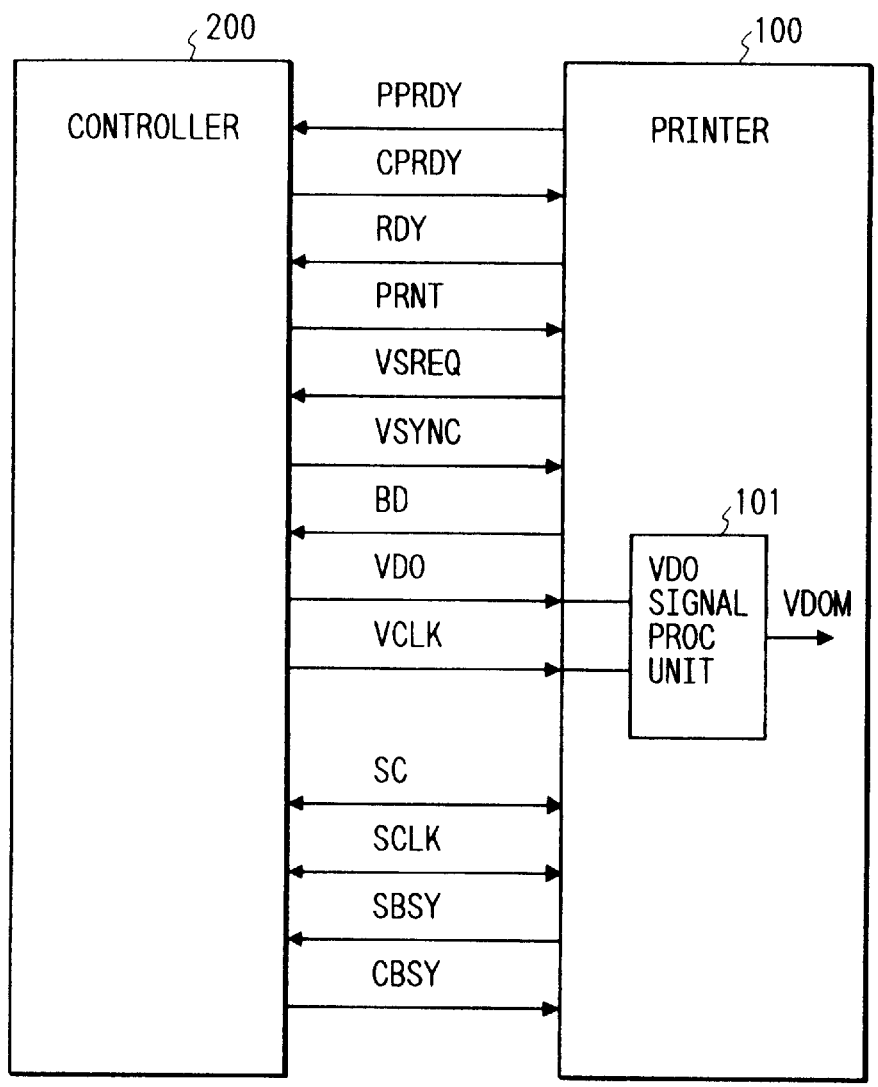
FIG. 4 is a view showing interface signals between the printer engine and a controller of the present embodiment.

FIG. 4 shows interface signals exchanged between the printer engine unit 100 and the controller unit 200 generating image data. Each of said signals will be explained in the following:

PPRDY signal: supplied from the printer 100 to the controller 200, and indicating that the printer 100 is powered and is ready for operation;

CPRDY signal: supplied from the controller 200 to the printer 100, and indicating that the controller 200 is powered and ready for operation;

RDY signal: supplied from the printer 100 to the controller 200, and indicating that the printer can start or continue the printing operation upon reception of a PRNT signal to be explained later. This signal becomes "false" when the execution of the printing operation becomes impossible for example because of absence of recording sheets in the cassette;

PRNT signal: supplied from the controller 200 to the printer 100, for instructing the start of continuation of the printing operation. Upon reception of this signal, the printer 100 initiates the printing operation;

TOP signal: supplied from the printer 100 to the controller 200, for synchronizing the supply of image data in the sub scanning direction with each of the color image planes Y, M, C, K. The image formed on the drum is synchronized, in the sub scanning direction, with the recording sheet;

BD signal: supplied from the printer 100 to the controller 200, for synchronization of supply of the image data in the main scanning direction. The image formed on the drum is synchronized, in the main scanning direction, with the recording sheet. Said signal indicates that the scanning laser beam is at the start point of main scanning;

VDO signal: supplied from the controller 200 to the printer 100, for transmitting image data to be printed. Said signal is transmitted in synchronization with a VCLK signal to be explained later. The controller 200 receives code data, such as PCL codes, transmitted from the host computer, and generates character bit signals, by the character generator, corresponding to said code data.

Also the controller 200 receives vector codes such as postscript codes from the host computer and generates pattern bit data (including dither binary data) corresponding to said codes. Furthermore, the controller 200 converts bit image data, read from an image scanner, into binary data by the dither method, the density pattern method or the error diffusion method, and transmits said binary data as the VDO signal to the printer 100, corresponding to each of the color image planes Y, M, C, K. Said printer 100 prints a color toner image or a white image respectively when said signal is "true" or "false";

VCLK signal: supplied from the controller 200 to the printer 100, as a synchronization signal for the transmission and reception of said VDO signal;

SC signal: a bidirectional serial signal, for bidirectionally transmitting and receiving a "command" signal supplied from the controller 200 to the printer 100 and a "status" signal supplied from the printer 100 to the controller 200. For transmitting or receiving said SC signal, an SCLK signal to be explained later is used as the synchronization signal. Also for controlling the direction of transmission of the bidirectional signal, there are employed SBSY signal and CBSY signal to be explained later.

Said "command" is an 8-bit serial signal, instructing from the controller 200 to the printer 100, for example a sheet supply mode from the sheet cassette or a sheet supply mode from a manual supply slot.

Said "status" is an 8-bit serial signal, for informing the controller 200 of various states of the printer 100, such as a waiting state in which the fixing unit of the printer 100 has not reached an operational temperature, a sheet jammed state, or a state of absence of sheets in the cassette;

SCLK signal: a synchronization pulse signal for the printer 100 to fetch the "command" signal or for the controller 200 to fetch the "status" signal;

CBSY signal: a signal for the controller 200 to occupy the SC signal and the SCLK signal, prior to the transmission of the "command";

SBSY signal: a signal for the printer 100 to occupy the SC signal and the SCLK signal, prior to the transmission of the "status".

The VDO signal, supplied to the printer 100 together with the VCLK signal, is supplied to a VDO signal processing unit 101 in the printer engine unit. Said VDO signal processing unit 101 converts the entered VDO signal by signal processing to be explained later, and sends the converted signal VDOM to the laser driver 50, which in response drives the semiconductor laser 51.

In the following there will be explained the function of the interface in the present embodiment.

When the power switches of the printer 100 and the controller 200 are turned on, the printer 100 initializes the internal state thereof, and shifts the PPRDY signal to "true" for the controller 200.

On the other hand, the controller 200 also initializes the internal state thereof, and shifts the CPRDY signal to "true" for the printer 100. Thus the printer 100 and the controller 200 can confirm the powered state each other.

Then the printer 100 energizes the fixing heater 11 in the fixing roller 25, and, when the surface temperature thereof reaches a temperature capable of image fixing, shifts the RDY signal to "true". After confirming the true state of the RDY signal, the controller 200 shifts the PRNT signal to "true" if data to be printed are present.

Upon confirming the true state of the PRNT signal, the printer 100 rotates the photosensitive drum 1, initializes the surface thereof to a uniform potential, and activates the pickup roller 18 thereby advancing the front end of a recording sheet to the position of the gripper 22. Subsequently the gripper 22 grips the front end of the sheet, which is adhered onto the transfer drum. At the same time the charge on the photosensitive drum 1 is initialized.

The support member for the developing cartridges is rotated by an unrepresented driving motor to a position in which the developing cartridge 4a of yellow color faces the photosensitive drum 1. Then, when the front end of the sheet adhered on the transfer roller reaches a predetermined rotational position and the printer 100 becomes capable of receiving the VDO signal, the printer 100 releases the TOP signal for the Y image plane.

After confirming the release of the TOP signal, the controller 200 transmits the VDO signal for Y image plane in succession, in synchronization with the BD signal immediately after said TOP signal. In response to said VDO signal, the printer 100 turns on or off the laser beam respectively when the image is to be printed in yellow or white color, thereby forming a latent image on the photosensitive drum. The Y-developing cartridge 4a opposed to the photosensitive drum 1 deposits yellow toner onto said latent image, thereby forming a yellow toner image.

Then the yellow toner image on the drum is transferred onto the sheet 15 adhered on the transfer roller. Then, when the front end of said sheet reaches a predetermined rotational position, the TOP signal for M image plane is released. The support member 9 for the developing cartridges is rotated to a position in which the M developing cartridge 4b faces the photosensitive drum 1.

After confirming the release of said TOP signal, the controller 200 transmits the VDO signal for M image plane in succession, in synchronization with the BD signal immediately after the TOP signal. In response to said VDO signal, the printer 100 turns on or off the laser beam respectively when the image is to be printed in magenta or white color, thereby forming a latent image on the photosensitive drum 1. The M developing cartridge 4b opposed to the drum 1 deposits magenta color toner onto said latent image, thereby forming a magenta toner image.

Then the M toner image on the drum is transferred onto the sheet 15 adhered on the transfer roller. Then, when the front end of said sheet reaches a predetermined rotational position, the TOP signal for the C image plane is released. The support member 9 for the developing cartridges is rotated to a position in which the C developing cartridge 4c faces the photosensitive drum 1.

After confirming the release of the TOP signal, the controller 200 transmits the VDO signal for the C image plane in succession, in synchronization with the BD signal immediately after the TOP signal. In response to said VDO signal, the printer 100 turns on or off the laser beam respectively when the image is to be printed in cyan or white color, thereby forming a latent image on the photosensitive drum 1. The developing cartridge 4c of cyan color, positioned opposite to the drum 1, deposits cyan color toner onto said latent image, thereby forming a cyan toner image. Then the C toner image on said drum is transferred onto the sheet 15 adhered on the transfer roller. Then, when the front end of said sheet reaches a predetermined rotational position, the TOP signal for the K image plane is released. At the same time the support member 9 for the developing cartridges is rotated to a position in which the black (K) developing cartridge 4D faces the photosensitive drum 1.

After confirming the release of the TOP signal, the controller 200 transmits the VDO signal of K color in succession, in synchronization with the BD signal immediately after the TOP signal. In response to said VDO signal, the printer 100 turns on or off the laser beam respectively when the image is to be printed in K color or in white, thereby forming a latent image on the photosensitive drum. The K developing cartridge 4d positioned opposite to the drum 1 deposits black color toner onto the latent image, thereby forming a black toner image. Subsequently the black toner image on the photosensitive drum is transferred onto the sheet 15 adhered on the transfer roller.

A toner image, obtained by synthesis of four color planes, is formed on the sheet by repeating the cycle of latent image formation, image development and image transfer for four color planes.

Subsequently said sheet is released from the gripper at a predetermined rotational position, then is peeled off from the transfer roller 10 by a separation charger 2 and a separating finger 24, subjected to image fixation by the fixing unit 25 and is discharged onto a tray 12.

Figure 11:
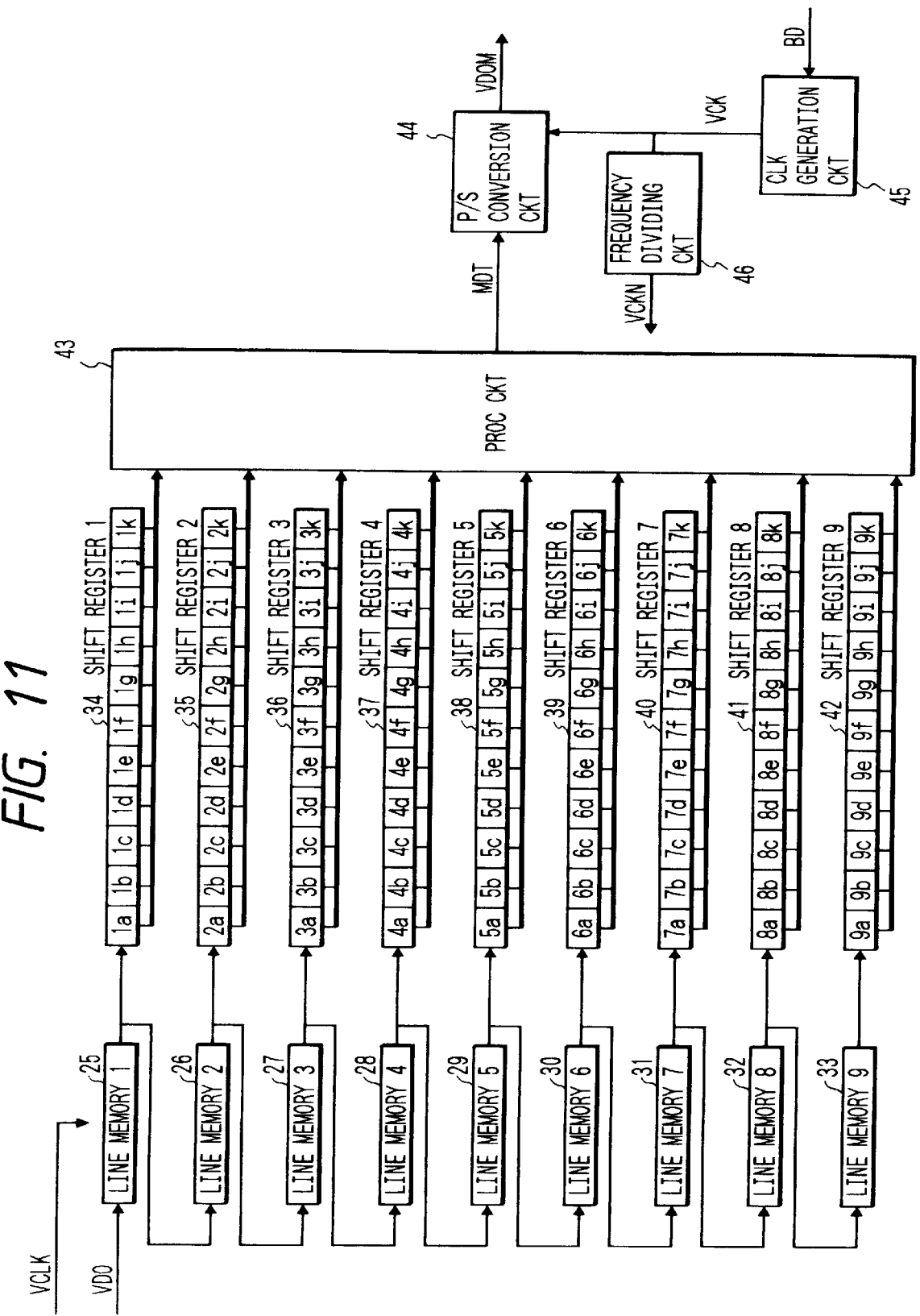
FIG. 11 is a block diagram of the matrix configuration in the present embodiment.
Figure 12A:
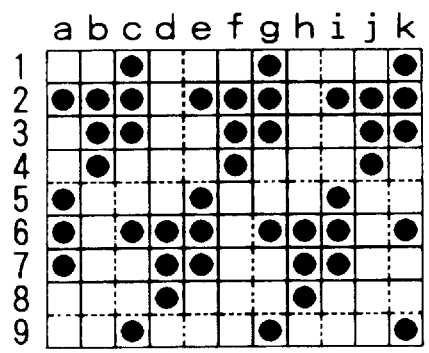
FIGS. 12A to 12C are views showing drawbacks in the conventional technologies.
Figure 12B:
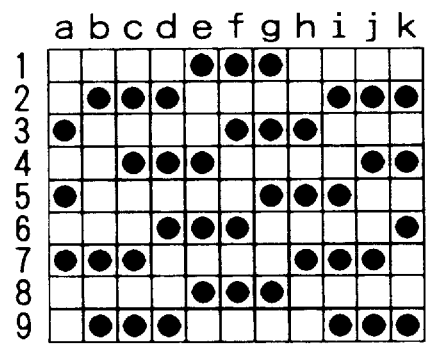
Figure 12C:
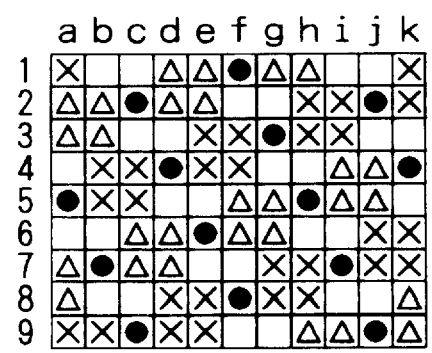

FIG. 11 is a detailed block diagram of the VDO signal process unit 101 for improving the image quality, provided in the above-explained printer engine of the present embodiment, adapted for use in a color laser beam printer with a printing density of 300 dot/inch.

In the present embodiment, a pixel A in the color plane to be printed as shown in FIG. 8 (said pixel being hereinafter called object pixel) is modified for obtaining a print of high image quality, by investigating the feature of image data in a peripheral area (11 pixels in the main scanning direction×9 pixels in the sub scanning direction) surrounding said object pixel.

Figure 9:
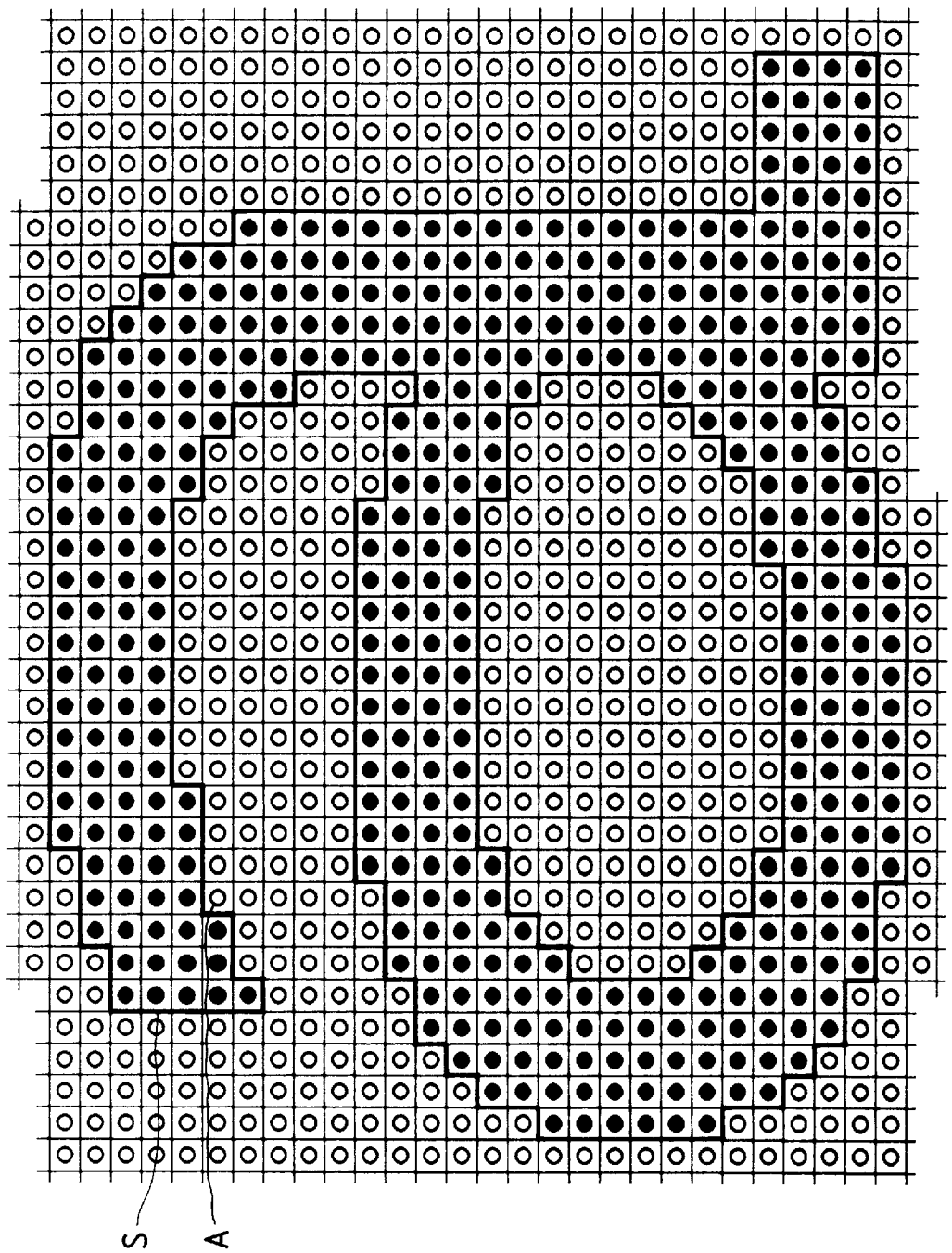

More specifically, for example in the dot data of an alphabetical character "a" of a resolving power of 300 dot/inch as shown in FIG. 9, for printing the object pixel A, the dot data of an area S (11 pixels in the main scanning direction×9 pixels in the sub scanning direction=99 pixels) surrounding said object pixel A are temporarily stored in a memory, as represented in FIG. 10.

Then the feature of the dot data in said area S is investigated, and the data of the object pixel to be printed is modified according to thus investigated feature. Said modification is so conducted, if said dot data are a part of a character or a pattern, as to print the contour in smoother manner. If said dot data are a part of a binary halftone image obtained for example by the dither method, the dot is divided finer or the interpolation of gradation is executed.

Figure 13:
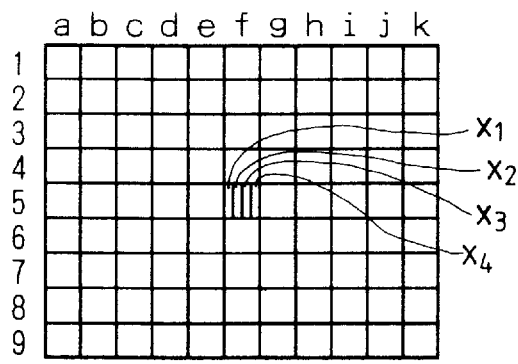
FIG. 13 is a view showing modified pixel areas of the object pixel in the present embodiment.

In the present embodiment, the object pixel A is composed, as shown in FIG. 13, of four small pixel portions x1, x2, x3, x4 divided in the main scanning direction. Consequently, in the printing stage, the print density is equivalent to 1200 dot/inch in the main scanning direction and 300 dot/inch in the sub scanning direction.

Figure 7:
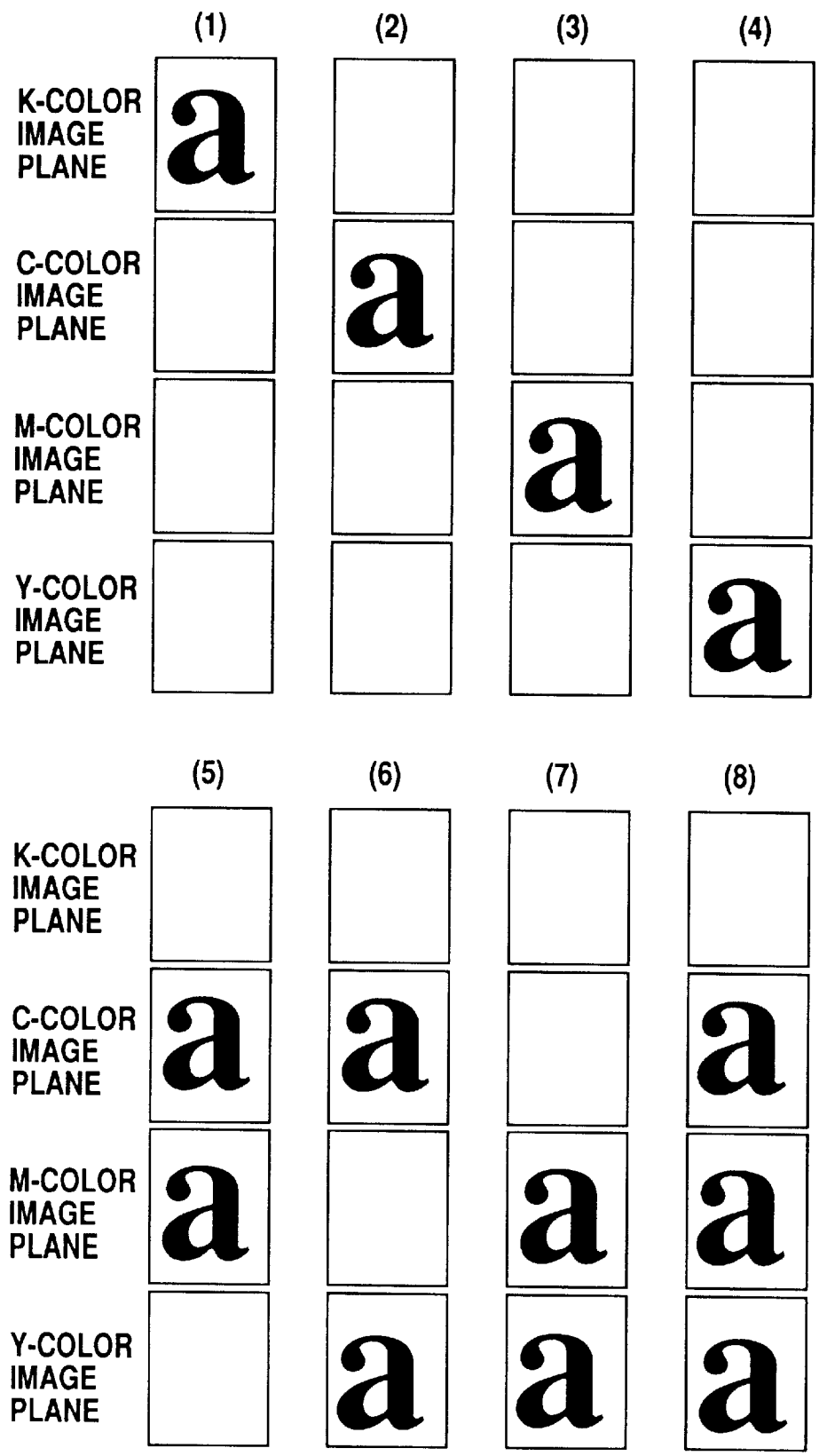
FIG. 7 is a view showing data arrangement on the color image planes of the present embodiment.

FIG. 7 explains the smoothing process for the color image planes of Y, M, C and K.

In FIG. 7, (1) indicates a case in which the smoothing process is conducted only on the black (K) image plane, in a predetermined area (for example reference area).

In FIG. 7, (2) indicates a case in which the smoothing process is conducted only on the cyan (C) image plane, in a predetermined area (for example reference area).

In FIG. 7, (3) indicates a case in which the smoothing process is conducted only on the magenta (M) image plane, in a predetermined area (for example reference area).

In FIG. 7, (4) indicates a case in which the smoothing process is conducted only on the yellow (Y) image plane, in a predetermined area (for example reference area).

In FIG. 7, (5) indicates a case in which the smoothing process is conducted only on the C and M image planes, in a predetermined area (for example reference area).

In FIG. 7, (6) indicates a case in which the smoothing process is conducted only on the C and Y image planes, in a predetermined area (for example reference area).

In FIG. 7, (7) indicates a case in which the smoothing process is conducted only on the Y and M image planes, in a predetermined area (for example reference area).

In FIG. 7, (8) indicates a case in which the smoothing process is conducted on the Y, M and C image planes in a predetermined area (for example reference area).

The process in each of the cases (1) to (8) mentioned above is not limited to the above-explained control but may also be conducted by a mode designation in advance from the controller 200.

For example, in case of conducting the smoothing process only on the black image plane, the mode shown in (1) in FIG. 7 may be designated, whereby the smoothing process of contour is applied only on the black characters and patterns.

Since four image planes are superposed in the color laser beam printer, there may result a color aberration for example due to a registration error when two or more image planes are superposed, and the smoothing effect may not be properly reproduced in the obtained print. In such case the smoothing effect is better applied to only one color plane corresponding to the toner color.

In the following there will be explained a case in which the smoothing process is applied to all the four color image planes of Y, M, C and K. The modes (1) to (8) shown in FIG. 7 will not be explained further since these modes can be easily attained by dispensing with the smoothing process for certain color image plane or planes. Also in the following description, the processing circuit is shown for only one color, because it is identical for the colors Y, M, C and K.

Now referring to FIG. 11, line memories 25–33 store the input image signal VDO with successive shifting, in synchronization with the clock signal CLK. Each of said line memories stores the dot information of the main scanning length for the page to be printed.

Also the line memories 25–33 are serially connected in the order from line memory 1 to 9, whereby they can store the dot information of 9 main scanning lines in the sub scanning direction.

Shift registers 34–42 respectively receive the outputs of said line memories 1–9. Said shift registers have a capacity of 11 bits each, and constitute a dot matrix memory of 11 dots in the main scanning direction times 9 lines in the sub scanning direction.

Within said matrix memory, a central dot 5f is defined as the object dot. A processing circuit 43 for detecting the feature of the data stored in said dot matrix memory and accordingly modifying the object pixel 5f, receives the bits of the shift registers 1–9 (namely 99 bits from 1a to 9k in total) and releases a parallel signal MDT after modification. Said parallel signal MDT is supplied to a parallel-to-serial conversion circuit 44.

Said parallel-to-serial conversion circuit 44 converts the input parallel signal MDT to a serial signal VDOM and accordingly drives the laser 55 through an unrepresented laser driver b. In the present first embodiment, the parallel signal is composed of 4 bits (x1, x2, x3, x4). The processing of a main scanning line is similarly conducted in succession.

A clock generator circuit 45 receives the main scanning synchronization signal BD and generates a clock signal VCK in synchronization therewith. Said clock signal VCK has a frequency equal to four times of the clock frequency $f_0$ required for recording with a density of 300 dot/inch in the main scanning direction. The serial signal VDOM is transmitted in succession, in synchronization with said clock signal VCK. A frequency dividing circuit 46 divides the frequency of the received clock signal VCK to ¼, thereby generating a clock signal VCKN of a frequency $f_0$, which is used as the synchronization clock signal for the dot data fetching from said dot matrix memory to the processing circuit 43.

In the above-explained configuration, the image signal VDO of 300 dot/inch transmitted from the controller 200 to the printer 100 in synchronization with the image clock signal VCLK is stored in succession in the line memories 1–9 (25–33). At the same time, among the dot data stored in said line memories, the dot matrix information of 11 dots in the main scanning direction times 9 dots in the sub scanning direction is taken out into the shift registers 1–9 (34–42).

Then the processing circuit 43 detects the feature of said dot matrix information, and, according to the detected feature, generates modified data for printing, consisting of four data x1–x4 corresponding to the four portions in the main scanning direction of the object pixel.

Now there will be explained, with reference to FIGS. 14A, 14B and 15, an algorithm for extracting the feature of the dot pattern over the entire matrix area of 11 dots in the main scanning direction times 9 dots in the sub scanning direction, and identifying whether said dot pattern is a part of a character or a pattern, requiring a smoothing process.

Figure 14A:
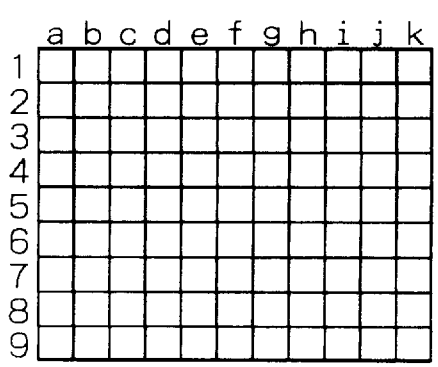

FIG. 14A illustrates a reference area consisting of 99 pixels in total, arranged in a matrix of 11 dots a–k in the main scanning direction and 9 dots 1–9 in the sub scanning direction. The central pixel 5f is selected as the object pixel for the smoothing process.

Figure 14B:
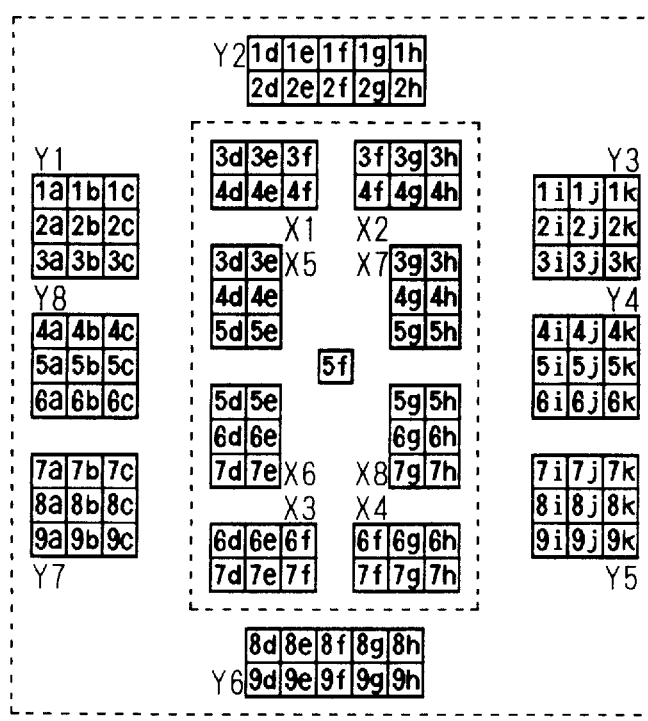

FIG. 14B shows the division of the reference area shown in FIG. 14A, into 17 areas X1–X8, Y1–Y8 and 5f.

The area X1 is composed of 6 dots 3d, 3e, 3f, 4d, 4e and 4f; the area X2 of 6 dots 3f, 3g, 3h, 4f, 4g and 4h; the area X3 of 6 dots 6d, 6e, 6f, 7d, 7e and 7f; the area X4 of 6 dots 6f, 6g, 6h, 7f, 7g and 7h; the area X5 of 6 dots 3d, 3e, 4d, 4e, 5d and 5e; the area X6 of 6 dots 5d, 5e, 6d, 6e, 7d and 7e; the area X7 of 6 dots 3g, 3h, 4g, 4h, 5g and 5h; and the area X8 of 6 dots 5g, 5h, 6g, 6h, 7g and 7h.

The area Y1 is composed of 9 dots 1a, 1b, 1c, 2a, 2b, 2c, 3a, 3b and 3c; the area Y3 of 9 dots 1i, 1j, 1k, 2i, 2j, 2k, 3i, 3j and 3k; the area Y4 of 9 dots 7i, 7j, 7k, 8i, 8j, 8k, 9i, 9j and 9k; the area Y7 of 9 dots 7a, 7b, 7c, 8a, 8b, 8c, 9a, 9b and 9c; and the area Y8 of 9 dots 4a, 4b, 4c, 5a, 5b, 5c, 6a, 6b and 6c.

The area Y2 is composed of 10 dots 1d, 1e, 1f, 1g, 1h, 2d, 2e, 2f, 2g and 2h; and the area Y6 is composed of 10 dots 8d, 8e, 8f, 8g, 8h, 9d, 9e, 9f, 9g and 9h. In this manner the reference area mentioned above is divided into 8 areas X1–X8 of 6 dots each, 6 areas (Y1, Y3, Y4, Y5, Y7 and Y8) of 9 dots each, 2 areas (Y2 and Y6) of 10 dots each, and the central pixel 5f.

As shown in FIG. 15, the feature of each area is represented by $X_n$, $Y_n$. If all the dots in an area are same (if all the pixels are non-print pixels represented by white circles, or if all the pixels are to be printed with the toner color, as represented by black circles), the feature ($X_n$, $Y_n$) of the area is defined as "0". If the dots in an area are different (non-print pixels and print pixels are mixed), the feature ($X_n$, $Y_n$) of the area is defined as "1".

For example, if the dots in the area X1 are all white, the area X1 has a feature X1="0"; if they are all colored, the area X1 has a feature X1="0"; if they are composed of white and colored, the area X1 has a feature X1="1".

Figure 16:
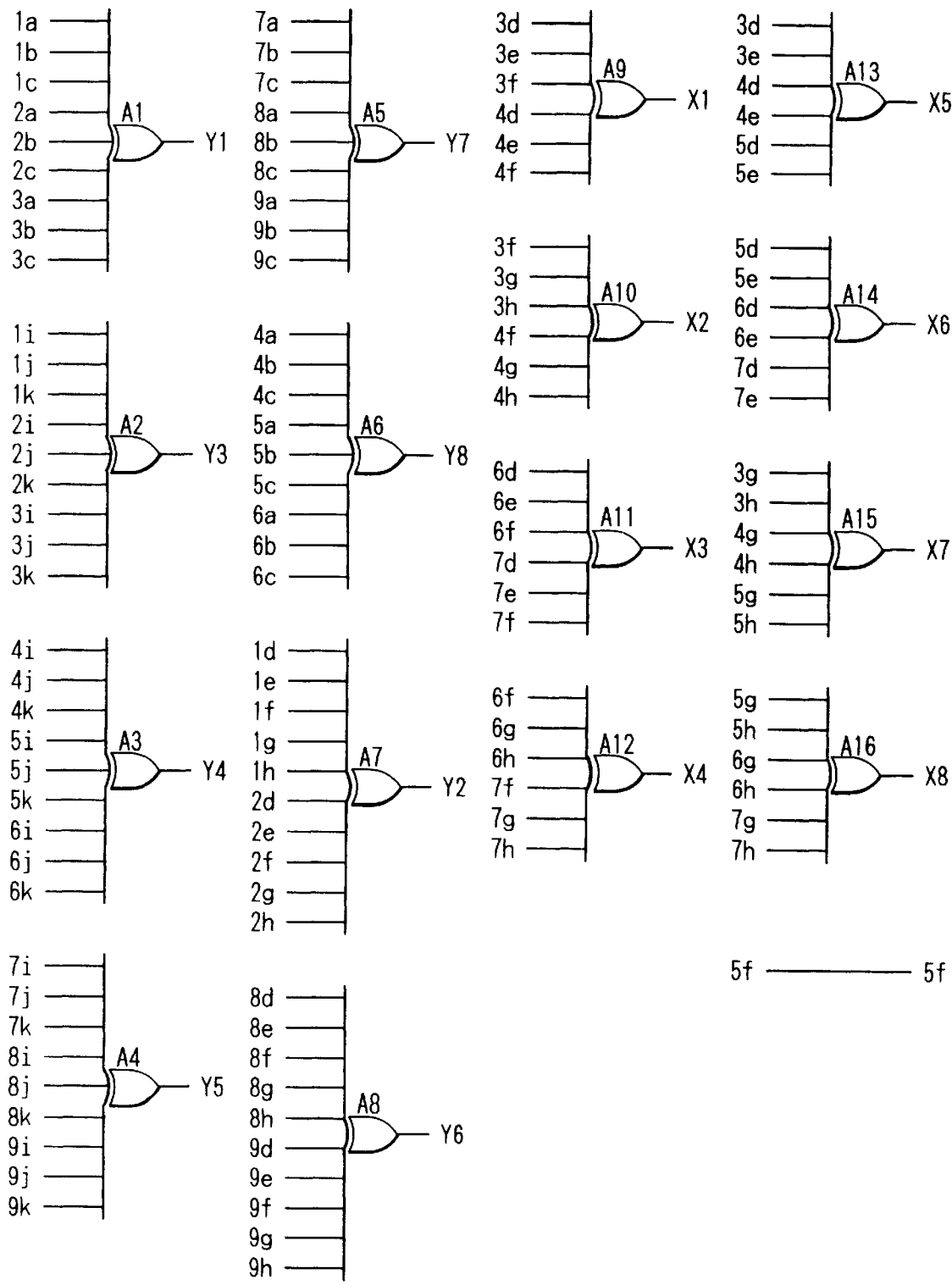
FIGS. 16 to 18 are circuit diagrams showing examples of the feature extracting unit of the present embodiment.

The feature of each area is detected by circuits shown in FIG. 16, wherein exclusive logic circuits A1–A16 apply exclusive logic calculations (giving an output "0" if all the input signals are same; an output "1" if the input signals are different) for all the pixels signals of the area (X1–X8, Y1–Y8). The features of the areas X1–X8, Y1–Y8 can be obtained in this manner.

Figure 17:
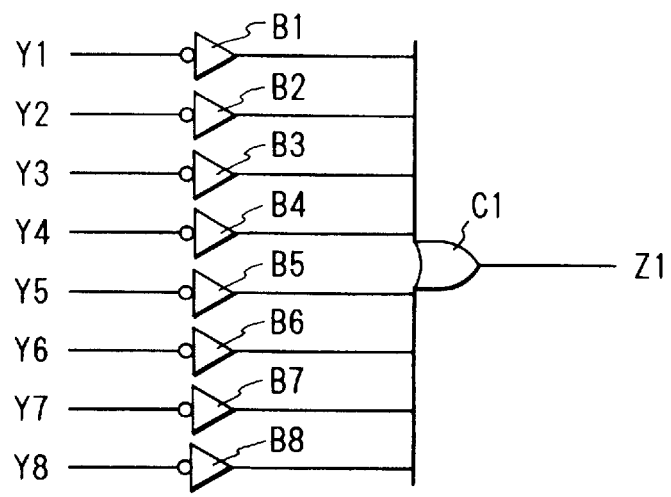

FIG. 17 shows a circuit for detecting that the feature $Y_n$ is "0" for at least one of the areas Y1–Y8. Said circuit consists of inverters B1–B8, and an OR gate C1. The feature signals of the areas Y1–Y8 are inverted by the inverters B1–B8 and supplied to the OR gate C1, of which output Z1 becomes "1" when at least one of the features of the areas Y1–Y8 is "0".

In the following there will be explained an example, in the above-explained configuration, of extracting the contour of a character or a pattern in each color image plane and smoothing said contour.

FIGS. 26A to 26D illustrate the smoothing process for a pattern having a boundary with an inclination not exceeding ½ (a horizontal line with an angle not exceeding 45°). In each of FIGS. 26A to 26D, when a bit pattern shown at the left-hand side is detected, the object pixel (central pixel) is modified as shown at the right-hand side.

FIGS. 28A to 31C show the detailed algorithm of the modification process shown in FIGS. 26A to 26D.

Figure 26A:
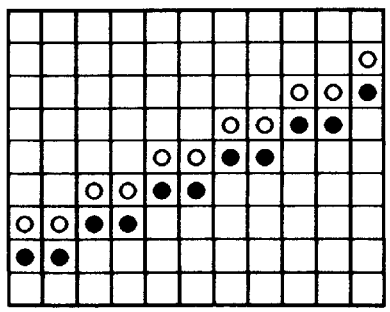
FIGS. 26A to 26D are views showing the smoothing process for a horizontal line with an angle not exceeding 45°.
Figure 28A:
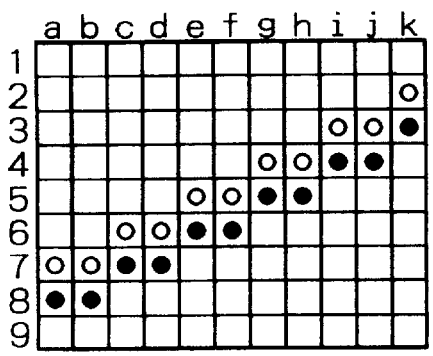
Figure 28B:
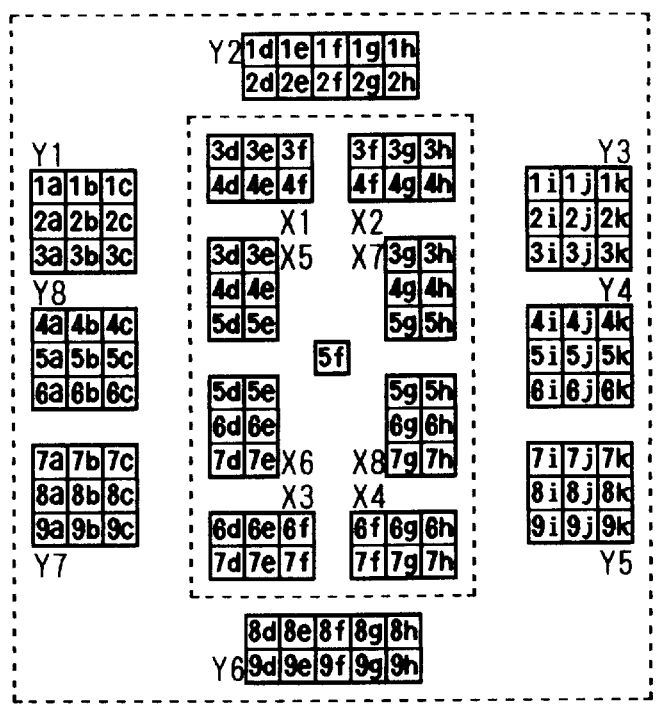
Figure 28C:
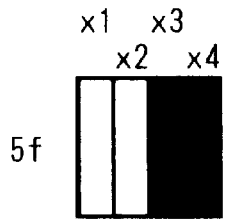

FIGS. 28A to 28C show the specific algorithm corresponding to the case shown in FIG. 26A. If X5=X2=0 and at least one of the areas Y1–Y8, X3 and X4 is "0" as shown in FIG. 28B and if the bits 7*a*=7*b*=6*c*=6*d*=5*e*=5*f*=4*g*=4*h*=3*i*=3*j*=2*k*=0 and 8*a*=8*b*=7*c*=7*d*=6*e*=6*f*=5*g*=5*h*=4*i*=4*j*=3*k*=1 as shown in FIG. 28A, the object pixel 5*f* is modified to x1=0, x2=0, x3=1 and x4=1.

Figure 32:
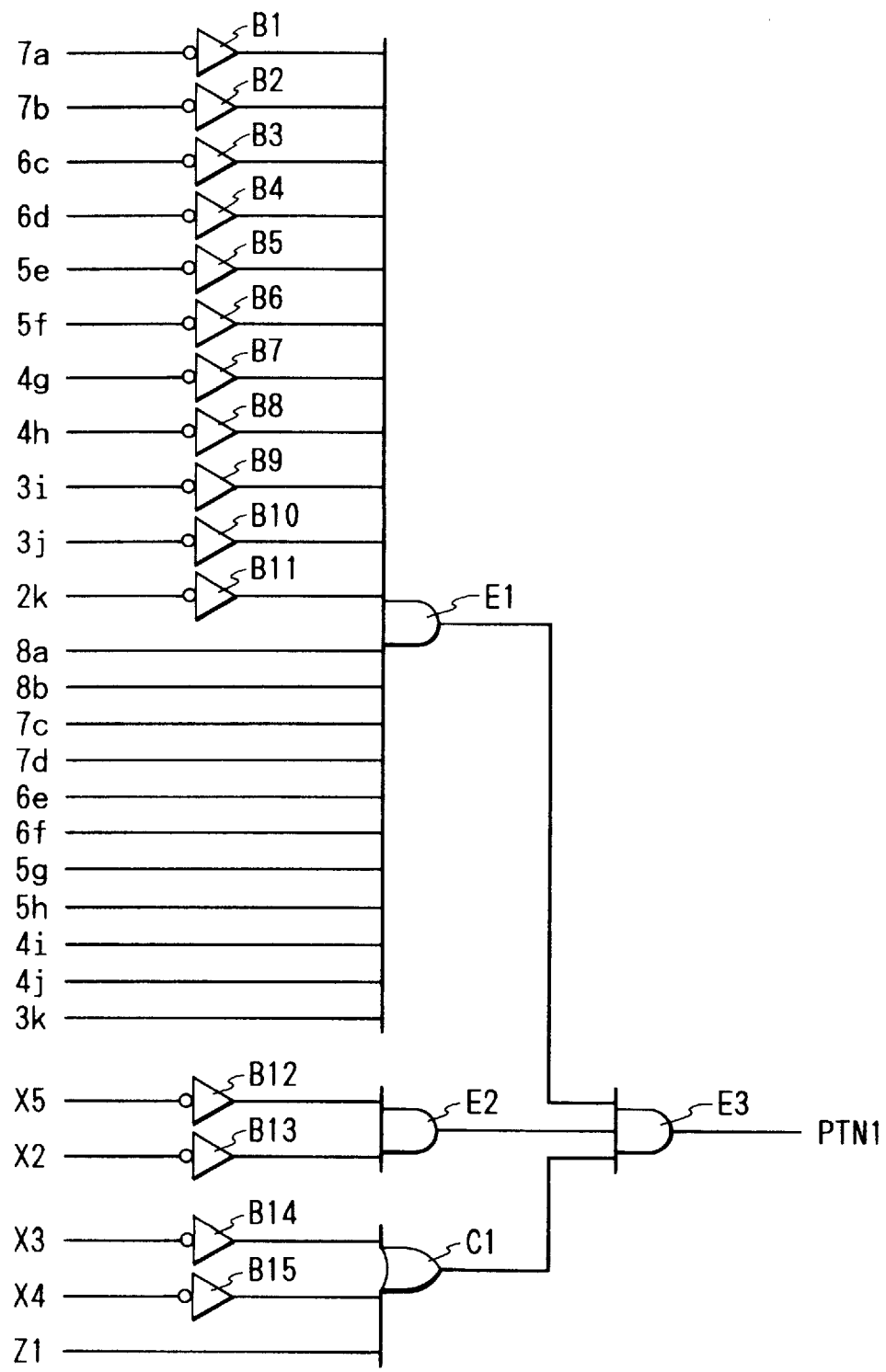
FIG. 32 is a view of a feature extracting circuit corresponding to FIG. 19.

FIG. 32 shows a circuit for realizing said algorithm, composed of inverters B1–B15, AND gates E1–E5 and an OR gate C1. The AND gate E2 receives the information of the areas X2, X5, while the OR gate C1 receives the information of the areas X3, X4, Y1–Y8 (Z1), and the AND gate E1 receives the bit pattern information. The AND gate E1 releases an output PTN1 as "1" or "0" respectively when the aforementioned conditions are satisfied or not. Said output PTN1 is supplied to an OR gate Q4 of a circuit shown in FIG. 18.

Figure 26C:
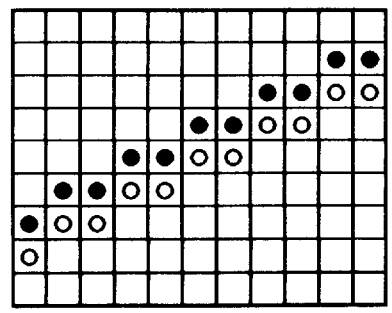
Figure 26B:
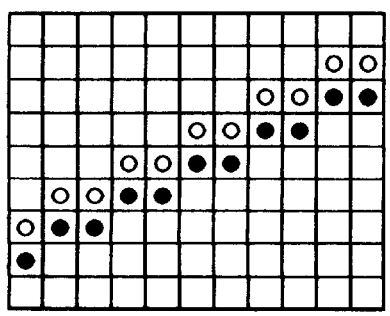
Figure 29A:
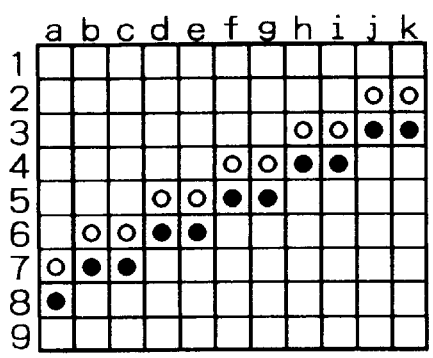
Figure 29B:
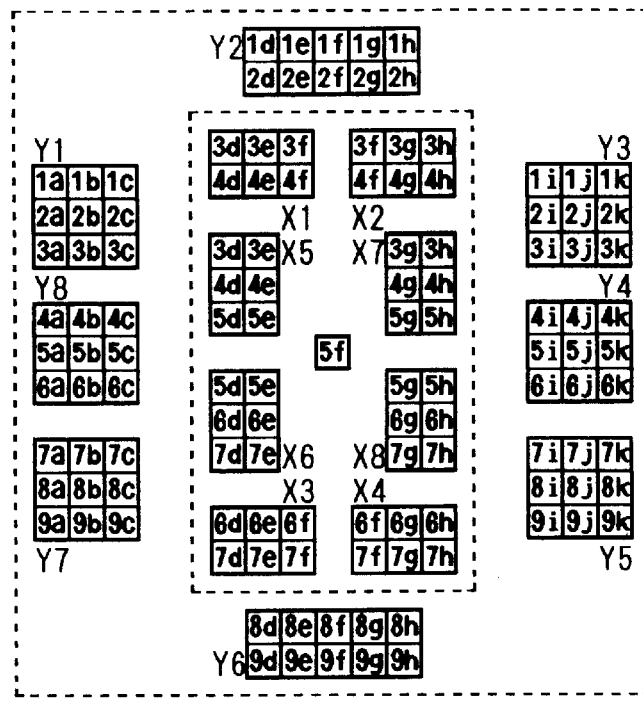
Figure 29C:
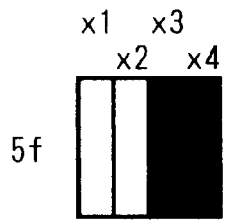

FIGS. 29A to 29C show the specific algorithm corresponding to the case shown in FIG. 26B. if X1=0 and at least one of the areas Y1–Y8, X7, X3 and X4 is "0" l as shown in FIG. 29B, and if the bits 7*a*=7*b*=6*c*=6*d*=5*e*=5*f*=4*g*=4*h*=3*i*=3*j*=2*k*=0 and 8*a*=8*b*=7*c*=7*d*=6*e*=6*f*=5*g*=5*h*=4*i*=4*j*=3*k*=1 as shown in FIG. 29A, the object pixel 5*f* is modified to x1=0, x2=0, x3=1 and x4=1.

Figure 33:
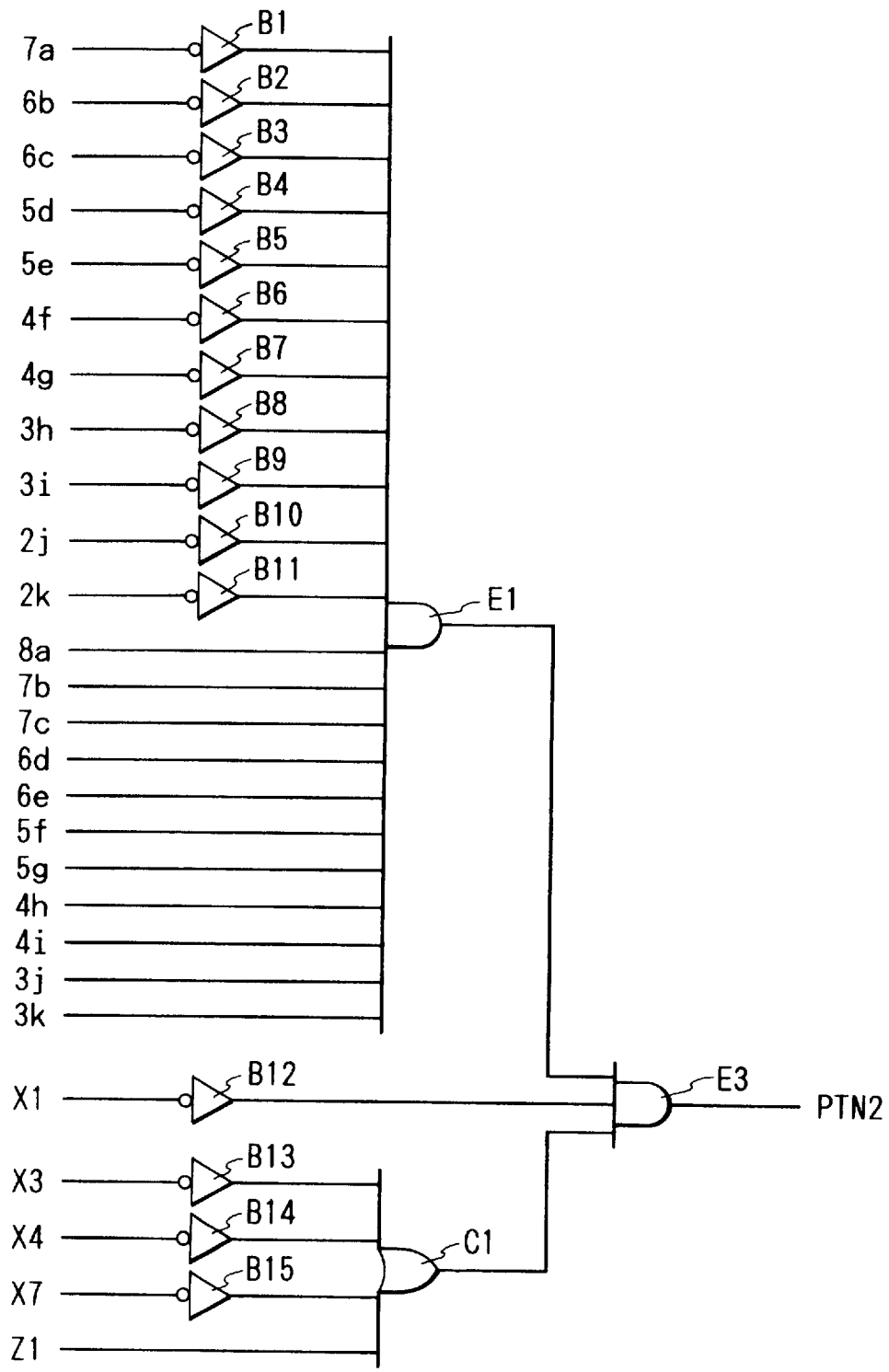
FIG. 33 is a view of a feature extracting circuit corresponding to FIG. 20.

FIG. 33 shows a circuit for realizing said algorithm, composed of inverters B1–B15, AND gates E1, E3 and an OR gate C1. The inverter B12 receives the information of the area X1, while the OR gate C1 receives the information of the areas X3, X4, X7 and Y1–Y8 (Z1), and the AND gate E1 receives the bit pattern information. The AND gate E3 releases an output PTN2 as "1" or "0" respectively when the above-mentioned conditions are satisfied or not. Said output PTN2 is supplied to an OR gate Q13 in a circuit shown in FIG. 18.

FIGS. 30A to 30C show the specific algorithm corresponding to the case shown in FIG. 26C. If X8=0 and X3=0 and at least one of the areas Y1–Y8, X1 and X2 is "0" as shown in FIG. 30B and if the bits 7*a*=6*b*=6*c*=5*d*=5*e*=4*f*=4*g*=3*h*=3*i*=2*j*=2*k*=1 and 8*a*=7*b*=7*c*=6*d*=6*e*=5*f*=5*g*=4*h*=4*i*=3*j*=3*k*=0 as shown in FIG. 30A, the object pixel 5*e* is modified to x1=1, x2=1, x3=0 and x4=0.

Figure 34:
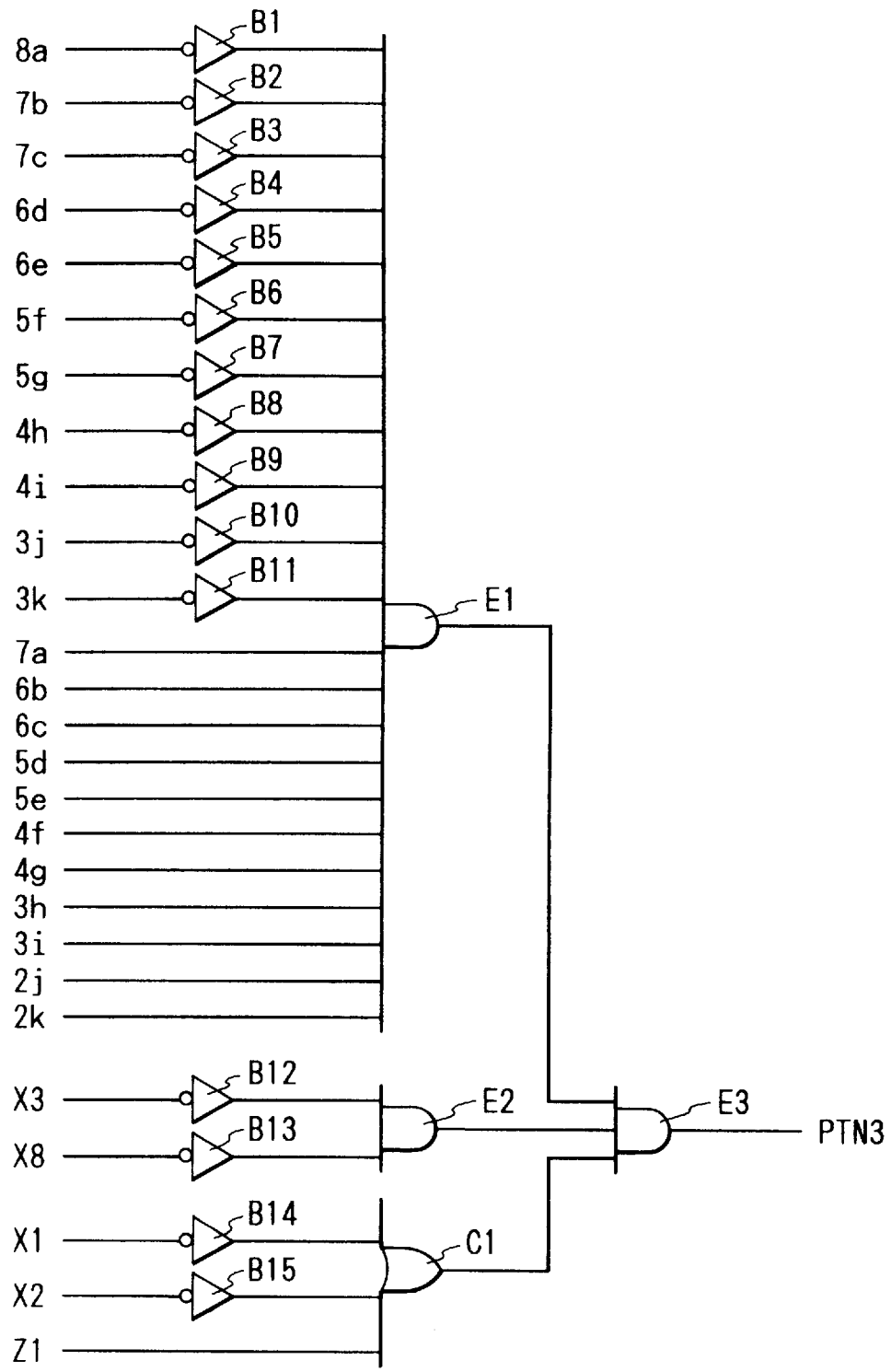
FIG. 34 is a view showing a feature extracting circuit corresponding to FIG. 21.

FIG. 34 shows a circuit for realizing said algorithm, composed of inverters B1–B15, AND gates E1–E3 and an OR gate C1. The AND gate E2 receives the information of the areas X3 and X8, while the OR gate C1 receives the information of the areas X1, X2 and Y1–Y8 (Z1) and the AND gate E1 receives the bit pattern information. The AND gate E3 releases an output PTN3 as "1" or "0" respectively when the above-mentioned conditions are satisfied or not. Said output PTN3 is supplied to the OR gate Q4 of the circuit shown in FIG. 18.

Figure 26D:
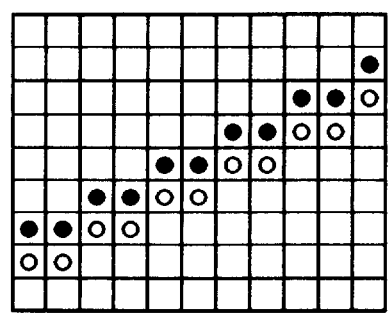

FIGS. 31A to 31C show the specific algorithm corresponding to the case shown in FIG. 26D. If X4=0, X8=0 and at least one of the areas Y1–Y8, X1, X2 and X6 is "0" as shown in FIG. 31B and if the bits 7*a*=7*b*=6*c*=6*d*=5*e*=5*f*=4*g*=4*h*=3*i*=3*j*=2*k*=1 and 8*a*=8*b*=7*c*=7*d*=6*e*=6*f*=5*g*=5*h*=4*i*=4*j*=3*k*=0 as shown in FIG. 31A, the object pixel 5*f* is modified to x1=1, x2=1, x3=0 and x4=0.

Figure 35:
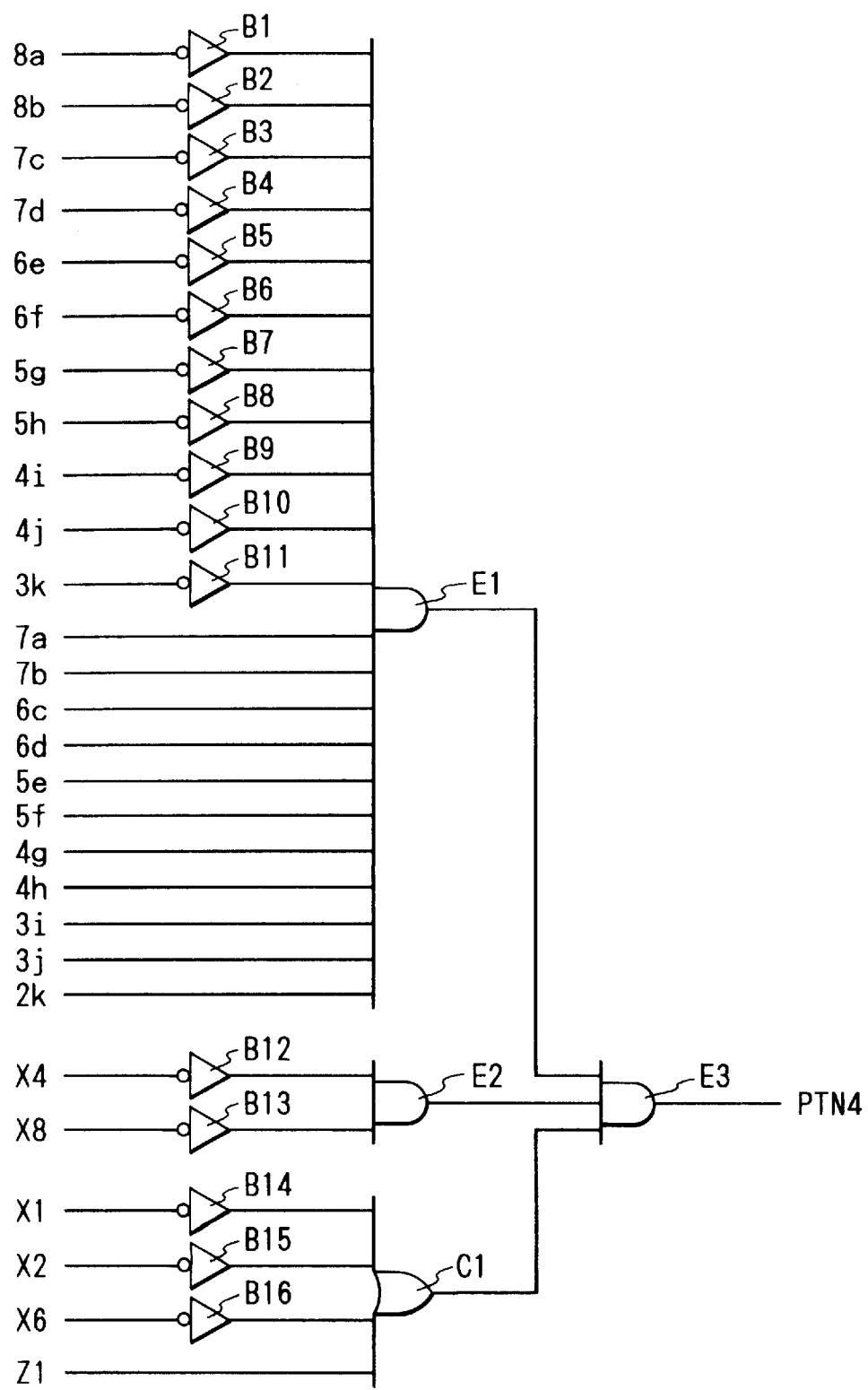
FIG. 35 is a view showing a feature extracting circuit corresponding to FIG. 22.

FIG. 35 shows a circuit for realizing said algorithm, composed of inverters B1–B16, AND gates E1–E2 and an OR gate C1. The AND gate E2 receives the information of the areas X4 and X8, while the OR gate C1 receives the information of the areas X1, X2, X6 and Y1–Y8 (Z1), and the AND gate E1 receives the bit pattern information. The AND gate E3 releases an output PTN4 as "1" or "0" respectively when the above-mentioned conditions are satisfied or not. Said output PTN4 is supplied to the OR gate Q13 of the circuit shown in FIG. 18.

FIGS. 37A to 37D illustrate the smoothing process for a pattern having a boundary with an inclination exceeding ½ (a vertical line having an angle exceeding 45°). In each of FIGS. 37A to 37D, when a bit pattern shown at the left-hand side is detected, the object pixel (central pixel) is modified as shown at the right-hand side. FIGS. 38A to 41C show the detailed algorithm of the modification process shown in FIGS. 37A to 37D.

Figure 37A:
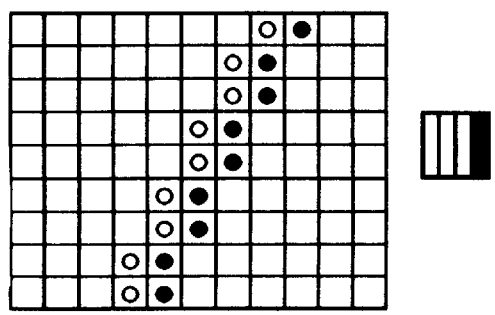
FIGS. 37A to 37D are views showing the smoothing process for a vertical line with an angle exceeding 45°.
Figure 37C:
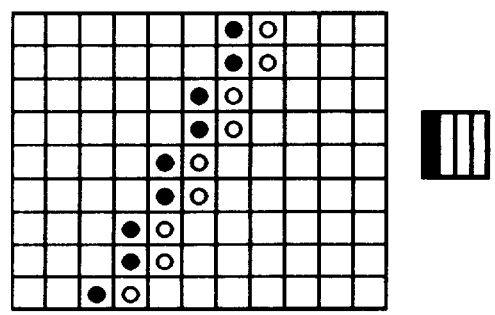
Figure 37B:
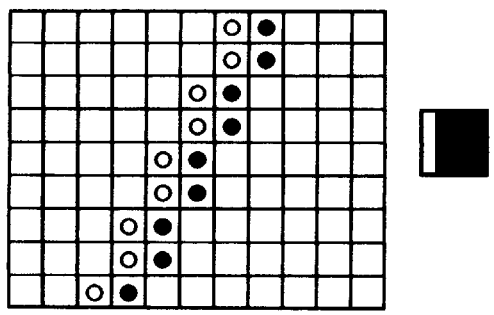
Figure 37D:
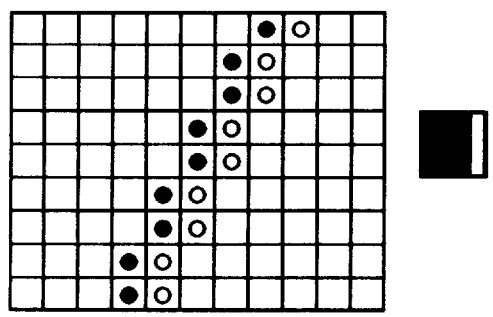

FIGS. 38A to 38C show the specific algorithm corresponding to the case shown in FIG. 37A. If X1=0, X6=0 and at least one of the areas Y1–Y8, X4 and X7 is "0" as shown in FIG. 38B and if the bits 1*h*=2*g*=3*g*4*f*=5*f*=6*e*=7*e*=8*d*=9*d*=0 and 1*i*=2*h*=3*h*=4*g*=5*g*=6*f*=7*f*=8*e*=9*e*=1 as shown in FIG. 38A, the object pixel 5*f* is modified to x1=0, x2=0, x3=0 and x4=1.

FIGS. 39A to 39C show the specific algorithm corresponding to the case shown in FIG. 38B. If X5=0 and at least one of the areas Y1–Y8, X3, X8 and X7 is "0" as shown in FIG. 39B and if the bits 1*h*=2*h*=3*g*=4*g*=5*f*=6*f*=7*e*=8*e*=9*d*=1 and 1*g*=2*g*=3*f*=4*f*=5*e*=6*e*=7*d*=8*d*=9*c*=0 as shown in FIG. 39A, the object pixel 5*f* is modified to x1=0, x2=1, x3=1 and x4=1.

FIGS. 40A to 40C show the specific algorithm corresponding to the case shown in FIG. 38C. If X4=0, X7=0 and at least one of the areas Y1–Y8, X1 and X6 is "0" as shown in FIG. 40B and if the bits 1*h*=2*h*=3*g*4*g*=5*f*=6*f*=7*e*=8*e*=9*d*=1 and 1*g*=2*g*=3*f*=4*f*=5*e*=6*e*=7*d*=8*d*=9*c*=1 as shown in FIG. 40A, the object pixel 5*f* is modified to x1=1, x2=0, x3=0 and x4=0.

Figures 41A, 41B, 41C:
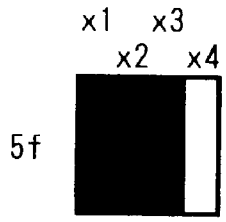
Figure 42:
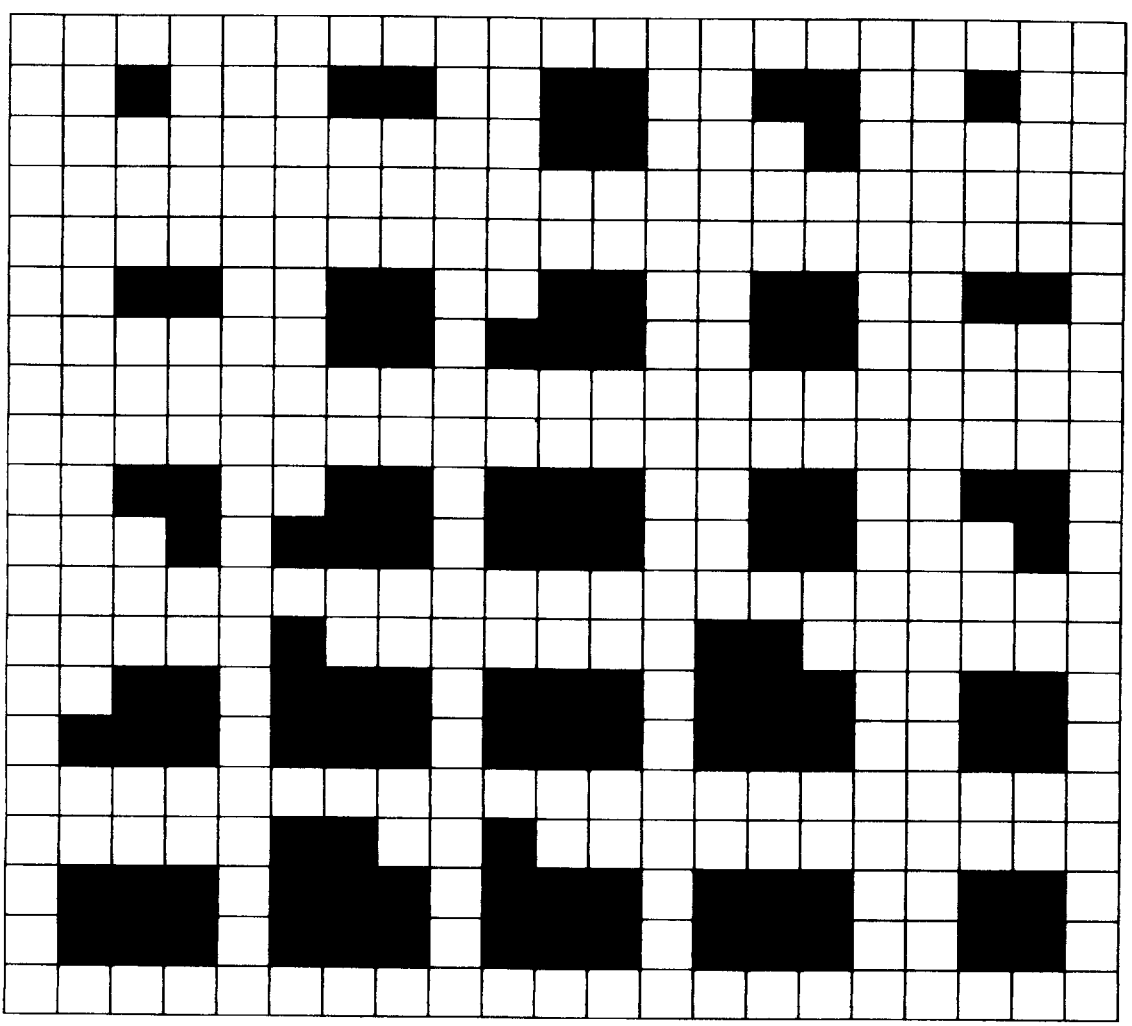
FIG. 42 is a partial magnified view of a binary halftone image.
Figure 43A:
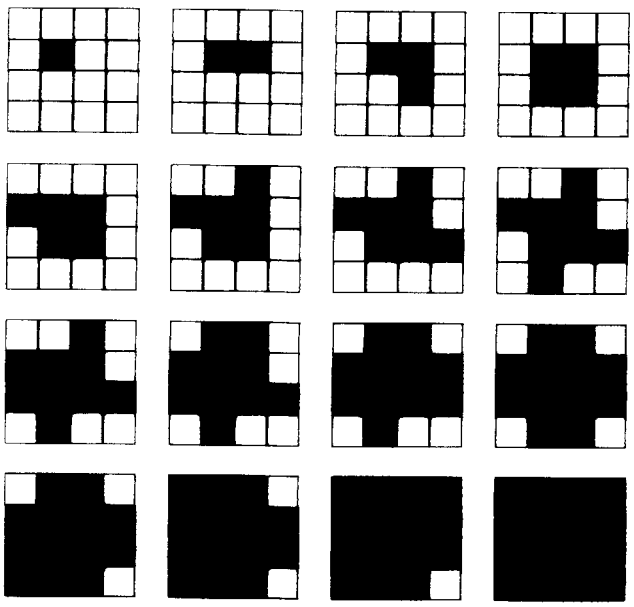
FIGS. 43 and 43B are views showing examples of binary halftone pattern.
Figure 43B:
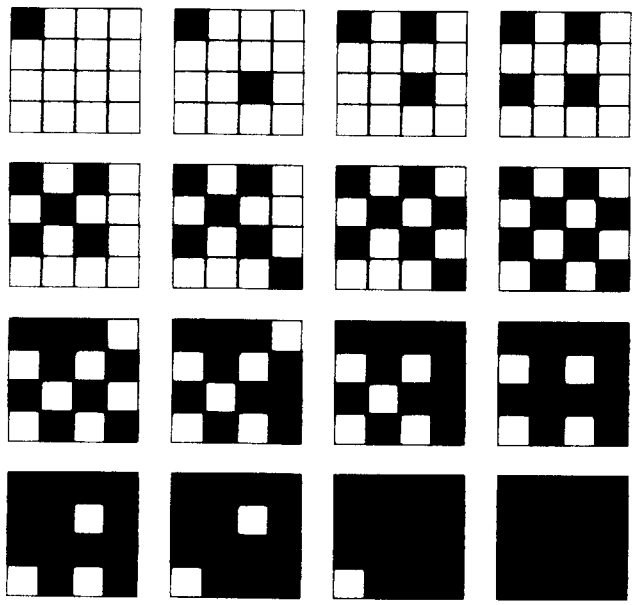

FIGS. 41A to 41C show the specific algorithm corresponding to the case shown in FIG. 38D. If X4=0, X8=0 and at least one of the areas Y1–Y8, X1 and X8 is "0" as shown in FIG. 41B and if the bits $1h=2g=3g=4f=5f=6e=7e=8d=9d=1$ and $1i=2h=3h=4g=5g=6f=7f=8e=9e=0$ as shown in FIG. 41A, the object pixel 5f is modified to x1=1, x2=1, x3=1 and x4=0.

In practice, each of the patterns shown in FIGS. 26A to 26D has a feature extraction pattern, which is laterally inverted with respect to the object pixel, so that there exist eight patterns in total. Similarly the patterns shown in FIGS. 37A to 37D have laterally inverted patterns (8 patterns in total).

Figure 27:
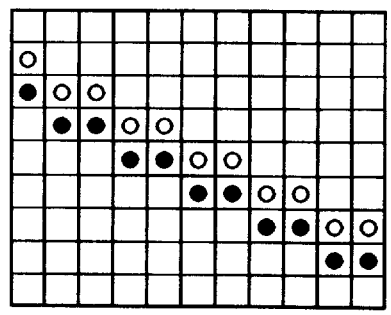
FIG. 27 is a view in which the pattern shown in FIG. 26A is laterally inverted.

As an example, the feature extracting pattern becomes as shown in FIG. 27 when laterally inverted. The smoothing algorithm in this case is to modify the object pixel 5f to x1=1, x2=1, x3=0 and x4=0 if $2a=3b=3c=4d=4e=5f=5g=6h=6i=7j=7k=0$ (white dots), $3a=4b=4c=5d=5e=6f=6g=7h=7i=8j=8k=1$ (colored dots), X7=X1=0 and at least one of the areas Y1–Y8, X3 and X4 is "1".

Similarly, laterally symmetrical algorithms are provided for the patterns shown in FIGS. 26B to 26D.

The use of laterally symmetrical algorithms for feature extraction provide symmetrical smoothing for the characters such as "O", "U", "V" and "W", thereby causing these characters in more natural manner.

Figure 18:
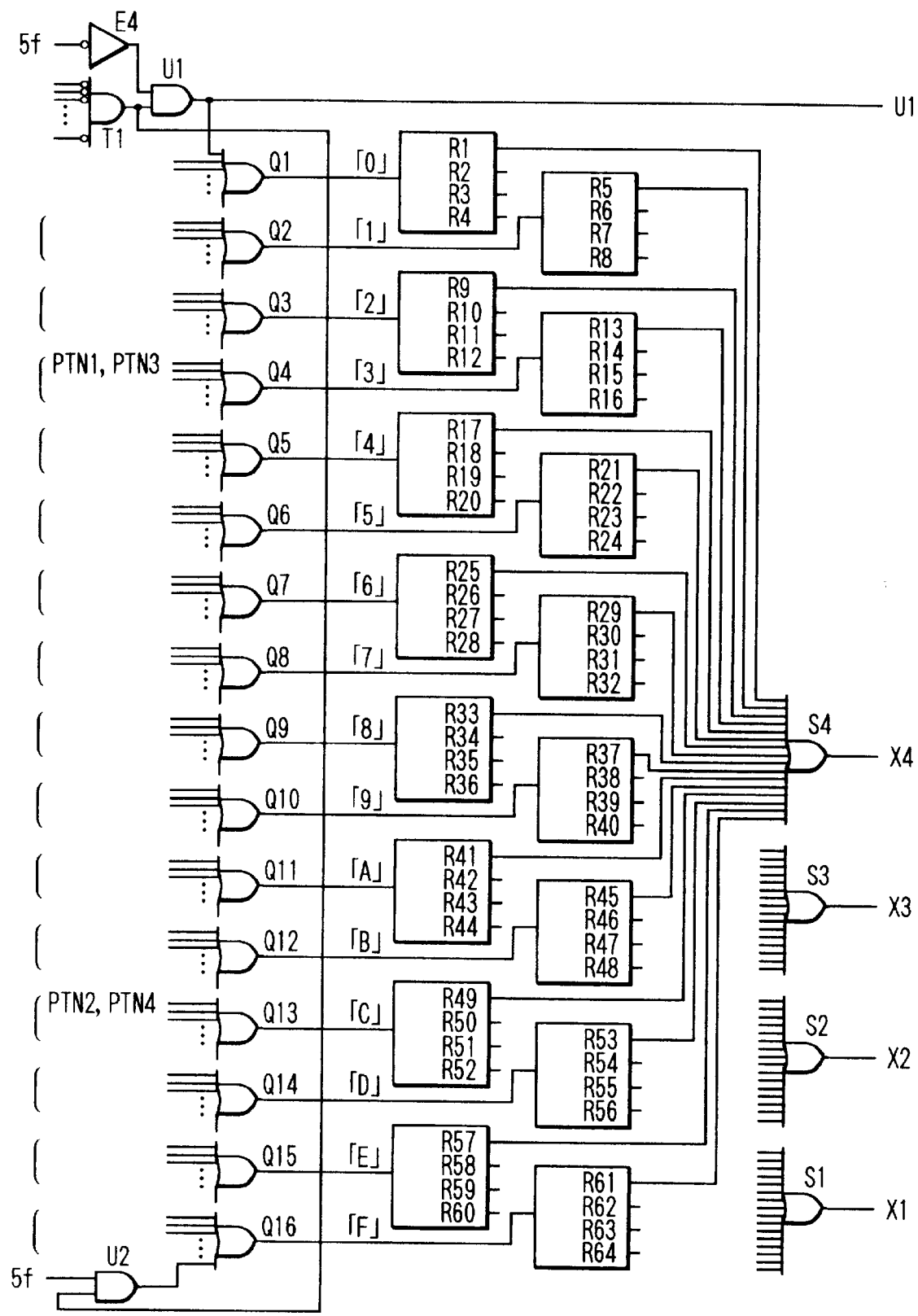
Figure 19:
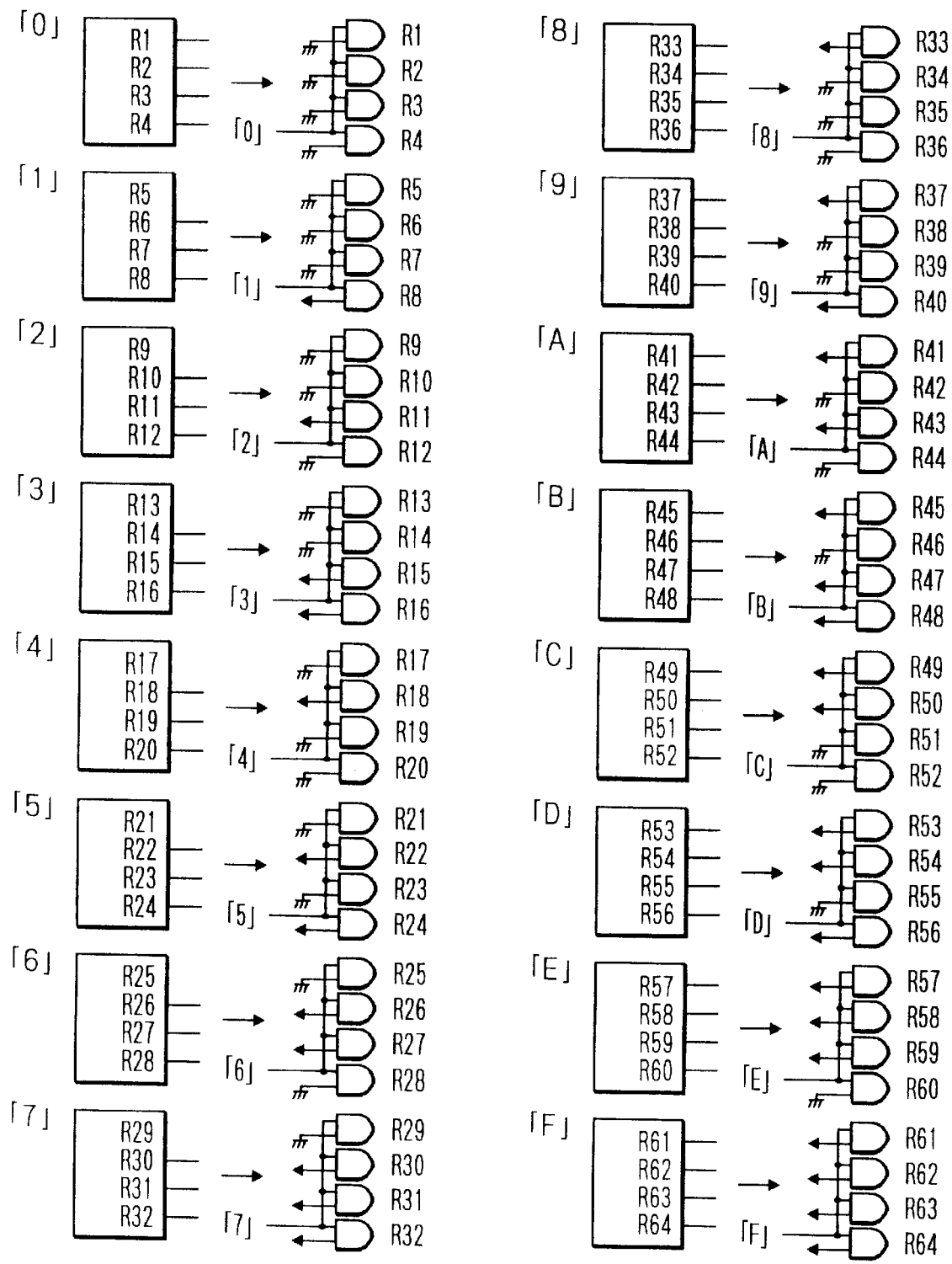
FIGS. 19(0) to 19(9) and 19(A) to 19(F) are detailed views of a part of FIG. 18.

FIGS. 18 and 19 are circuit diagrams of a data generation circuit for generating the data of the object pixel 5f, in response to the output signals of plural feature detecting circuits, including those explained above.

In said diagrams there are shown OR gates Q1–Q16, 2-input AND gates R1–R61, U1 and U2, 16-input OR gates S1–S4, an inverter E4 and a NOR gate T1. Each of the output signals of the plural feature extracting circuit is supplied to one of the OR gates Q1–Q16. For example the aforementioned outputs PN1, PN3 are supplied to the OR gate Q4, while those PN2, PN4 are supplied to the OR gate Q13.

Also all the output signals, including PN1–PN4, of the feature extracting circuits are supplied to the NOR gate T1. In response to an output "1" of the OR gates Q1–Q16, a code generating circuit consisting of four AND gates among those R1–R64 generates a 4-bit code from "0" to "F", consisting of a $2^0$ digit (from R4), a $2^1$ digit (from R3), a $2^2$ digit (from R2) and a $2^3$ digit (from R1).

Among these codes, the $2^0$ digit signals are supplied to the OR gate S1 and released as an output x1. Also the $2^1$ digit signals are supplied to the OR gate S2 and released as an output x2. The $2^2$ digit signals are supplied to the OR gate S3 and released as an output x3. Also the $2^3$ digit signals are supplied to the OR gate S4 and released as an output x4.

Thus, in response to the output of the OR gates Q1–Q16 of which only one is selected at a time, one of the codes "0" to "F" is released in the form of outputs x1–x4 of the OR gates S1–S4.

For example, for a code "3" there are obtained outputs x1=1, x2=1, x3=0 and x4=0, and, for a code "9" there are obtained x1=1, x2=0, x3=0 and x4=1.

The NOR gate T1, receiving all the feature coincidence signals, releases an output signal "1" even when none of said signals is "1" (namely in case of no coincidence of the features). In such state, if the object pixel 5f is a white dot, the 2-input AND gate U1 provides an output "1" to provide an output "1" from the OR gate Q1, thereby releasing a code "0" (x1=0, x2=0, x3=0, x4=0). Also if the object pixel 5f is a colored dot, the 2-input AND gate U2 provides an output "1" to provide an output "1" from the OR gate Q16, thereby releasing a code "F" (x1=1, x2=1, x3=1, x4=1). In this manner, if no coincidence is detected with the predetermined features, the signal of the object pixel 5f is conserved and printed without modification.

The outputs x1–x4 of said data generation circuit are converted by a known parallel-to-serial conversion circuit 44 into a signal VDOM released in succession in the order of x1, x2, x3 and x4 in synchronization with the clock signal VCK, and said VDOM signal drives the semiconductor laser 51 through the laser driver 50.

FIG. 25B shows the output image signal when a horizontal line with an angle not exceeding 45°, as shown in FIG. 25A, is smoothed with the above-explained algorithm. As will be apparent from these drawings, the smoothing is conducted in such a manner that the duration of pulses added to the left-side boundary of the line image is same, in time, as the duration of the pulses deleted from said left-side boundary. Same applies to the right-side boundary. Also the pulse duration added to the left-side boundary is selected equal to that added to the right-side boundary.

Also FIG. 36B shows the output image signal when a line with an angle exceeding 45°, shown in FIG. 36A, is subjected to the smoothing process. As will be apparent from these drawings, the duration of the signal added (or deleted) from the left-side boundary of the line image is selected same as that added (or deleted) from the right-side boundary. As a result, the width of the line after smoothing can be made same as that before the smoothing.

Such process prevents the smoothed line from becoming wider or thinner. Also it causes the line to appear similarly at the left-and right-side boundaries, thereby improving the quality of the line image.

Figure 63:
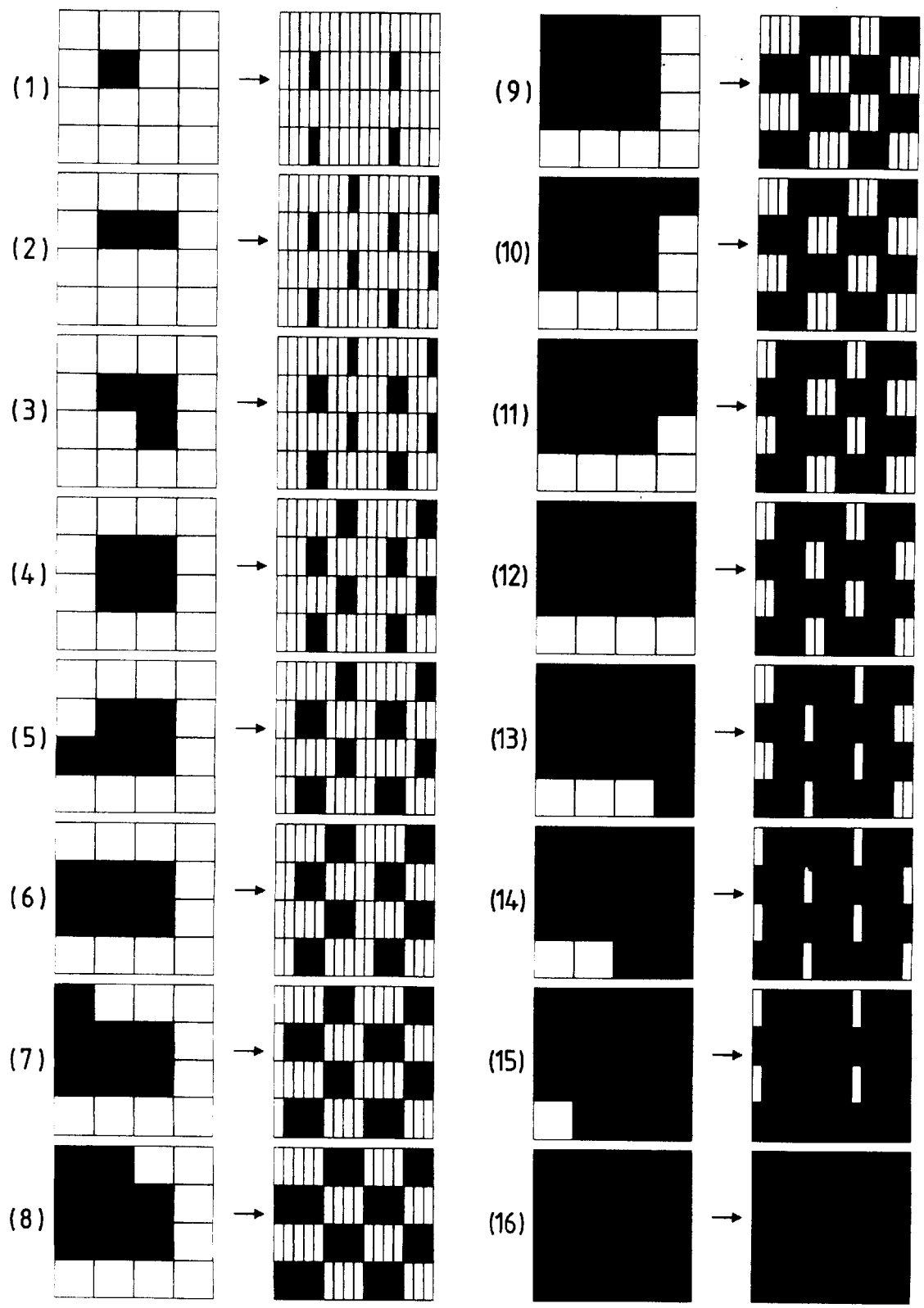

FIG. 63 shows the algorithm for extracting the feature of the dot pattern from the dot matrix area, identifying whether said feature is a part of binary halftone data such as a dither image, and, if this is the case, modifying the pixel pattern of 300 dot/inch into a pattern composed of finer dots (each dot being divided into four portions in the main scanning direction).

More specifically, in 16 density levels (1)–(16) shown in FIG. 63, a pixel pattern shown at the left-hand side is converted into a dot pattern shown at the right-hand side. In the example shown in FIG. 63, the conversion is executed in such a manner that the color-printed area does not vary by said conversion.

The modifying algorithm shown in FIG. 63 can naturally be attained by the addition of logics to the aforementioned circuit shown in FIG. 11, as will be explained further later.

As explained in the foregoing, the present embodiment can improve the image quality of color character images and also the image quality of color dither images by representation with finer dots.

[2nd embodiment]

The above-explained algorithms are applicable also to a case of receiving the pattern dot signal of 600 dot/inch and converting said signal into finer dots in the main scanning direction. For example, a conversion of the dot into a 4 times dot density in the main scanning direction provides a printing with dot densities of 2400 dot/inch in the main scanning direction and 600 dot/inch in the sub scanning direction, thereby achieving further improved image quality in the printed image.

In the foregoing first embodiment, there has been explained, in case of transmitting image data of 300 dot/inch in the main and sub scanning direction from the controller 200 to the printer engine unit capable of attaining a print density of 300 dot/inch in the sub scanning direction, an operation of obtaining a print density of 300 dot/inch in the sub scanning direction and an equivalent density of 4 times, or 1200 dot/inch, in the main scanning direction.

However the present invention is not limited to the foregoing embodiment. The equivalent print density in the main scanning direction is not limited to 4 times of that in the sub scanning direction, but can be, for example, 2, 3, 4, 5, 6, 7, 8, . . . times of the density in the sub scanning direction.

For example, in case of converting the print density to 8 times (2400 dot/inch) in the main scanning direction, the pattern generating unit of the circuit shown in FIG. 18 is so constructed that a pixel is composed of 8-bit sub signals (x1–x8) instead of 4-bit signals (x1–x4).

In the following there will be explained another embodiment, in which the image data of 300 dot/inch in the main and sub scanning directions are transmitted from the controller to the printer engine unit capable of attaining a print density of 600 dot/inch in the sub scanning direction, and there are attained an equivalent print density of 1200 dot/inch in the main scanning direction and an equivalent print density of 600 dot/inch in the sub scanning direction.

Figure 20:
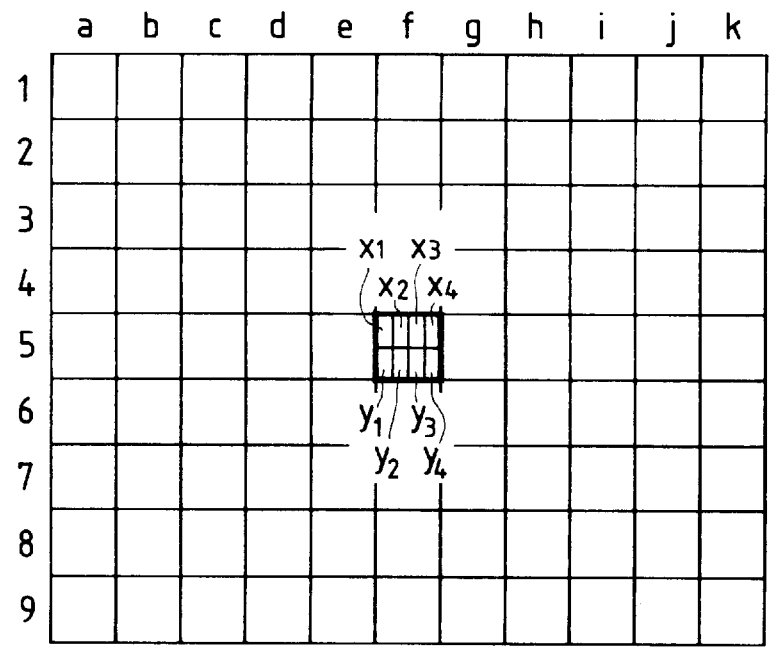
FIG. 20 is a view showing another embodiment of the present invention, in which the object pixel is divided in four portions in the main scanning directions and in two portions in the sub scanning direction.

FIG. 20 shows small pixel portions constituting the object pixel in the 2nd embodiment of the present invention. In said 2nd embodiment, as shown in FIG. 20, the object pixel 5$f$ at the center of a dot matrix of 11 dots in the main scanning direction and 9 dots in the sub scanning direction at 300 dot/inch, is modified to image data defined by a group of small pixel portions (x1, x2, x3, x4, y1, y2, y3, y4) with print densities increased 4 and 2 times respectively in the main and sub scanning directions.

The 2nd embodiment is to investigate, among the data transmitted from the controller, the feature of the image data in a peripheral area (11 pixels in the main scanning direction and 9 pixels in the sub scanning direction) surrounding the object pixel, and to modify said object pixel according the result of said investigation.

More specifically, for example in case of printing the object pixel in the dot data of an alphabetical character "a" of a resolving power of 300 dot/inch as shown in FIG. 9, the dot data of the peripheral area (99 pixels in total, arranged as a matrix of 11 pixels in the main scanning direction and 9 pixels in the sub scanning direction), surrounding said object pixel, are temporarily stored in a memory. Then the feature in said area is detected, and the data of the object pixel are modified according to the detected feature, in such a manner that the contour of the pattern constituted by the dots is printed more smoothly.

In the 2nd embodiment, as shown in FIG. 20, the object pixel is composed of small pixel portions divided in 4 and 2 respectively in the main and sub scanning directions (x1, x2, x3, x4; y1, y2, y3, y4). Consequently the printing operation is conducted with equivalent print densities of 1200 and 600 dot/inch respectively in the main and sub scanning directions.

Figure 21:
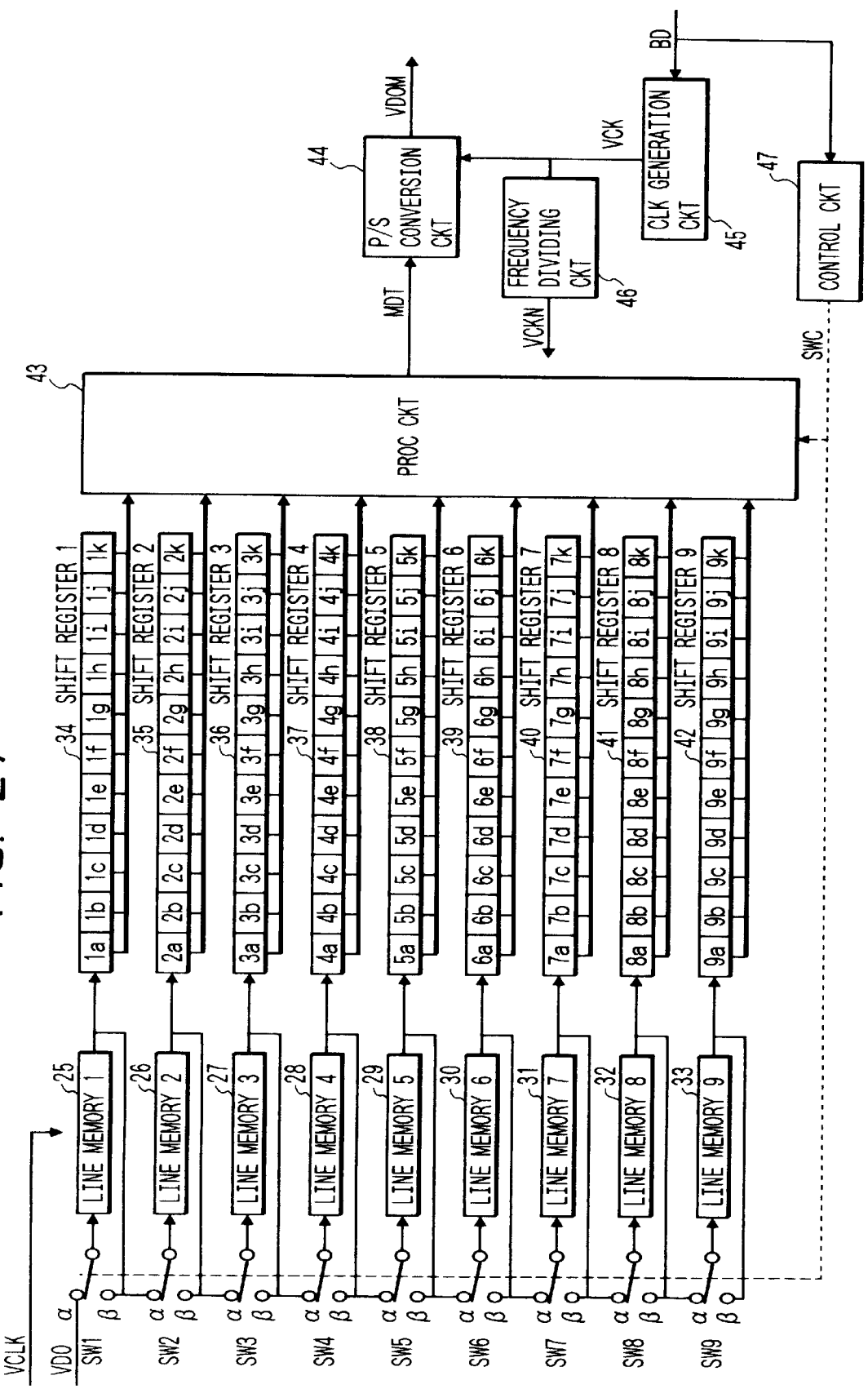
FIG. 21 is a block diagram for effecting a smoothing by dividing the object pixel in the main and sub scanning directions.

FIG. 21 is a block diagram of a VDO signal processing unit 101 provided in said printer engine unit of 600 dot/inch, and corresponds to FIG. 11 in the 1st embodiment. In FIG. 21, components equivalent to those of the 1st embodiment shown in FIG. 11 are represented by same numbers and will not be explained further.

In FIG. 21, switch means SW1–SW9 are shifted between positions α, β for switching the signals supplied to the line memories 25–33, and are controlled by a control signal SWC from a control circuit 47 to be explained later.

The control circuit 47 receives a synchronization signal BD' corresponding to the sub scanning of 600 dot/inch, and generates the control signal SWC which is inverted in synchronization with each entry of said synchronization signal BD'. The synchronization signal BD for interfacing with the controller is generated, corresponding to the sub scanning of 300 dot/inch, by skipping every other BD' signal.

The above-explained switch means function in the following manner.

At first the switch means SW1–SW9 are placed at the position α. The controller transmits the image data VDO of 300 dot/inch, in synchronization with the BD signal. The line memories 1–9 (25–33) store said image data VDO of 300 dot/inch, with successive shifts in synchronization with the clock signal VCLK. Each of said line memories can store the dot information of a main scanning length of the page to be printed. Also said lines memories are serially connected in the order from memory 1 to 9, thereby being capable of storing the dot information 9 main scanning lines arranged in the sub scanning direction.

Then the switch means SW1–SW9 are shifted to the position β by the control signal SWC from the control circuit 47. Shift registers 1–9 (34–42) respectively correspond to the line memories 1–9 (25–33) and receive the outputs of respectively corresponding line memories in synchronization with the clock signal VCKN. In this operation, the line memories 1–9 (25–33) receive again the output data of said line memories through the switch means SW1–SW9.

The shift registers 1–9 (34–42) have a capacity of 11 bits each, and constitute a dot matrix memory of 1$a$–1$k$, 2$a$–2$k$, . . . , 9$a$–9$k$ having 11 dots and 9 dots respectively in the main and sub scanning directions, as shown in FIG. 21. The central dot 5$f$ of said matrix memory is defined as an object dot (pixel).

A processing circuit 43 for detecting the feature of the data stored in the dot matrix memory and modifying said object pixel 5$f$ for smoothing receives the bit data (99 bits in total from 1$a$ to 9$k$) of the shift registers 1–9, and releases a modified parallel signal MDT (x1, x2, x3, x4).

Said parallel signal MDT is supplied to a parallel-to-serial conversion circuit 44, which converts the entered parallel signal MDT into a serial signal VDOM for driving the semiconductor laser 55 through the laser driver 50. A main scanning line is processed in succession in a similar manner.

Subsequently the switch means SW1–SW9 are shifted to the position α. Then, in synchronization with the next synchronization signal BD', the data are read from the line memories 1–9 as explained above and shifted respectively to the succeeding lines memories and are simultaneously supplied to the shift registers 1–9 (34–42).

The processing circuit 43 detects the feature of the data, supplied from the dot matrix memory of 11 dots in the main scanning direction and 9 dots in the sub scanning direction in the shift registers 1–9 (34–42), and, releases the parallel signal MDT (y1, y2, y3, y4) for modifying the object pixel 5$f$. The parallel-to-serial conversion circuit 44 converts the entered parallel signal MDT (y1, y2, y3, y4) into a serial signal VDOM, for driving the semiconductor laser 55 through the laser driver 50. A main scanning lines is processed in succession in a similar manner.

Subsequently the switch means SW1–SW9 are shifted to the position α, and the image signal VDO of 300 dot/inch of a next sub scanning line, transmitted from the controller, is entered.

As explained above, in this 2nd embodiment the parallel signal is composed of 4 bits, and the first MDT signal (x1, x2, x3, x4) and the second MDT signal (y1, y2, y3, y4) are released alternately, in synchronization with the BD' signal. A clock generator circuit 45 receives the main scanning synchronization signal BD' and generates a clock signal VCK synchronized therewith. Said signal VCK has a frequency equal to twice of the clock frequency f0 required for recording of 600 dot/inch in the main scanning direction.

Said serial signal VDOM (x1, x2, x3, x4 or y1, y2, y3, y4) is transmitted in succession, in synchronization with said clock signal VCK. A frequency dividing circuit 46 receives said clock signal VCK, divides the frequency thereof to ½ and generates a clock signal VCKN, which is used as the clock signal for fetching the dot data from said dot matrix to the processing circuit 43.

Within the processing circuit 43, the feature extracting circuits are same as those in the 1st embodiment, explained in relation to FIGS. 16, 18, 32 to 35. Also with said processing circuit 43, the data generation circuits employed in the present embodiment are shown in FIGS. 22 to 24, wherein same components as those in FIG. 18 are represented by same numbers.

Figure 22:
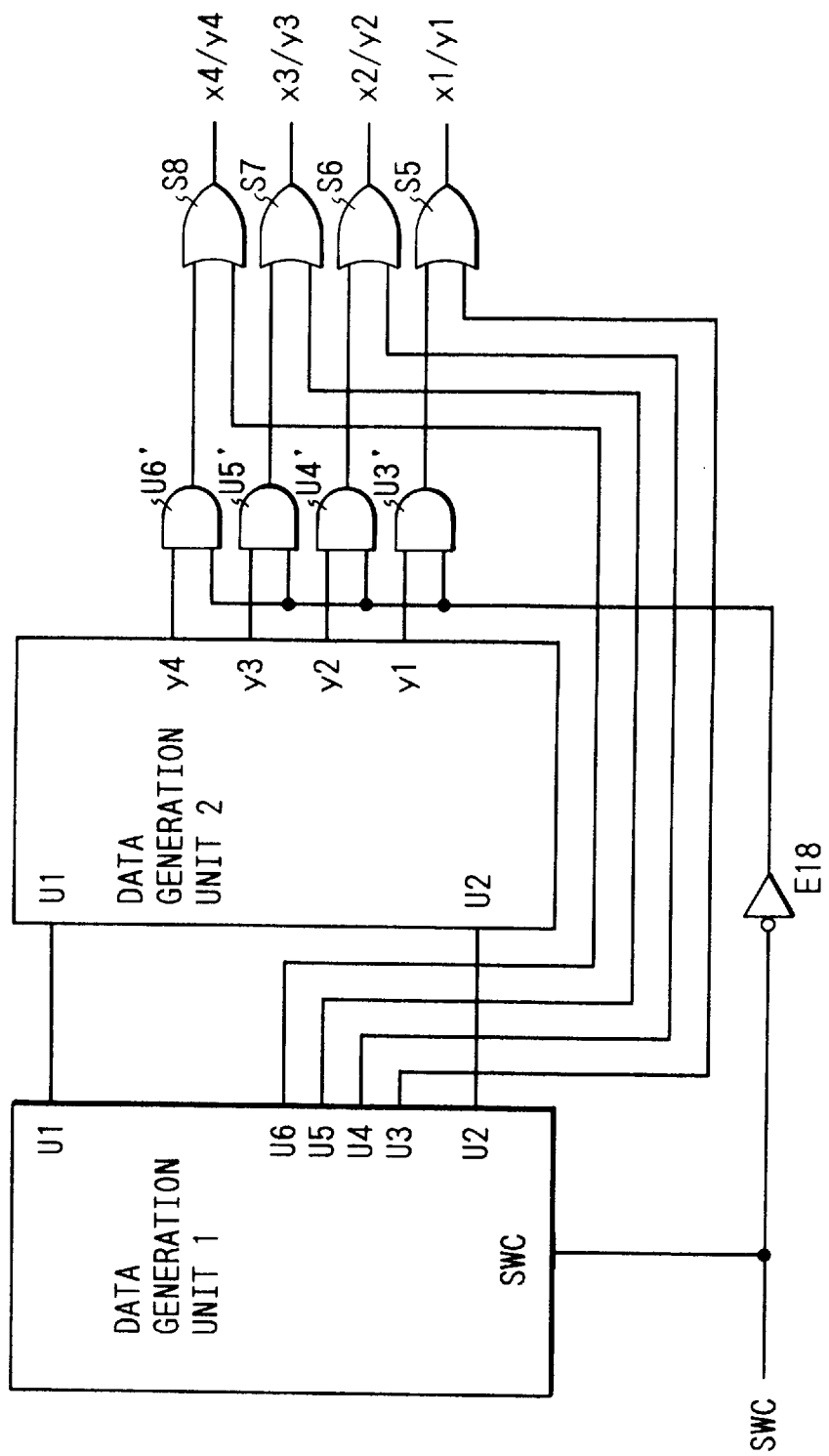
FIG. 22 is a view showing an example of the feature extracting unit in a 2nd embodiment of the present invention.
Figure 23:
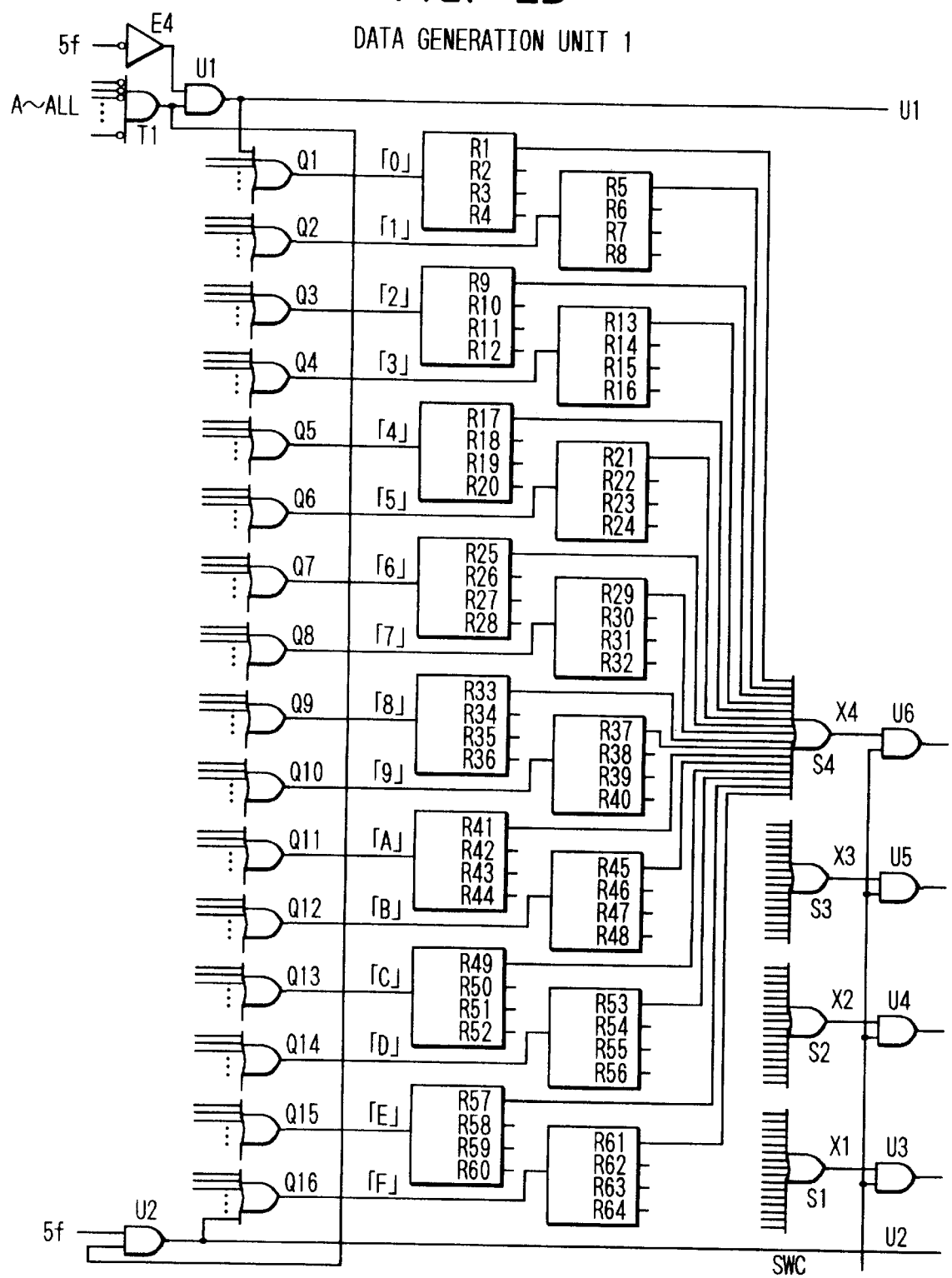
FIG. 23 is a detailed view of the data generation unit 1 shown in FIG. 22.
Figure 24:
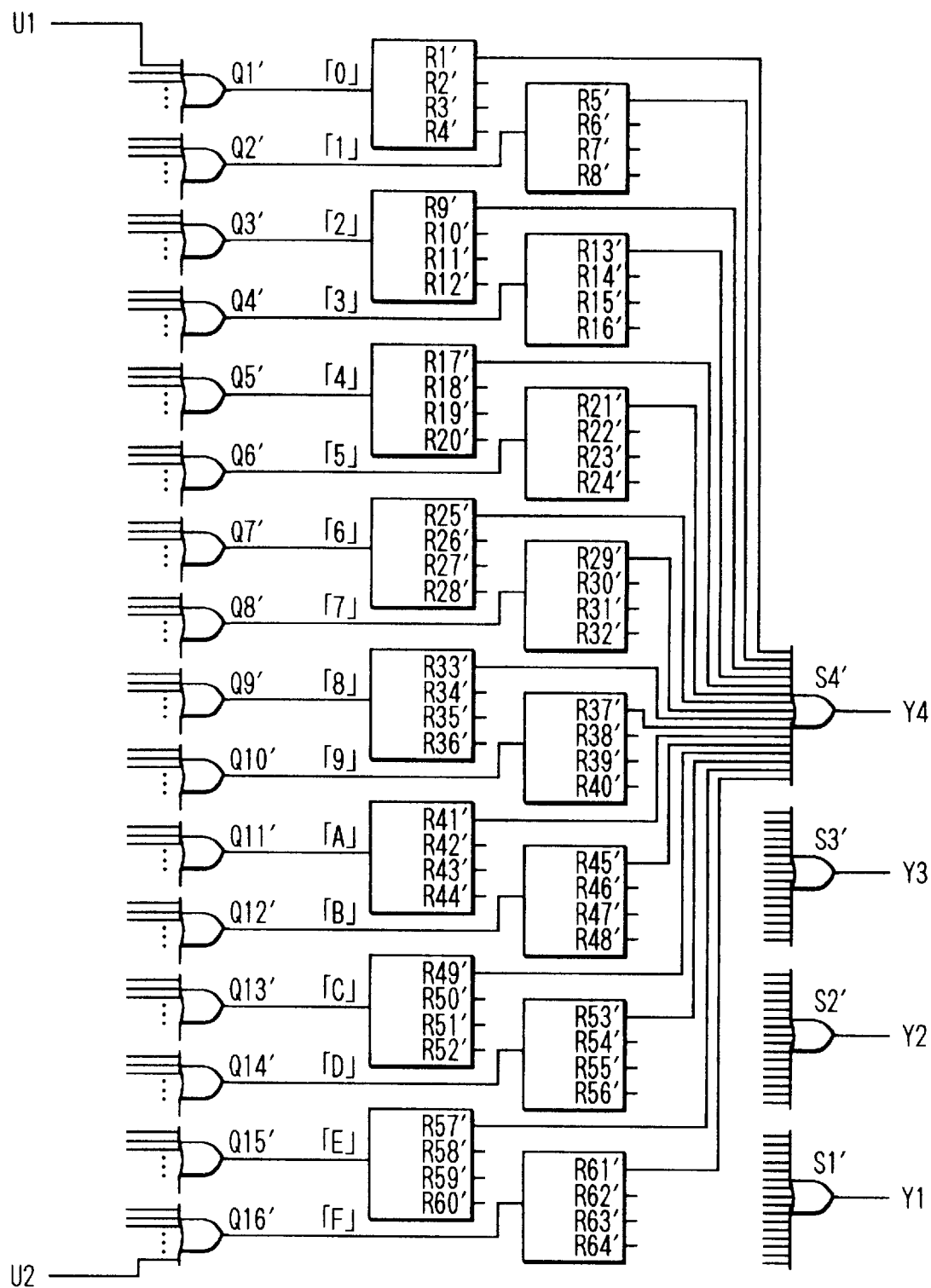
FIG. 24 is a detailed view of the data generation unit 2 shown in FIG. 22.

FIGS. 22 to 24 show the details of the data generation circuit for generating the data of the object pixel 5f, according to the detected feature of the data.

There are provided OR gates Q1–Q16, Q1'–Q16', 2-input AND gates R1–R61, R1'–R61', U1–U2, 16-input OR gates S1–S4, S1'–S4', S5–S8, inverters E4, E18, and a NOR gate T1.

In case of generating the first MDT signal explained in FIG. 21, the control signal SWC from the control circuit 47 assumes a level "1", whereby the data generation unit 1 is selected by the 2-input AND gates U3–U6, U3'–U6' and the 2-input OR gates S5–S8 to release the parallel signal x1, x2, x3, x4. Also in case of generating the second MDT signal explained in FIG. 21, the control signal SWC from the control circuit 47 assumes a level "0", whereby the data generation unit 2 is selected by the 2-input AND gates U3–U6, U3'–U6' and the 2-input OR gates S5–S8 to release the parallel signal y1, y2, y3, y4.

Each of the output signals of the feature extracting circuits corresponding to plural patterns is supplied to one of the OR gates Q1–Q16 for selecting the output data x1–x4, and also to one of the OR gates Q1'–Q16' for selecting the output data y1–y4.

The outputs x1–x4 of said data generation circuit are converted by a known parallel-to-serial conversion circuit 44 into the signal VDOM in which x1, x2, x3, x4 are released in succession, in synchronization with the clock signal VCK, while the output y1–y4 are similarly converted by said circuit 44 into the signal VDOM in which y1, y2, y3, y4 are released in succession in synchronization with the clock signal VKC, for driving the semiconductor laser through the laser driver.

The above-explained algorithm can also be applied to the aforementioned printer engine unit of 600 dot/inch.

Figure 45:
FIGS. 45(1) to 45(16) are views showing examples of conversion of the binary halftone pattern in the present embodiment.
Figures 46A, 46B:
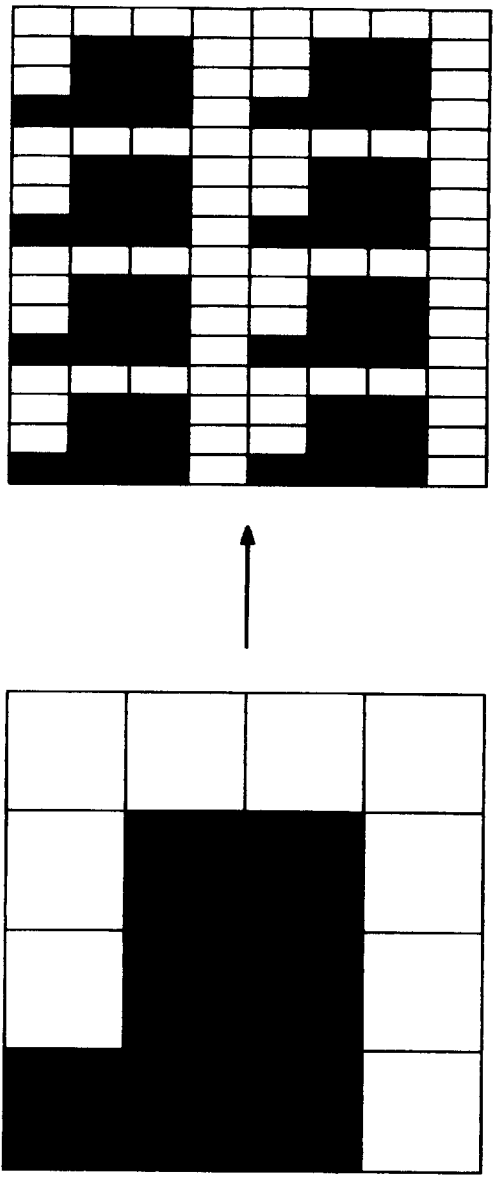
FIGS. 46A and 46B are views showing examples of conversion of the binary halftone pattern in the present embodiment.
Figure 50A:
Figure 50B:
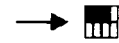
Figure 50C:
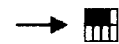
Figure 50D:
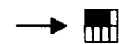
Figure 51A:
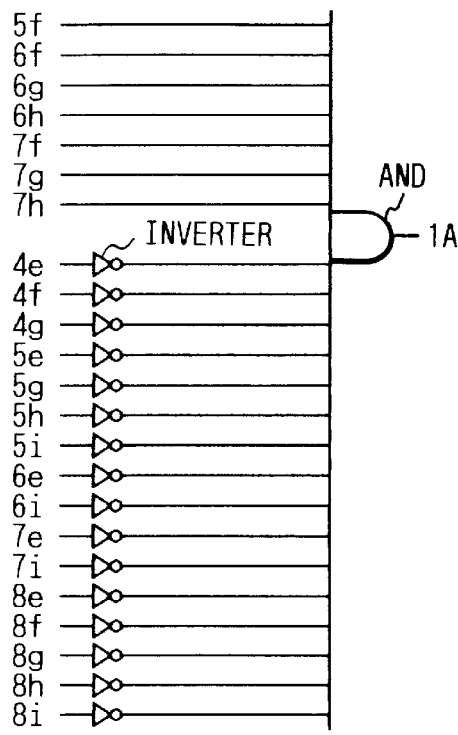
FIGS. 51A to 54D are views showing examples of the logic circuit for pattern reference for conversion of the binary halftone pattern in the present embodiment.
Figure 51B:
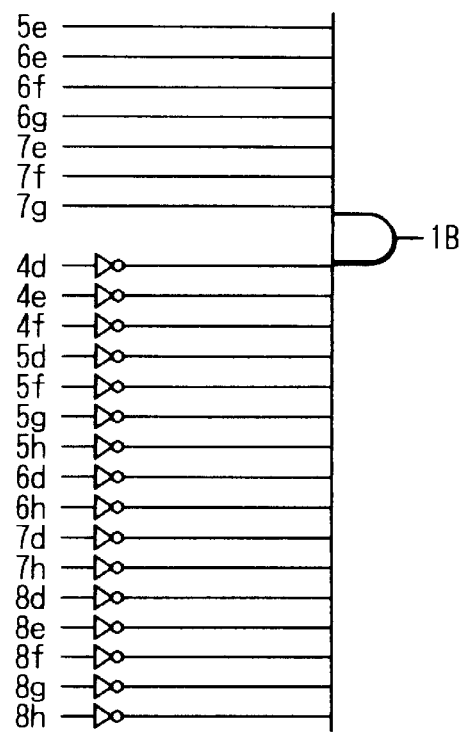
Figure 51C:
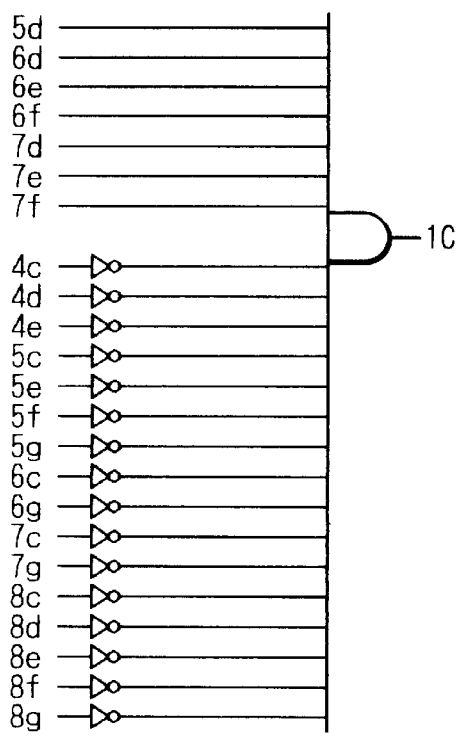
Figure 51D:
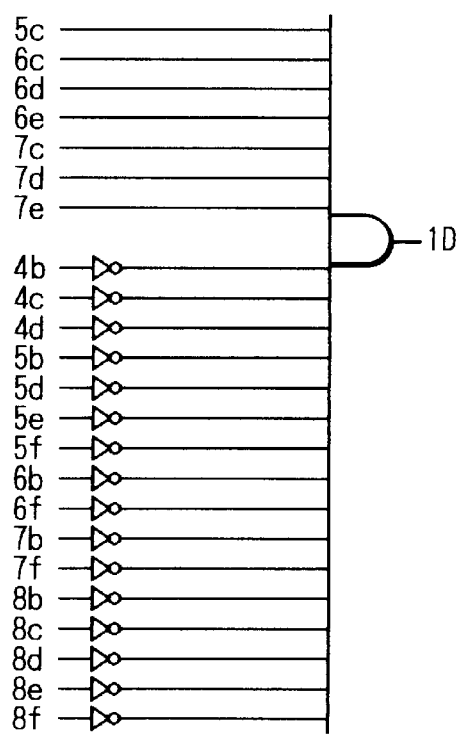
Figure 52A:
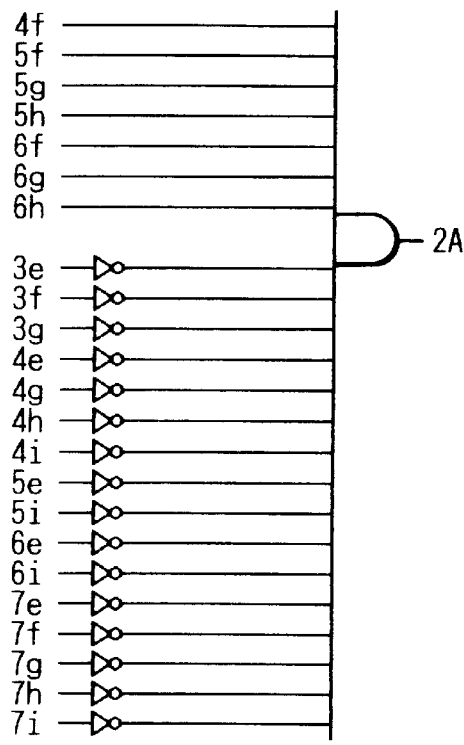
Figure 52B:
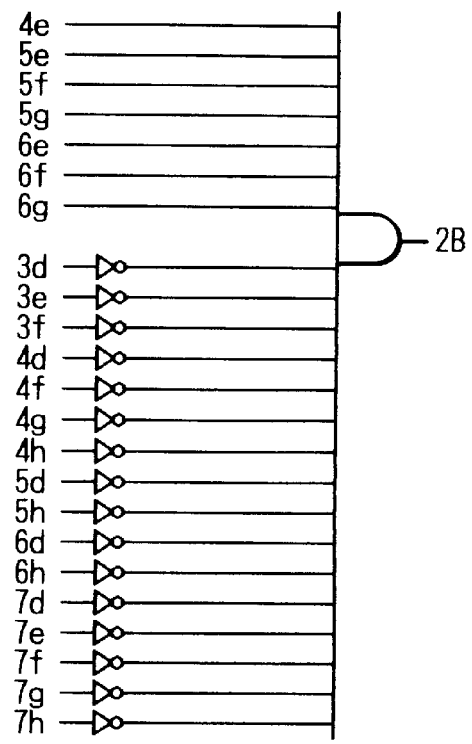
Figure 52C:
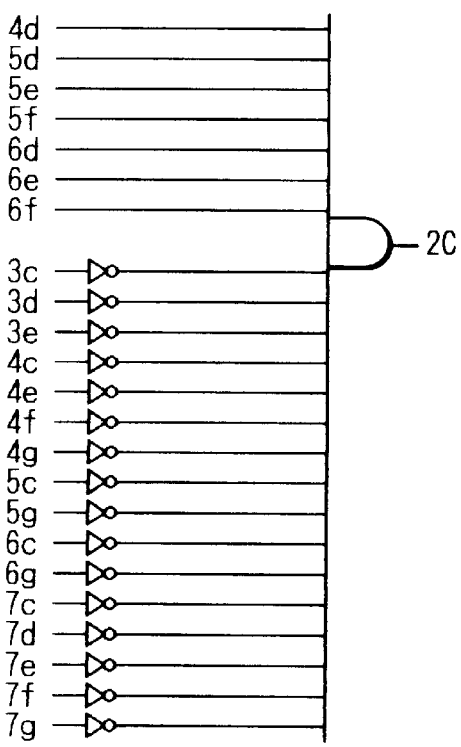
Figure 52D:
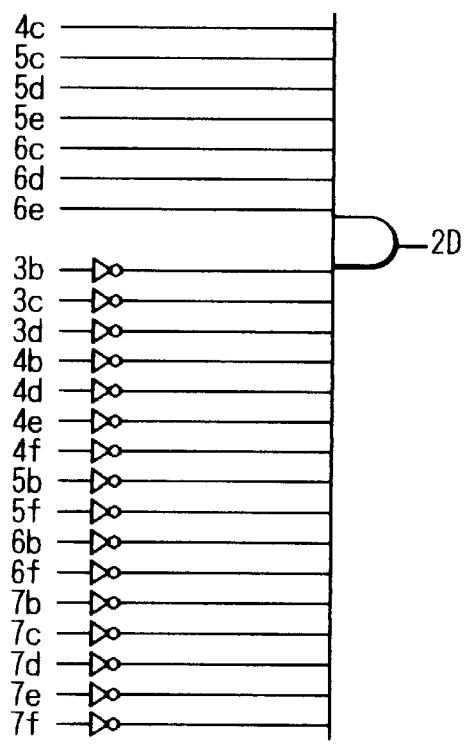
Figure 53A:
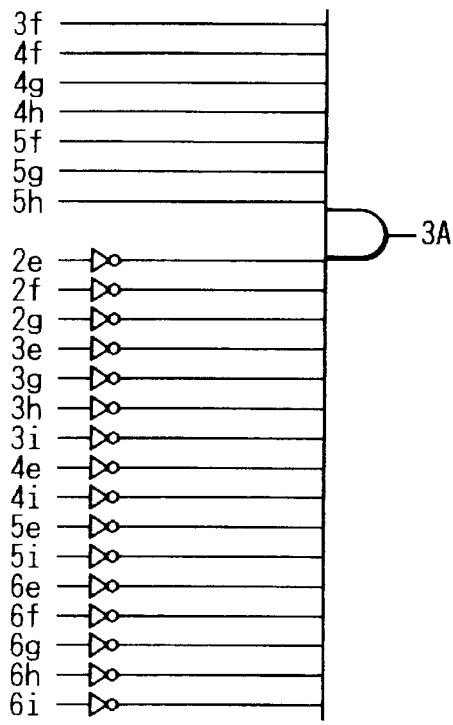
Figure 53B:
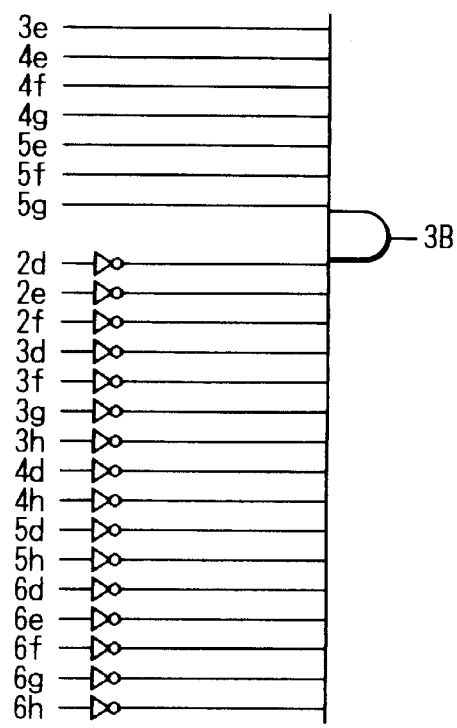
Figure 53C:
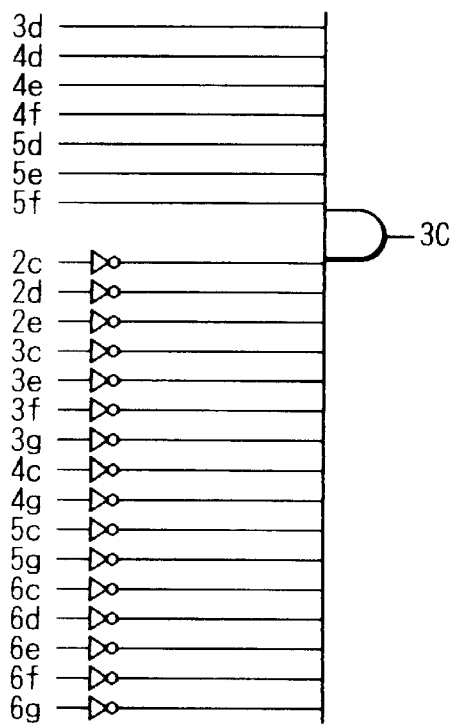
Figure 53D:
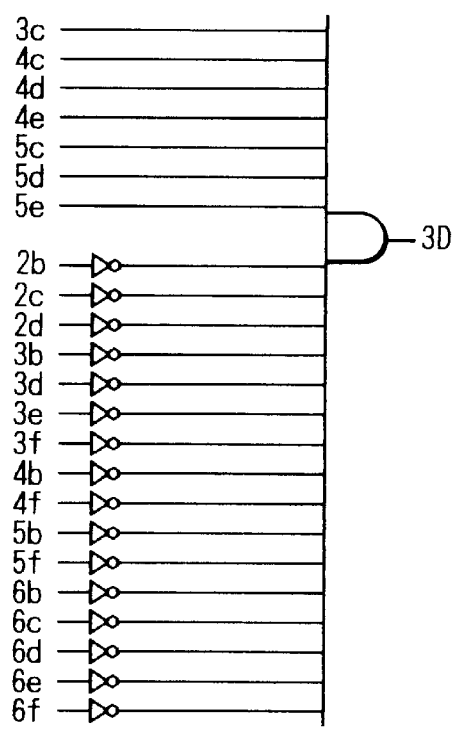
Figure 54A:
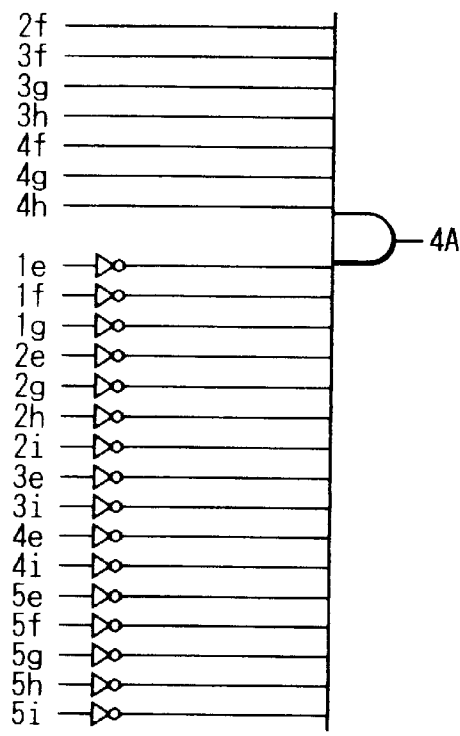
Figure 54B:
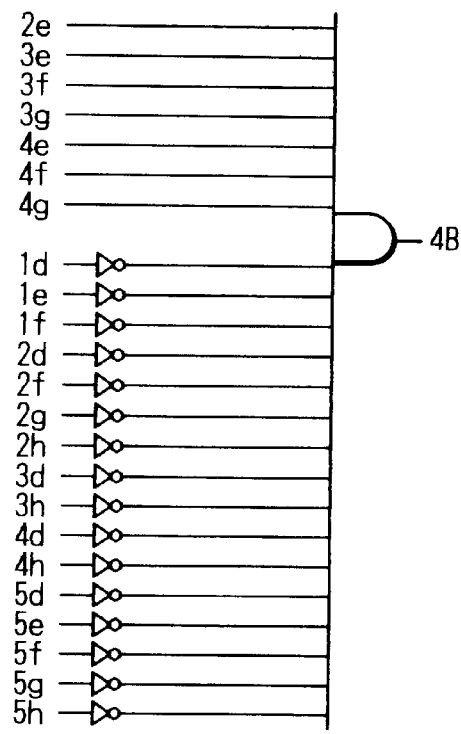
Figure 54C:
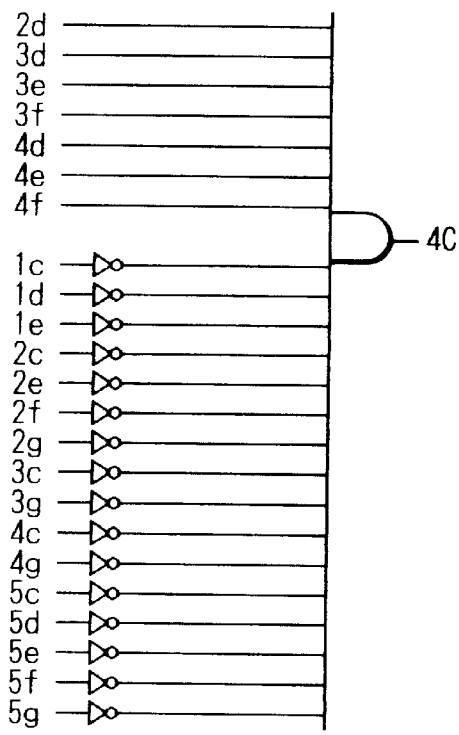
Figure 54D:
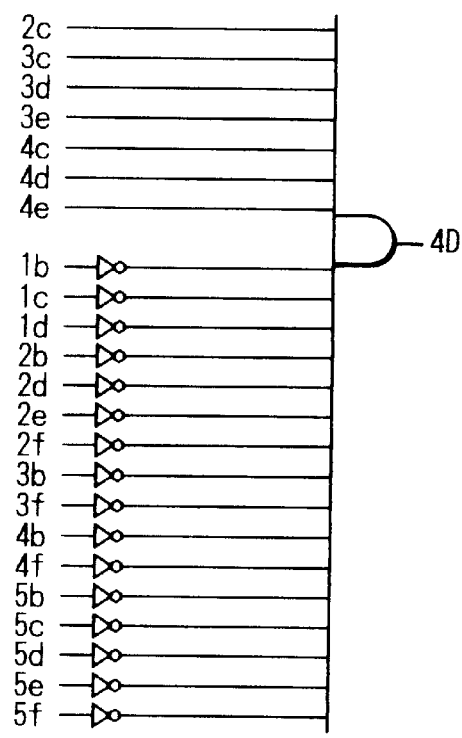

FIG. 45 illustrates an algorithm of the 2nd embodiment, for extracting the feature of the dot pattern in the dot matrix area, investigating whether said feature is a part of binary halftone data, such as a dither image, and, if this is the case, modifying the pattern into a pattern composed of finer dots (dot being divided into 4 portions in the main scanning direction).

In FIG. 45, for each of 16 density levels (1)–(16), the pattern at the left-hand side is converted into the pattern at the right-hand side. FIG. 45 shows an example of conversion which does not vary the color-printed area by said conversion.

In the following there will be given a detailed explanation on an example of the algorithm for the above-mentioned pattern conversion.

FIGS. 47A to 50D show an example of the algorithm for converting a pattern, shown at the left-hand side in FIG. 76, to a pattern at the right-hand side, by referring to the matrix area composed of 11 dots in the main scanning direction and 9 dots in the sub scanning direction.

In said drawings, the reference dots marked with "o" are printed with the toner color, while those marked with "x" are non-printed dots. The dots without marks are not referred to, or can be printed with the toner color or not printed.

In each of FIGS. 47A to 50D, when matrix data at the left-hand side are detected, the data of the object pixel 5f are converted to data of a higher density, 4 times in the main scanning direction and twice in the sub scanning direction, shown at the right-hand side.

Figures 47A, 47B, 47C, 47D:
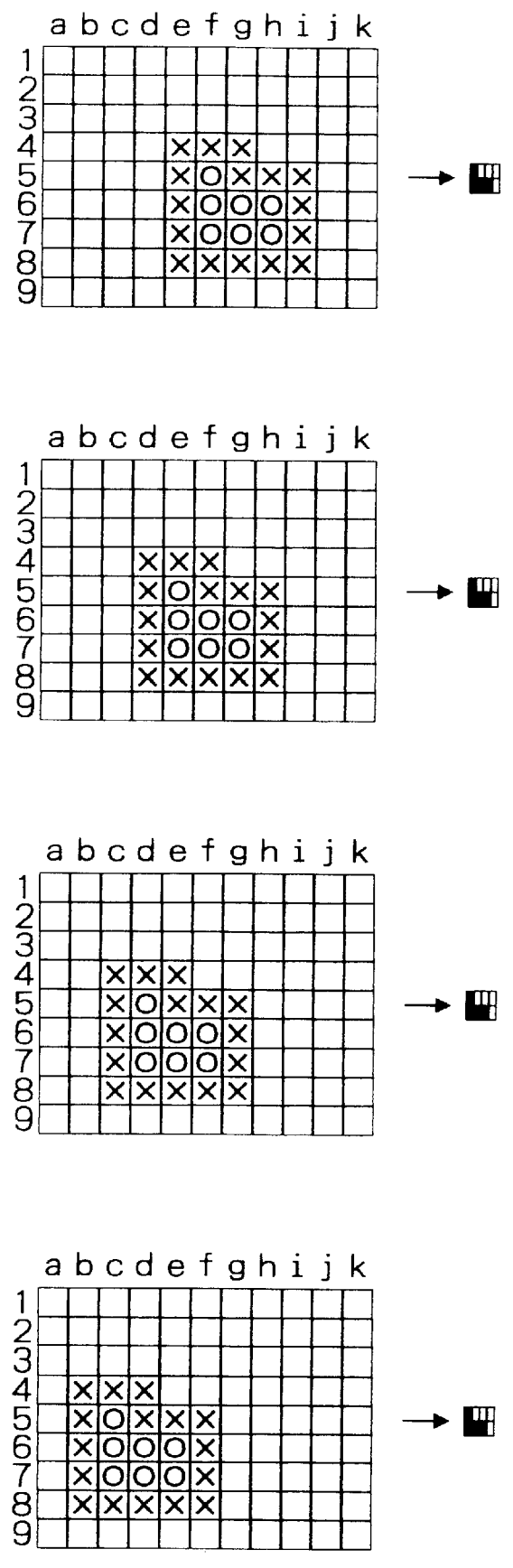

As an example, in FIG. 47A, if the bits 5f, 6f, 6g, 6h, 7f, 7g and 7h are "o" or the dots to be printed with the toner color and the bits 4e, 4f, 4g, 5e, 5g, 5h, 5i, 6e, 6i, 7e, 7i, 8e, 8f, 8g, 8h and 8i are "x" or the dots to be unprinted, the conversion is made to x1=1, x2=0, x3=0, x4=0, y1=1, y2=1, y3=1 and y4=0.

FIGS. 51A to 54D illustrate logic circuits for realizing the algorithm shown in FIGS. 47A to 50D. For example, the logic circuit shown in FIG. 51A corresponds to the algorithm shown in FIG. 47A. Said circuit is composed of 16 inverters and an AND gate. Seven signals of the bits 5f, 6f, 6g, 6h, 7f, 7g and 7h are supplied to said AND gate. Also sixteen signals of the bits 4e, 4f, 4g, 5e, 5g, 5h, 5i, 6e, 6i, 7e, 7i, 8e, 8f, 8g, 8h and 8i are supplied, respectively through said inverters, to the AND gate.

The output signals 1A–4D of these AND gates are supplied, together with the pattern coincidence signals from the smoothing circuit for the characters and patterns, to the corresponding OR gates Q1–Q16, Q1'–Q16' shown in FIGS. 23 and 24, thereby generating signals x1, x2, x3, x4, y1, y2, y3, y4.

If the smoothing circuit generates a coincidence signal and a dither coincidence signal is generated at the same time, the logic circuit is preferably so constructed as to give the priority to either coincidence signal, for example enabling the coincidence signal of the smoothing circuit only and disabling the dither coincidence signal.

In the following there will be explained the function of the second embodiment for improving the image quality of the dither image by means of the above-explained algorithm.

Figure 55:
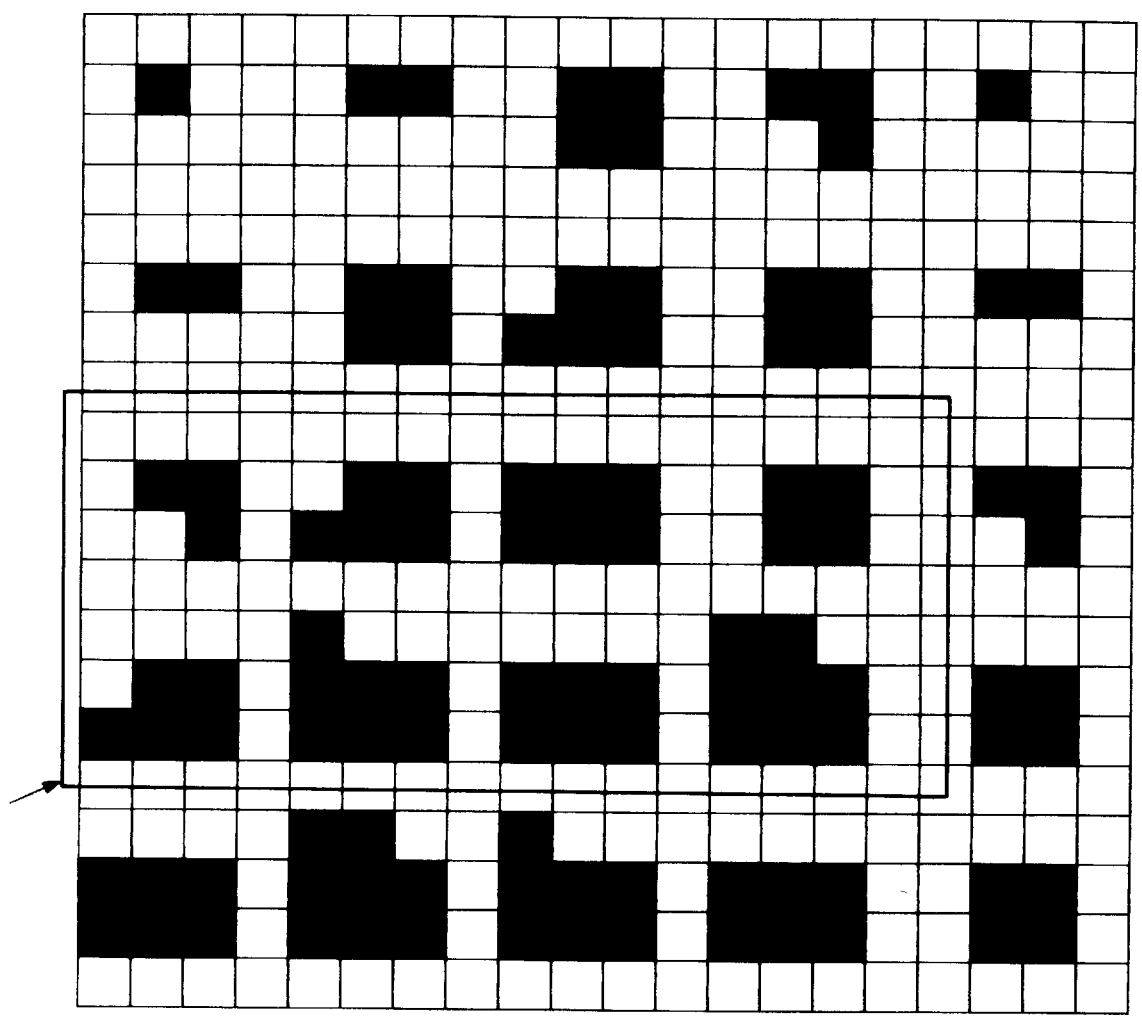
FIG. 55 is a partial magnified view of a binary halftone image in the present embodiment.
Figure 57B:
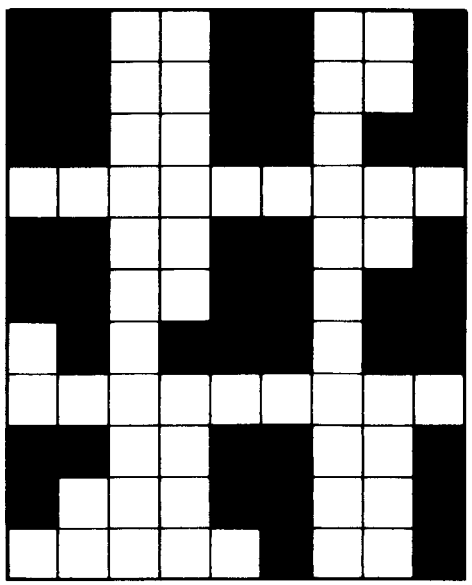
Figure 57D:
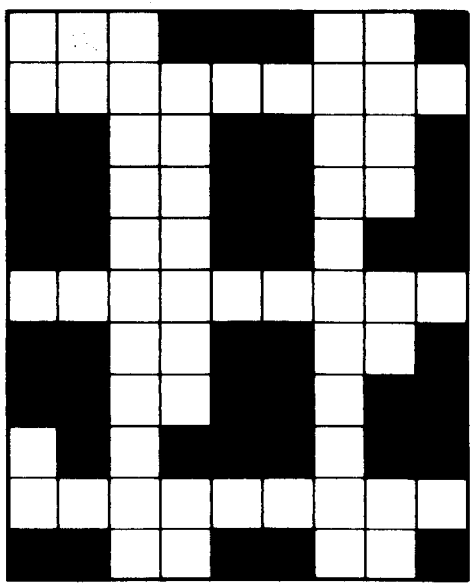
Figure 57A:
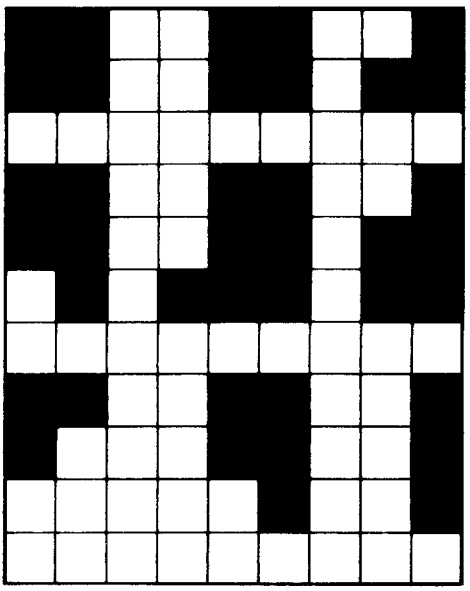
Figure 57C:
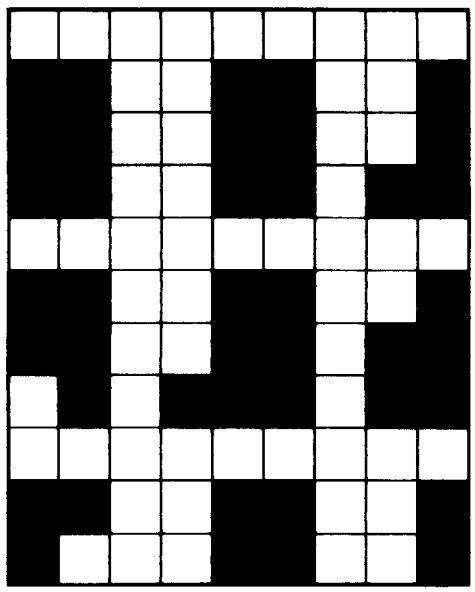
Figure 58B:
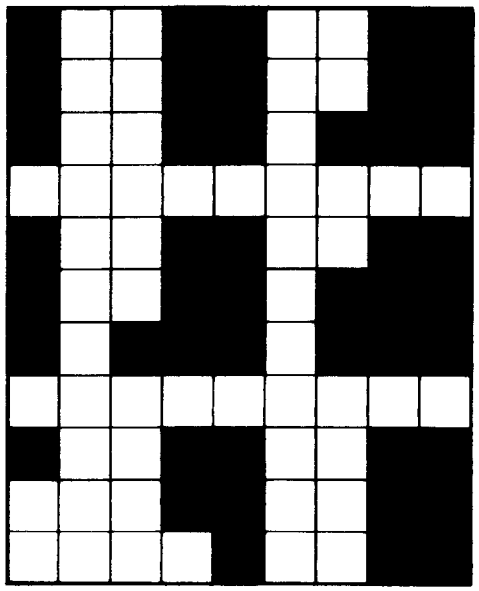
Figure 58D:
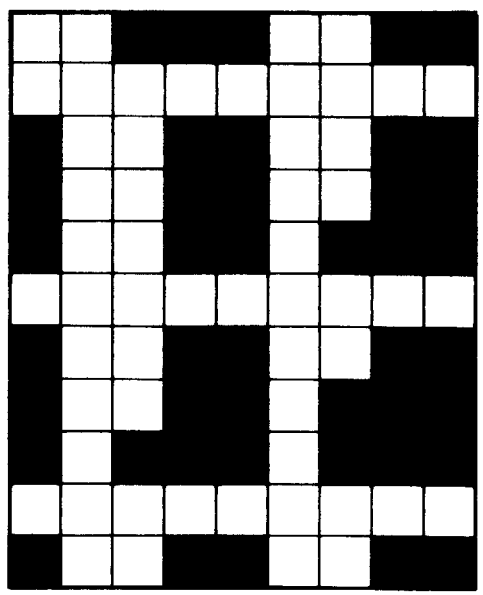
Figure 58A:
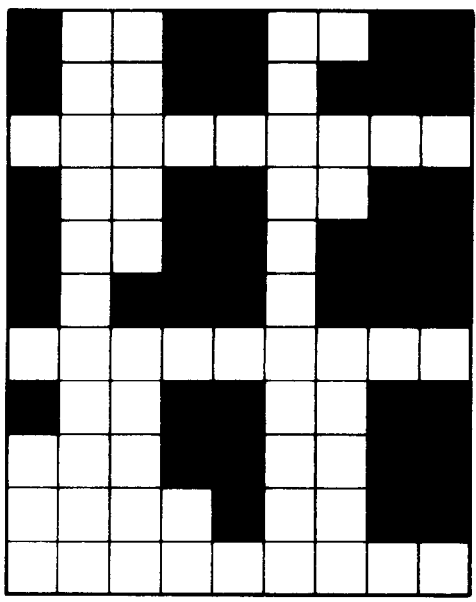
Figure 58C:
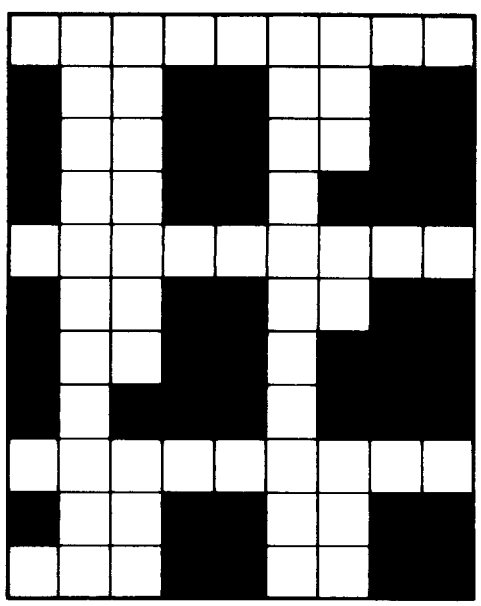
Figure 59A:
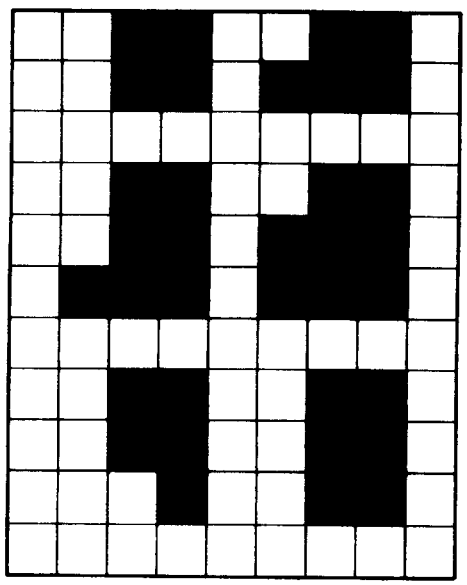
Figure 59B:
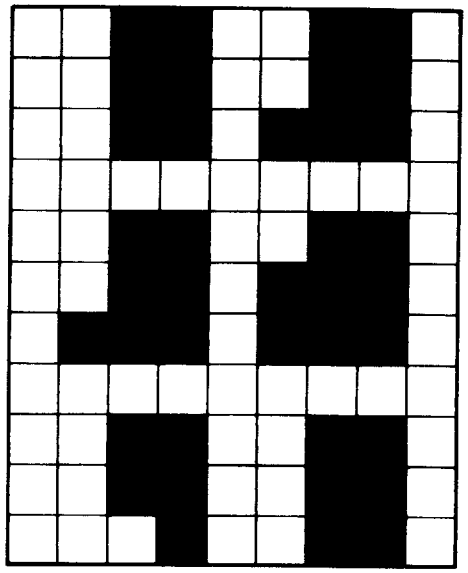
Figure 59C:
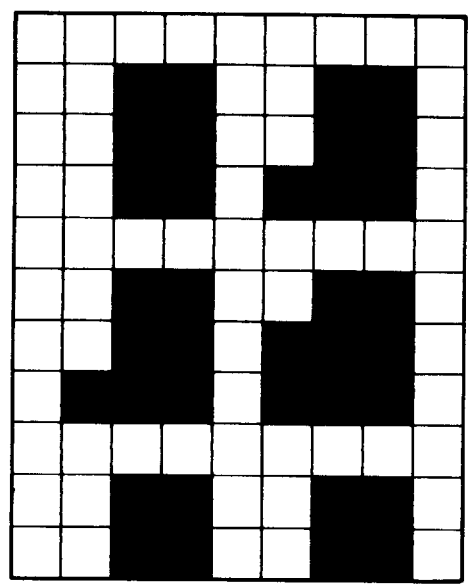
Figure 59D:
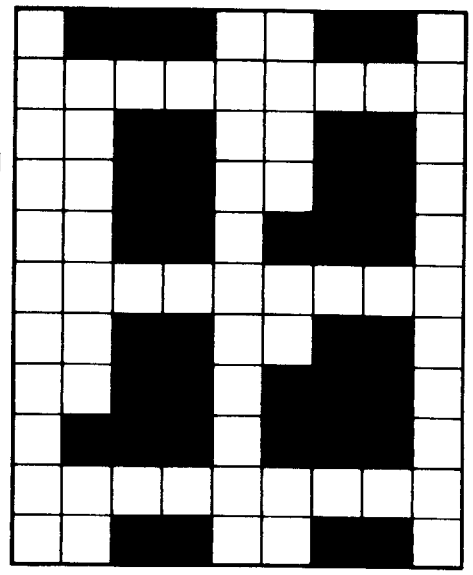

FIG. 55 is a partial magnified view of a dither image developed with a dot density of 300 dot/inch. The following explanation specifies the dot conversion in a framed portion indicated by an arrow.

FIGS. 56A to 59D show the mode of reference to the dots in the framed area shown in FIG. 55, within the matrix reference area composed of 11 dots in the main scanning direction and 9 dots in the sub scanning direction. More specifically, FIGS. 56A to 56D show the states when the reference area is shifted by a dot at a time in the main scanning direction, while FIGS. 57A to 57D, 58A to 58D and 59A to 59D show the states in case said reference area is shifted in the sub scanning direction.

Reference is made to the reference patterns including those in FIGS. 47A to 50D, and, in case of a coincidence with a reference pattern, the dot of the object pixel 5f is modified. As an example, the pattern shown in FIG. 56A coincides with that shown in FIG. 47A. Thus the dot conversion by the algorithm shown in FIGS. 47A to 51C varies the framed area in FIG. 55 to a finer dot pattern as shown in FIG. 60B, without local variation of the color-printed area. In this manner the image quality of a binary halftone image, such as a dither image, can be improved without influence on the image density.

FIGS. 61A and 61B shows an example of dot conversion of the framed area in FIG. 55, with another algorithm. In this case the reference is made also to an adjacent dither pattern, and density interpolation is conducted with the adjacent data. As will be apparent from FIG. 61B, the density appears smoother than in FIG. 60B, so that the image quality is further improved.

A further improvement in the image quality is possible by so-called edge enhancement, for enhancing the image contour in the dither image, by referring to the adjacent pattern and varying the pattern of conversion according to the amount of variation in the pattern density.

Figure 62:
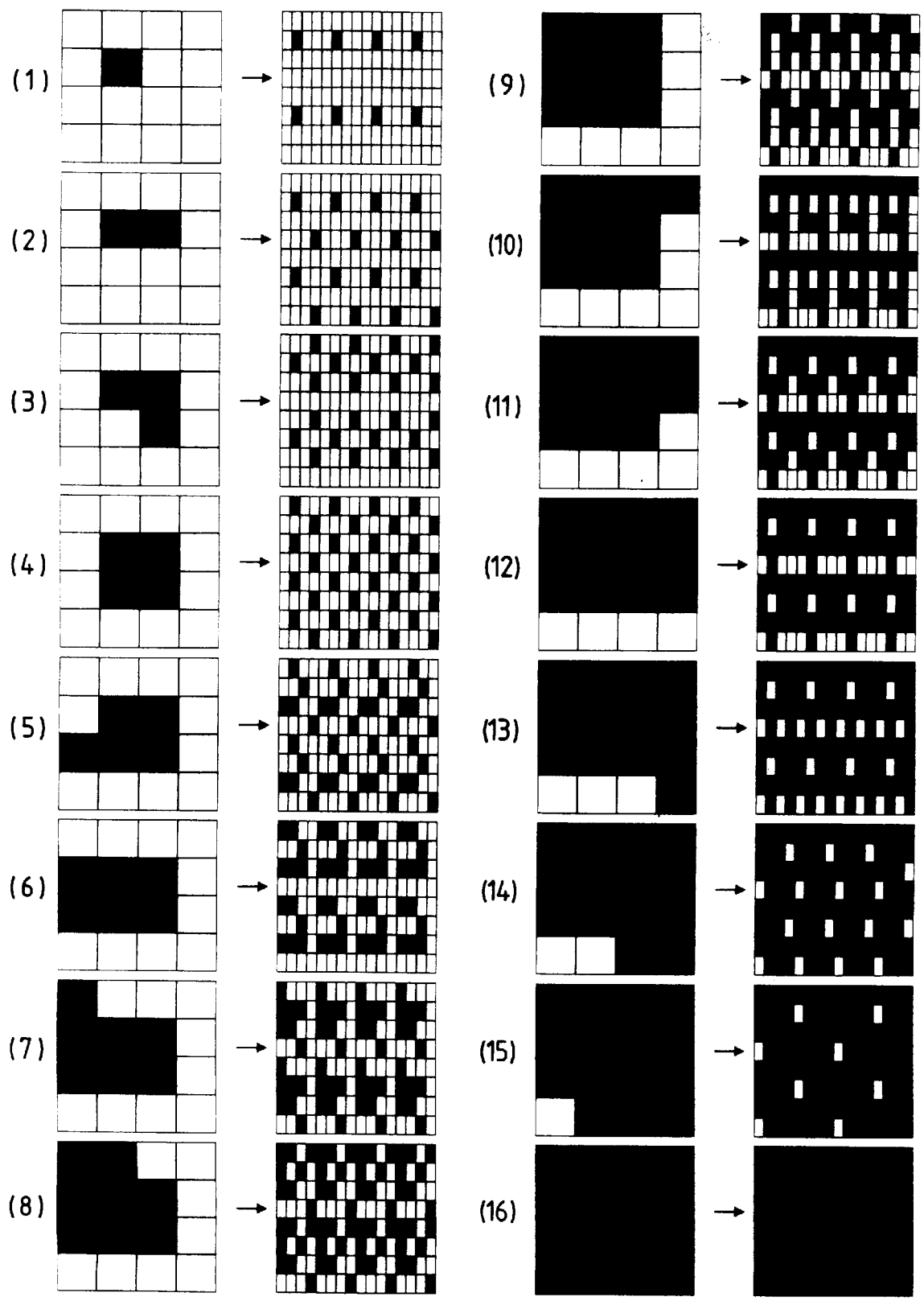

FIG. 62 shows another example of pattern conversion, in case of dot conversion for the pattern shown in FIG. 45. As will be apparent from comparison of FIGS. 45 and 62, the color-printed area is varied by the conversion. This shows an example of density variation, matching the density characteristics of the printer, at the conversion to finer dots.

Figure 64:
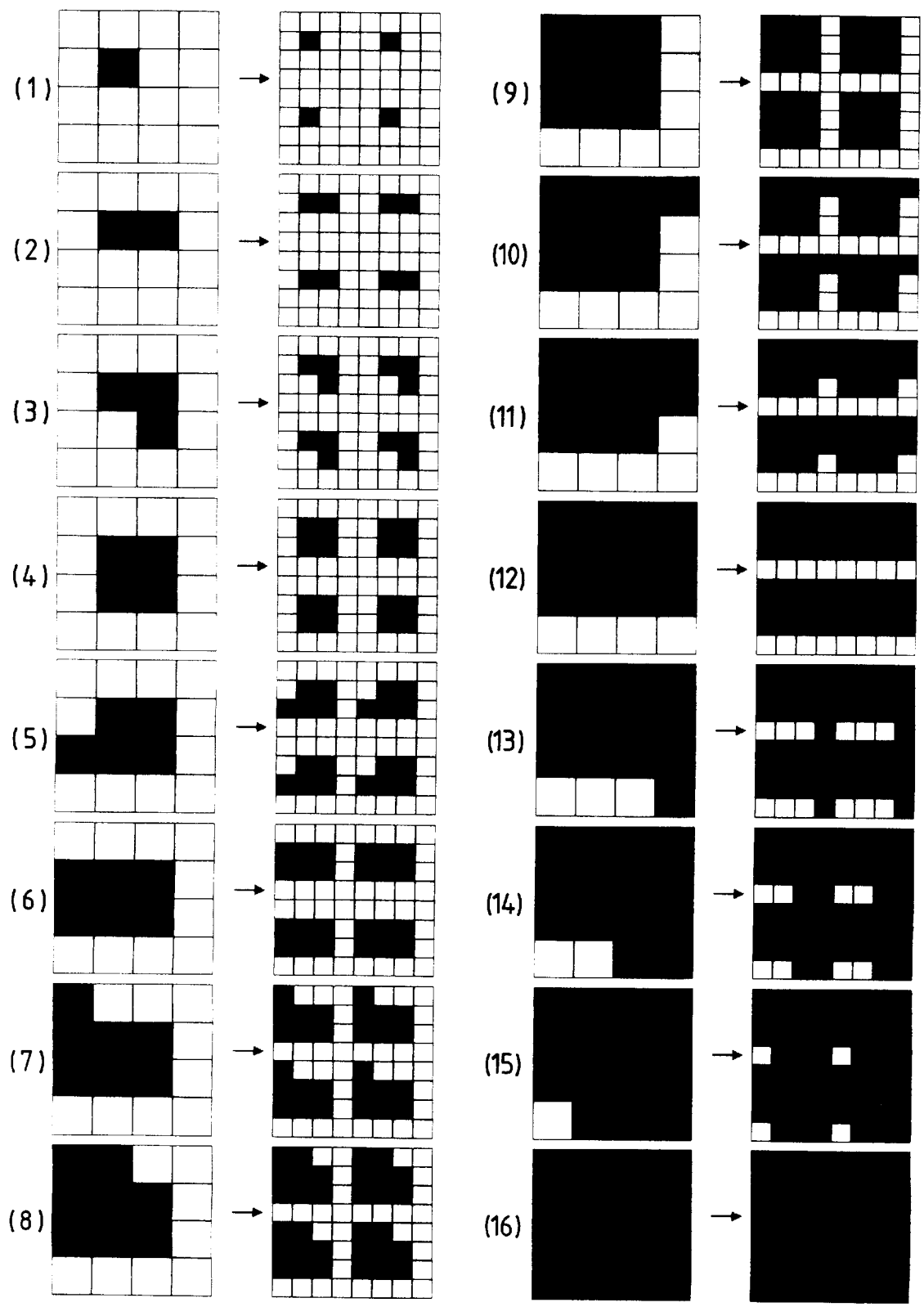

FIG. 64 shows an example of conversion of the data of 300 dot/inch, twice in the main and sub scanning direction, to those of 600 dot/inch.

Figure 65:
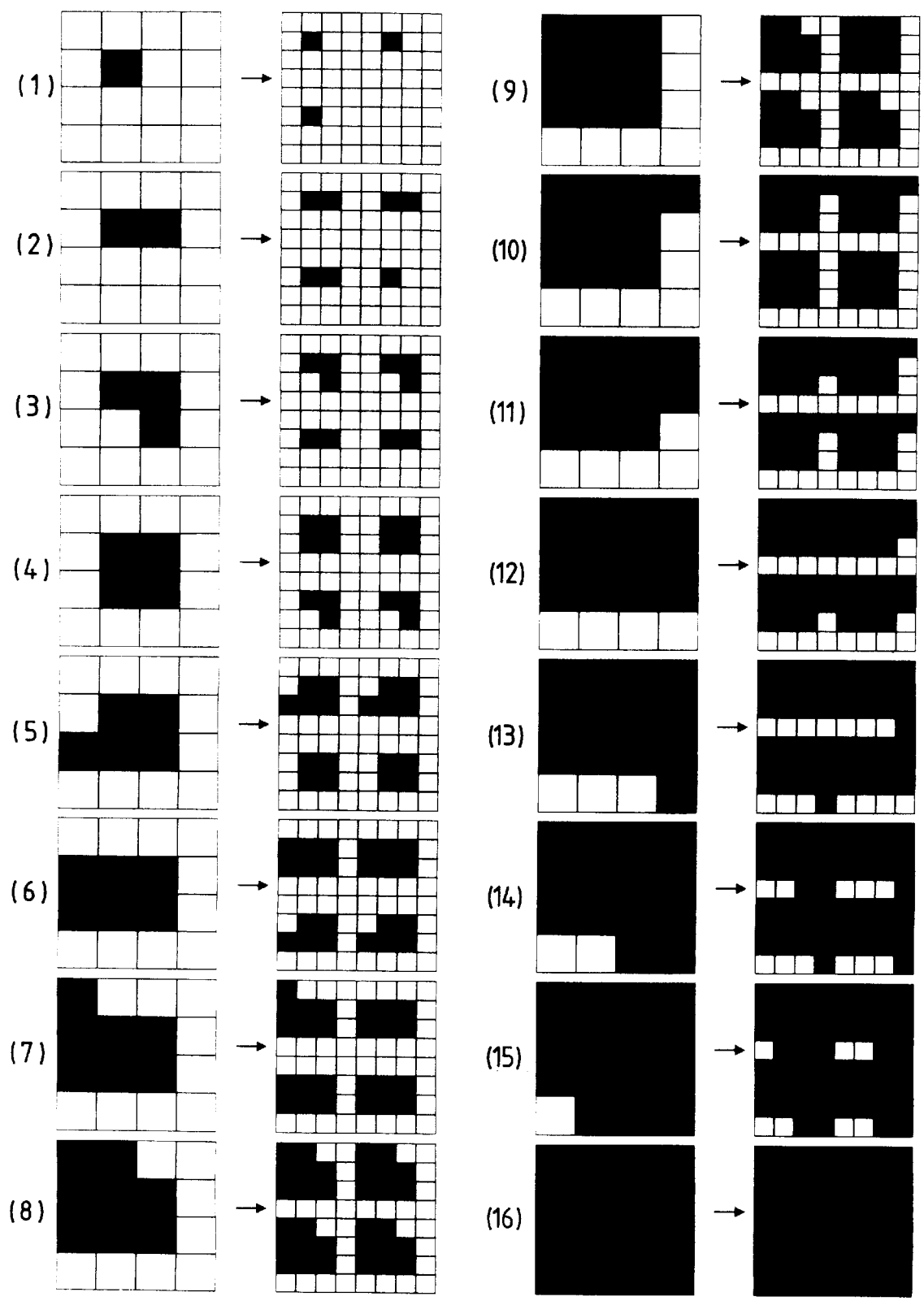

FIG. 65 shows an example of pattern conversion in which the shape of growth of finer dot cluster is varied, in comparison with the case shown in FIG. 64.

Figure 66:
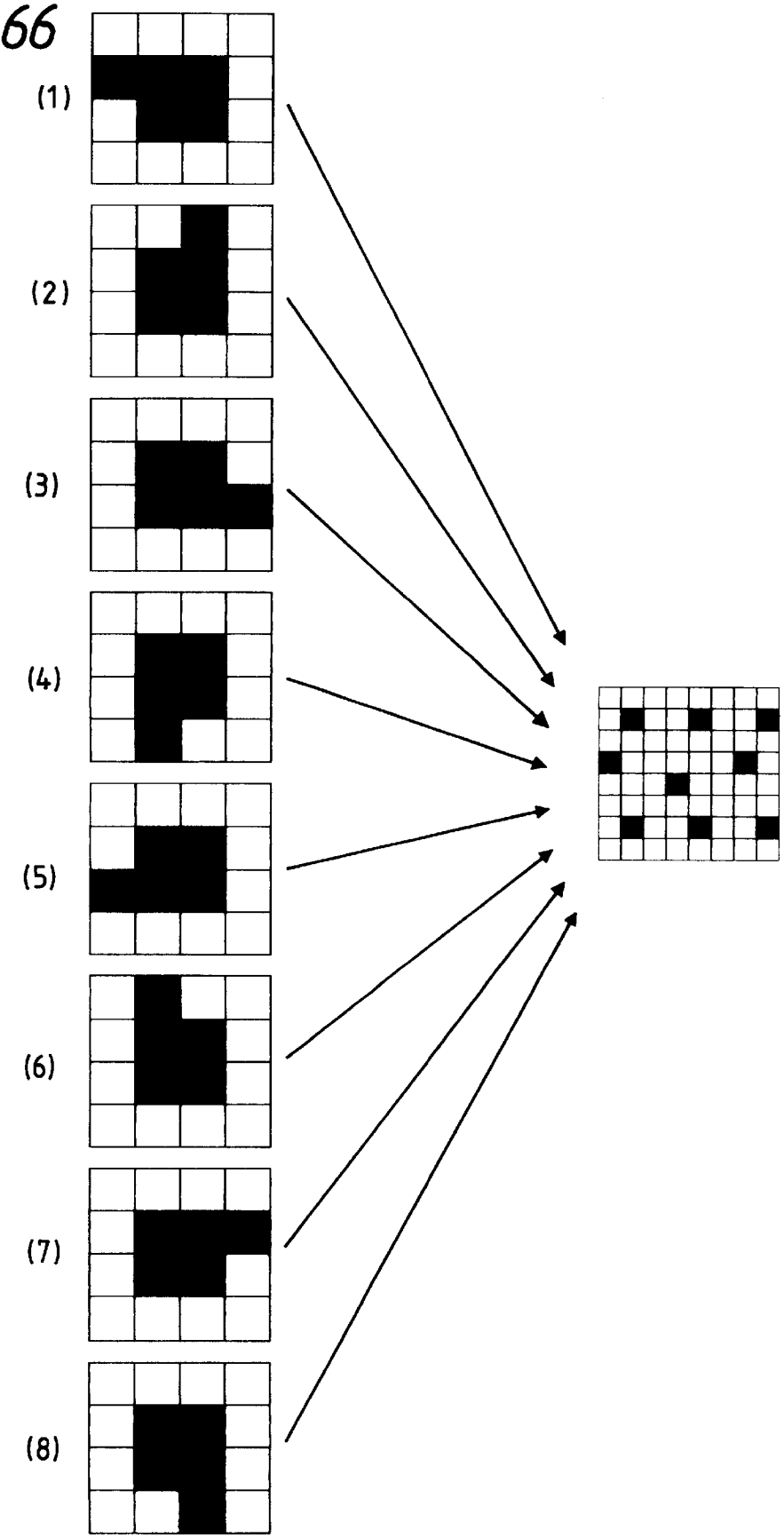

Also FIG. 66 shows that the patterns of a same color-printed area may be converted to a finer pattern. In FIG. 66, patterns (1) to (8) are all converted to a pattern at the right-hand side.

Figure 67:
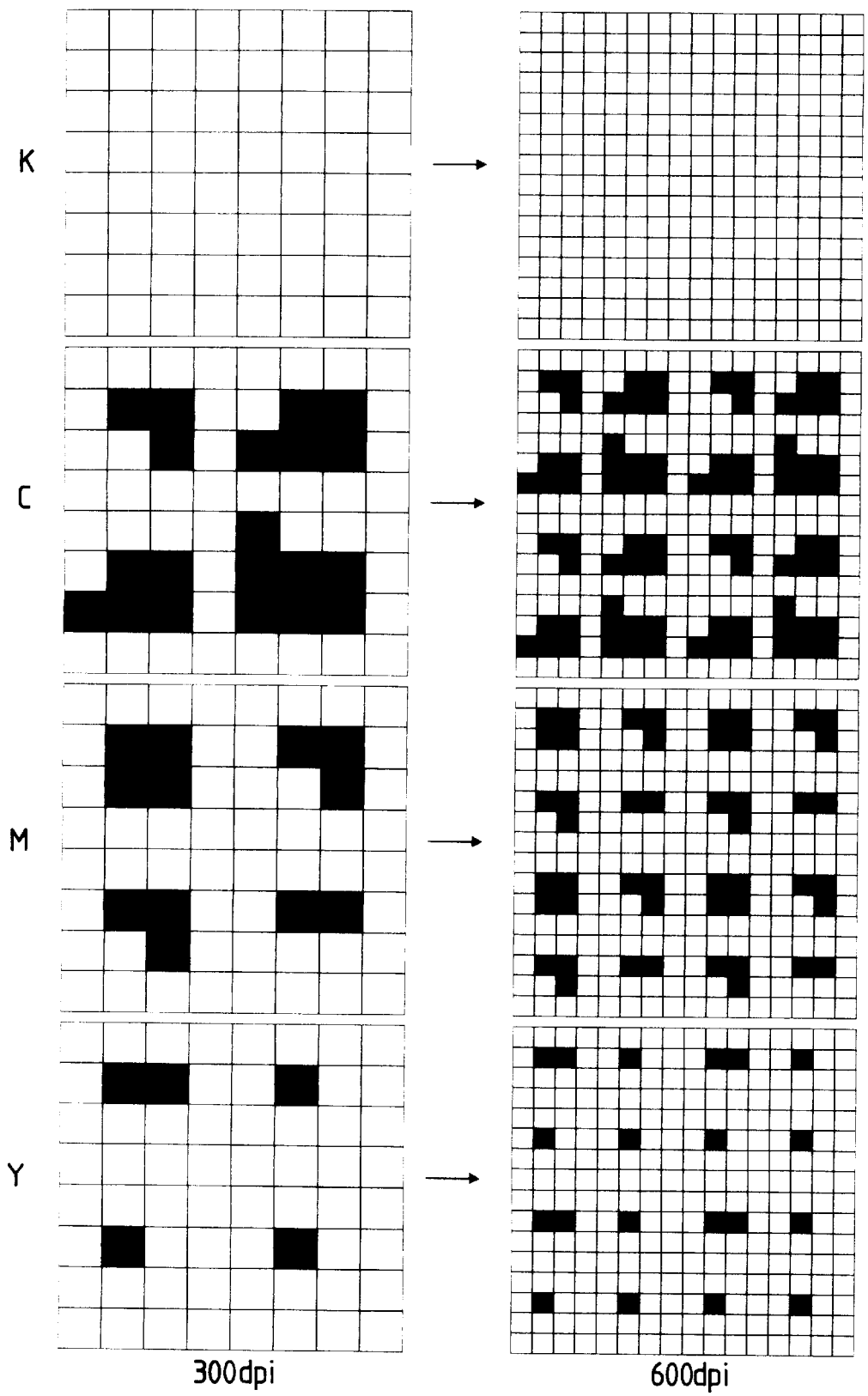
FIG. 67 is a view showing an example of conversion of the binary halftone color patterns for the four color image planes in the present embodiment.

FIG. 67 shows an example of pattern conversion, by the above-explained process, wherein the color image planes (Y, M, C, K) of a color dither image of 300 dot/inch are color image planes of 600 dpi. As will be apparent from FIG. 67, said conversions provide finer dot structures, thus improving the image quality.

The foregoing embodiment has explained a case, when image data of 300 dot/inch in the main and sub scanning directions are transmitted from the controller to the printer engine unit capable of achieving a print density of 600 dot/inch in the sub scanning direction, of achieving an equivalent print density of 1200 dot/inch in the main scanning direction and 600 dot/inch in the sub scanning direction. However the equivalent print density in the main scanning direction need not necessarily be 4 times of the print density in the sub scanning direction, but it can also be 2, 3, 5, 6, 7, 8, . . . times.

For example, in case of conversion to 8 times (2400 dot/inch) in the main scanning direction, the pattern generating unit shown in FIGS. 22 to 24 is so constructed that 1 pixel is composed of 8-bit signals (x1–x8, y1–y8) instead of 4-bit signals (x1–x4, y1–y4). In this manner there can be obtained print densities of 2400 and 600 dot/inch respectively in the main and sub scanning directions.

The present embodiment can select following four modes:
 mode 1: smoothing off and gradation smoothing off;
 mode 2: smoothing off and gradation smoothing on;
 mode 3: smoothing on and gradation smoothing off;
 mode 4: smoothing on and gradation smoothing on.
by rendering independently operable the logic circuit for smoothing the contour of characters or patterns and the logic circuit for increasing the density of a binary halftone image, such as a dither image, thereby achieving gradation smoothing (by independently enabling or disabling said two logic circuits by an instruction from an external controller or by a communication command).

In this manner a print desired by the user can be obtained. Also such smoothing and gradation smoothing cannot be executed in such a manner that disadvantages are not generated in any images. Thus, if such disadvantage occurs in a certain image, the smoothing process or the gradation smoothing process may be turned off to avoid such disadvantage, even though higher image quality cannot be attained.

Also said disadvantage at the processing can be avoided by separately sending an identification signal indicating whether the image is a character, a pattern or a dither image, at the transmission of the image data from the external controller, and, according to said identification signal, selecting said mode 3 for each pixel (or for each predetermined area) if the image data represent a character or a pattern, or said mode 2 for each pixel (or each predetermined area) if the image data represent a dither image.

In the foregoing embodiment there has been explained a case of converting the data of 300 dot/inch, by an increase by an integral multiple, into pixel density of 600 dot/inch, but the present invention is naturally capable of converting an arbitrary pixel density N into another arbitrary density M, such as the conversion of data of 400 dot/inch into a pixel density of 600 dot/inch.

In particular, the gradation smoothing of the present embodiment, based on a concept of at first obtaining the density data represented by the reference pixel data and then converting the data to another binary halftone representation corresponding to said density data, is capable not only of improving the image quality by converting a dither image of an arbitrary dot density into another dither image of another arbitrary dot density, but also improving the image quality of binary images obtained by other binary halftone representations such as the density pattern method or the error diffusion method.

[3rd embodiment]

Figure 68:
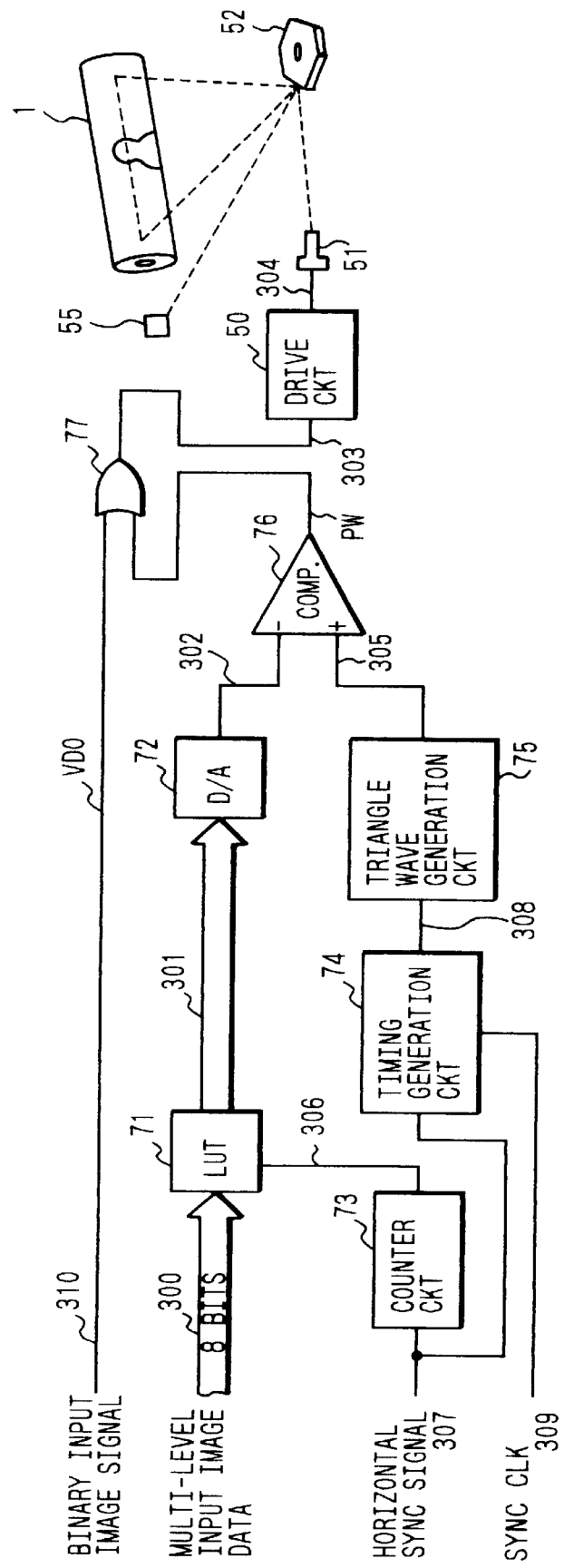
FIG. 68 is a block diagram of a 3rd embodiment of the present invention.

FIG. 68 illustrates a 3rd embodiment of the present invention, which is capable, in addition to the color image recording methods explained in the foregoing, of recording a color image of a higher resolving power and of improved tonal gradation.

In said 3rd embodiment, there are entered a binary recording signal explained above and a multi-value gradation signal for example of 8 bits, and the laser is driven by logic synthesis or switching of multi-width modulated signals in which each dot is modulated by pulses corresponding to smaller dots, according to said input signals, whereby a binary input image signal and a multi-value input image signals can both be accepted.

Now referring to FIG. 68 illustrating the 3rd embodiment, there are provided a look-up table (LUT) 71 for effecting data conversion for an appropriate density correction, in response to 8-bit input image data 300; a D/A converter 2 for converting the corrected digital image data 301 into an analog signal 302; and a timing signal generator circuit 4 for generating a timing signal 308 synchronized with a horizontal synchronization signal 307 and with a clock signal 309 based on the BD signal detected by the BD detector 55.

There are also provided a triangular wave generator 75 for generating a triangular wave 305 according to the timing signal 308; a comparator 76 for generating a pulse width modulated (PWM) signal by comparing the analog image signal 302 and the triangular wave 305; and a driving circuit 50 for pulsed drive of the semiconductor laser 51 according to said PWM signal.

The laser beam, subjected to pulse width modulation by the comparator 76 is put into a scanning motion by the polygon mirror 52, thereby forming a latent image on the photosensitive drum 1.

Figure 69:
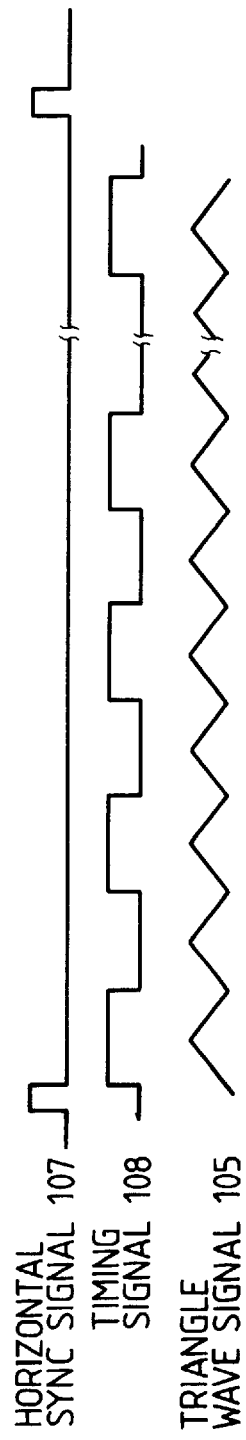
FIGS. 69 and 70 are timing charts of the circuit shown in FIG. 68.
Figure 70:
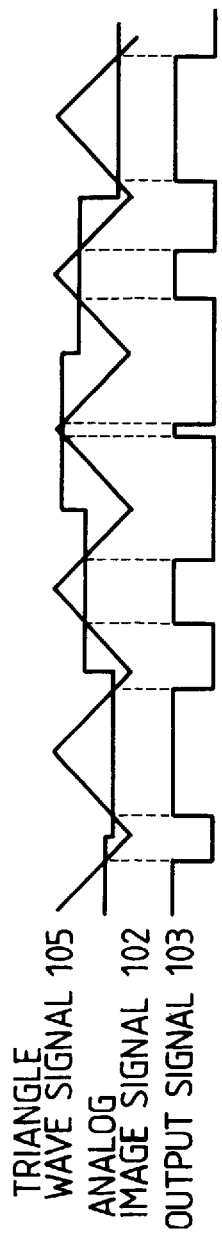

FIGS. 69 and 70 are timing charts showing the function of the 3rd embodiment of the above-explained configuration. Between the horizontal synchronization signals 307, there are generated timing signals 308 of a predetermined number, and the triangular signal 305 is generated in synchronization therewith. The comparator 76 generates an output signal 303 which assumes the logic level "1" when the triangular signal 305 exceeds the analog image signal 302. In this manner generated is a PWM signal of a pulse duration corresponding to the level of said analog image signal 302.

An OR gate 77 prepares the logic sum of the binary input image signal 310 and the PWM output signal of the comparator 76, derived from the multi-value input image data 300.

The controller transmits only the multi-value input image data (for example of 8 bits) in an area of multi-value recording, for example for a photographic image, and only the binary input image signal in an area for recording a character, a pattern or a binary halftone image such as a dither image. Said binary input image signal is recorded, with an improvement of image quality by the contour smoothing circuit or the dither gradation smoothing circuit explained before.

In this manner it is rendered possible to reproduce a binary image and a pulse-width modulated multi-value image in a mixed manner within a same page or in different pages, to record a photographic image with high image quality improved in the resolving power and in the gradation, and to improve the image quality of a binary halftone image such as a dither image, by smoothing the contour of characters and patterns and smoothing the gradation by dot configuration though the gradation does not reach the level of said multi-value input image.

In the foregoing embodiment, the pulse width modulated signal is obtained by utilizing a triangular wave, but the effect of this embodiment can naturally be exhibited by employing digital pulse width modulating methods disclosed, for example, in the Japanese Patent Application Nos. 62-236204 and 2-145366.

Also the foregoing embodiment has been limited to an application to an electrophotographic printer employing a laser beam, but the effect of the present invention can naturally be exhibited in the electrophotographic printers utilizing an LED head or a liquid crystal head.

Also the foregoing embodiment has been limited to an application to a color laser beam printer employing the electrophotographic process, but the present invention is by no means limited to such embodiment and is naturally applicable also to a color ink jet printer employing inks corresponding to four color image planes of Y, M, C and K and obtaining a color image by superposing said inks discharged from nozzles, or a color printer employing a thermal transfer process.

As explained in the foregoing, this embodiment is to complement the conventional technology, by extracting the feature of a dot pattern in a wide peripheral area around the object pixel and modifying the object pixel according to thus extracted feature in a color laser beam printer, and provides a technology enabling to detect a nearly horizontal or vertical contour with a simplified logic circuit and to achieve optimum smoothing according to the radius of curvature of the contour. It also avoids erroneous smoothing for a dither image and also avoids the smoothing on a concentrated image portion, thereby preventing detrimental influence of smoothing on the image.

It is also capable of improving the image quality of a binary halftone image, such as a dither image, by detecting the pattern of such image and converting each dot into a dot pattern composed of finer dots.

It is particularly effective for a color image in improving the image quality, by effecting the contour smoothing for the characters and patterns and combining the conversion to finer dots for the binary halftone image such as a dither image.

[4th embodiment]

Figure 71:
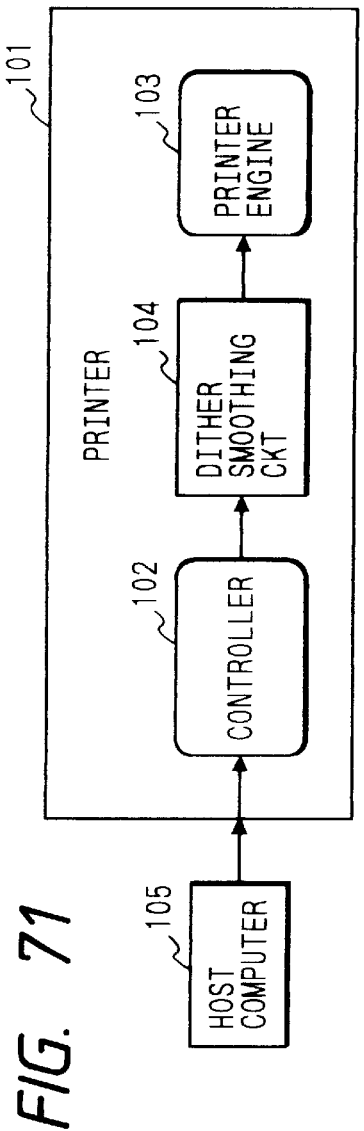
FIG. 71 is a view showing the entire configuration of a 4th embodiment of the present invention.

FIG. 71 is a view best representing the feature of the 4th embodiment of the present invention, wherein provided are a color printer 101; a controller 102; a printer engine unit 103; a dither smoothing circuit 104; and a host computer 105.

The 4th embodiment of the configuration mentioned above functions in the following manner. In response to a writing command from the host computer 105, the controller 102 develops a raster image in an unrepresented internal memory. Said raster image, when completed, is transmitted to the printer engine through the dither smoothing circuit 104.

The image data developed by the controller 102 represent a color image of 300 dot/inch, and the printer engine unit 103 receives a rasterized color image of 600 dot/inch. Said color image is reproduced, in the color printer, by three primary colors (yellow, magenta and cyan). In addition, a black image is received in order to reproduce the black color clearly. Each of these colors is composed of a binary image of 600 dot/inch.

In this manner the controller 102 releases the color image of 300 dot/inch, and the printer engine unit 103 receives the color image of 600 dot/inch. For this purpose the color image of 300 dot/inch has to be converted into that of 600 dot/inch, and this conversion is executed in the dither smoothing circuit 104.

In the following there will be explained, with reference to FIGS. 72 and 73, the procedure of transmitting the raster image, developed in the controller 102, to the dither smoothing circuit.

Figure 72:
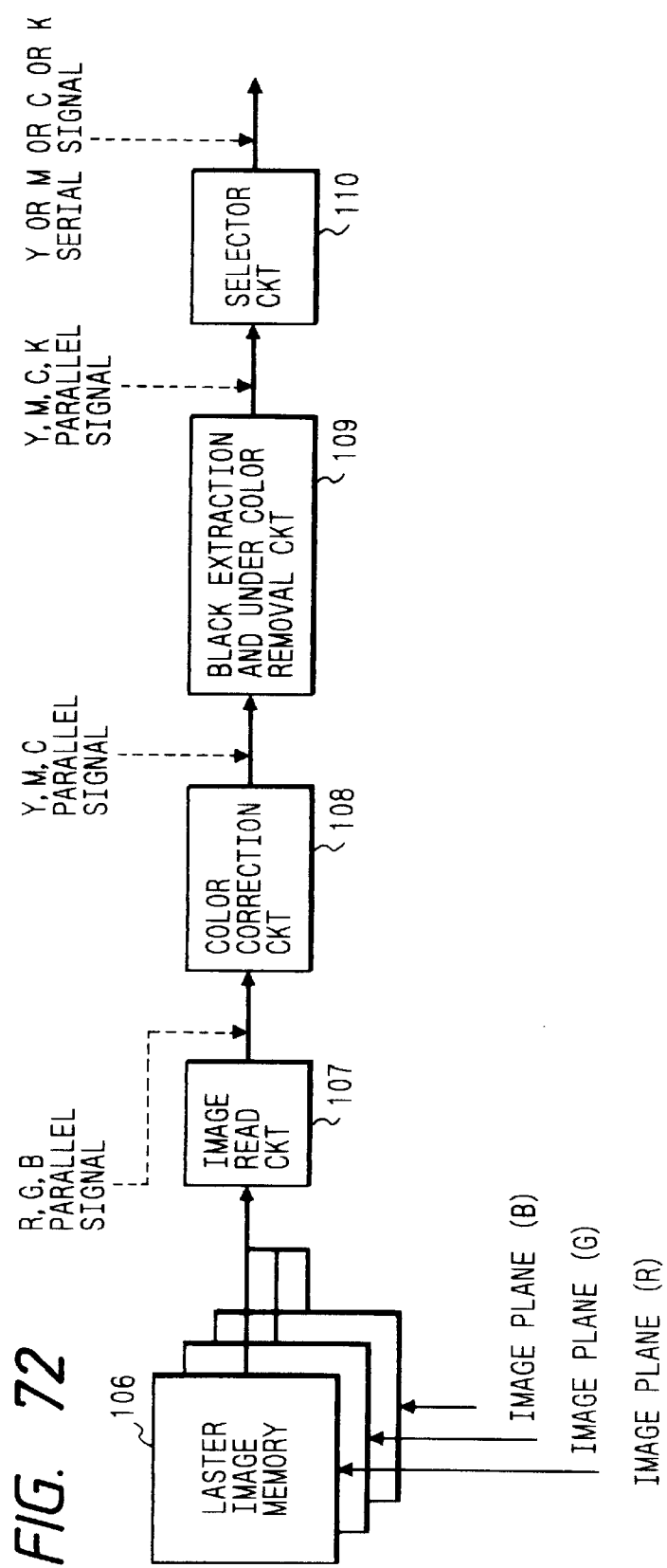
FIG. 72 is a view showing the configuration of a controller shown in FIG. 71.

In FIG. 72 there are shown a raster image memory 106 for storing the raster image developed by the controller 102; an image read-out circuit 107 for reading the color image, stored in the raster image memory 107, in a required order; a color correction circuit 108 for conversion from the RGB color system to the YMC color system; a black extraction/undercolor removal circuit 109 for extracting the black components from the YMC color system thereby generating the black color image plane and eliminating the components converted into the black color from the components of yellow, magenta and cyan colors; and a selector circuit 110 for selecting the image signal of a color, from yellow, magenta, cyan and black colors.

In the following there will be explained the function of the 4th embodiment of the above-explained configuration.

According to a command from the host computer 105, the controller 102 develops a color image as a raster image in the raster image memory 106. The developed color image is represented by the RGB color system, wherein a red image, a green image and a blue image are developed, respectively in R, G and B image planes, in the form of data of 300 dot/inch.

The image reading circuit 107, controlled by an unrepresented control circuit, reads the color image stored in the raster image memory 106, by a pixel at a time from each color image plane, thereby generating a parallel signal of red, green and blue.

Figure 73:
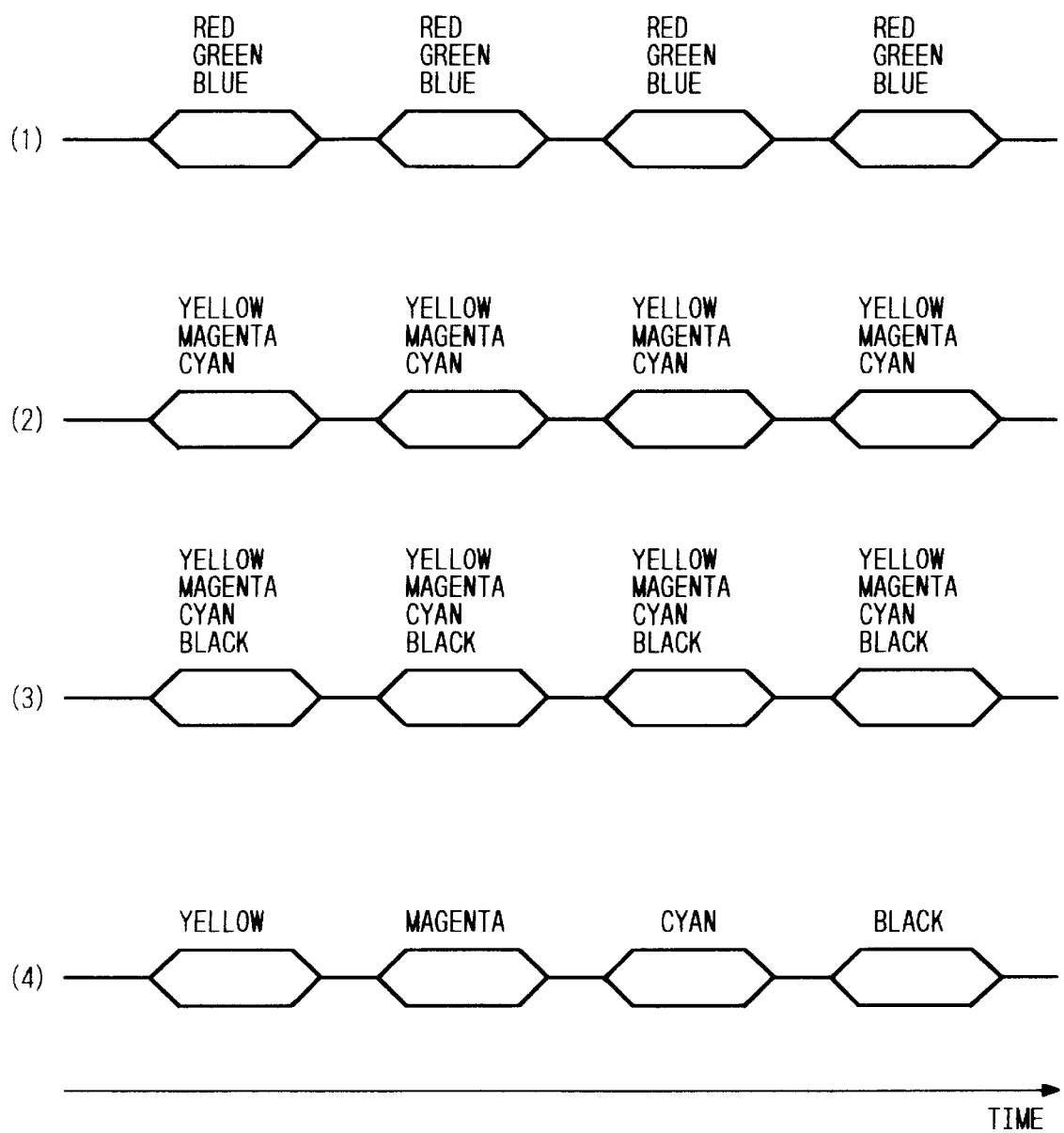
FIG. 73 is a timing chart showing the signal processing in the 4th embodiment.

FIG. 73(1) shows the R, G, B parallel signal prepared by the reading circuit 107. There are shown readings of four times of the red, green and blue images. Same data are read four times, for a color image.

Said R, G, B parallel signal is then converted, by the color correction circuit 108, into a Y, M, C parallel signal, which is shown in (2) in FIG. 73. Since the reading circuit 107 reads the same image four times, the Y, M, C parallel signal is also released four times.

Also the black extraction/undercolor removal circuit 109 prepares a Y, M, C, K parallel signal from the Y, M, C parallel signal. In a color laser beam printer, the black color can in principle be reproduced from the yellow, magenta and cyan toners, but the black toner is preferably used because the print quality is unfavorable.

Thus a black raster image is prepared by extracting the black component from the Y, M, C parallel signal. It is also necessary to subtract, from the yellow, magenta and cyan components, the components used for preparing the black component. In FIG. 73, (3) shows the Y, M, C, K parallel signal prepared by said circuit 109 from the Y, M, C parallel signal. Since the reading circuit 107 reads the same image four times, the Y, M, C, K parallel signal is also released four times.

Finally, the selector circuit 104, controlled by an unrepresented control circuit, selects one color from the Y, M, C, K parallel signal. From the Y, M, C, K parallel signal supplied to the selector circuit four times, the selector circuit 110 selects the yellow, magenta, cyan and black colors in succession in this order.

The signal released from the selector circuit 110 is shown in (4) in FIG. 73. The image data of yellow, magenta, cyan and black colors are released in succession.

Figure 5:
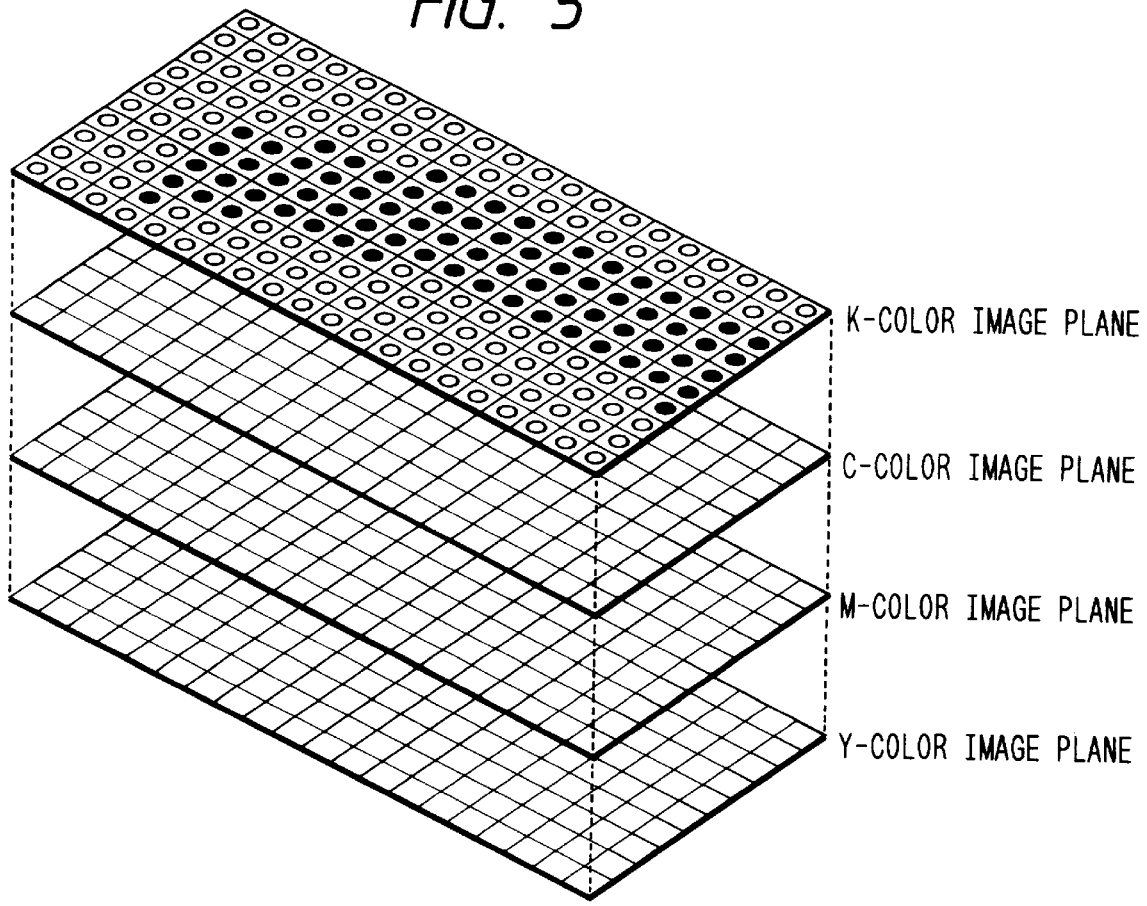
FIG. 5 is a view showing the concept of color image planes of the present embodiment.
Figure 6:
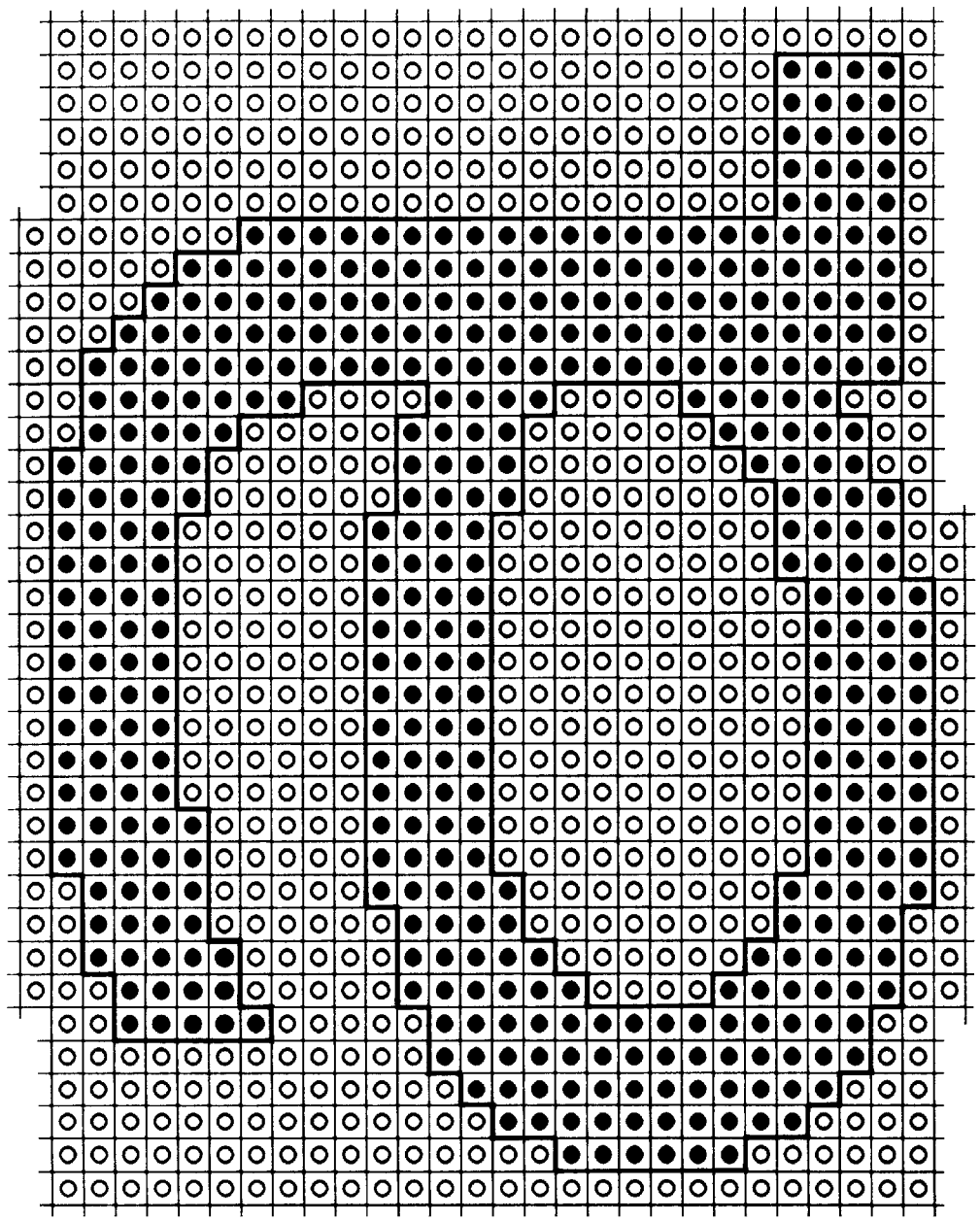
FIG. 6 is a view showing an example of the pattern represented by dot data.

The image data from the selector circuit 110 are supplied to the dither smoothing circuit 104 shown in FIG. 71. More specifically, as shown in FIG. 5, the dither smoothing circuit 104 is provided with line memories 111, a window memory 112 and a dither smoothing circuit.

Figure 74:
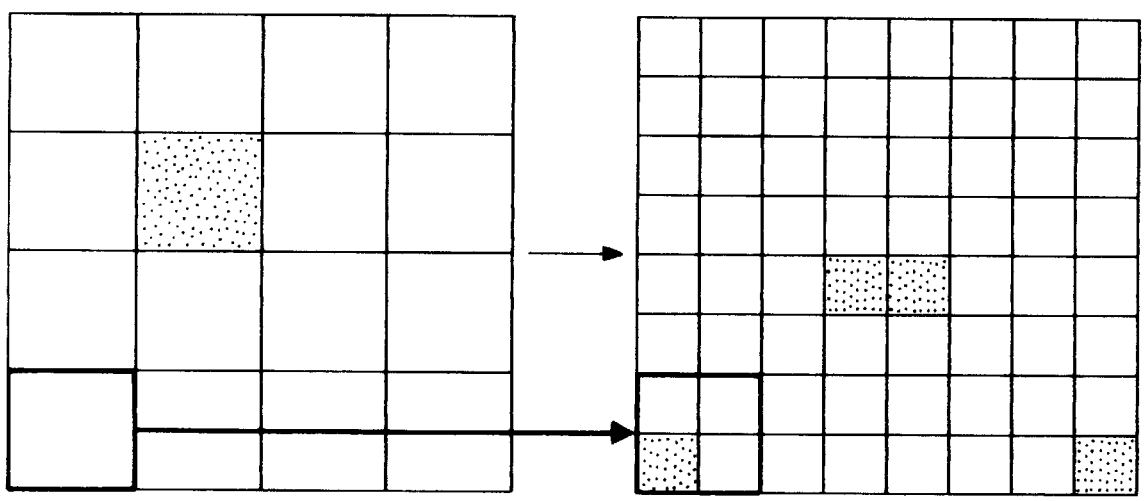
FIG. 74 is a schematic view of a window in the 4th embodiment.
Figure 78A:
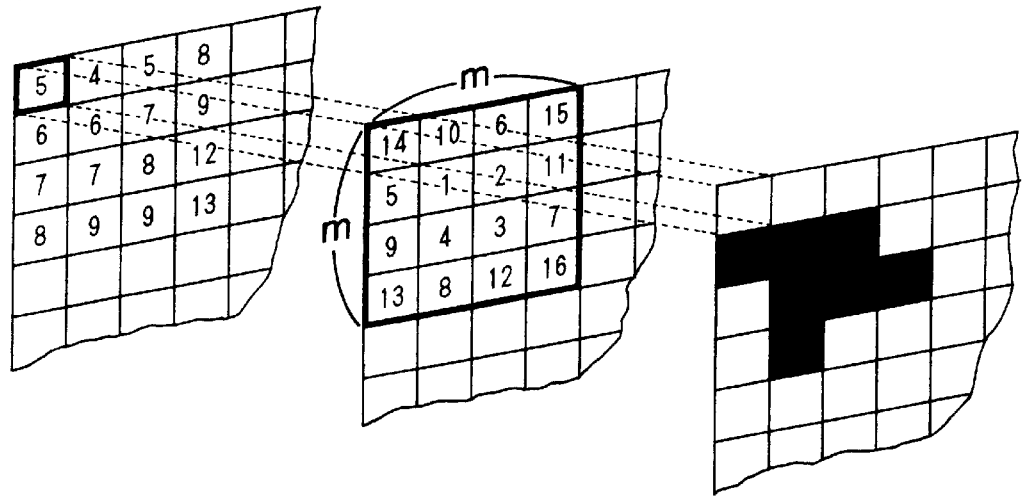
FIGS. 78A to 78C are views for explaining the dither method and the density pattern method.
Figure 78B:
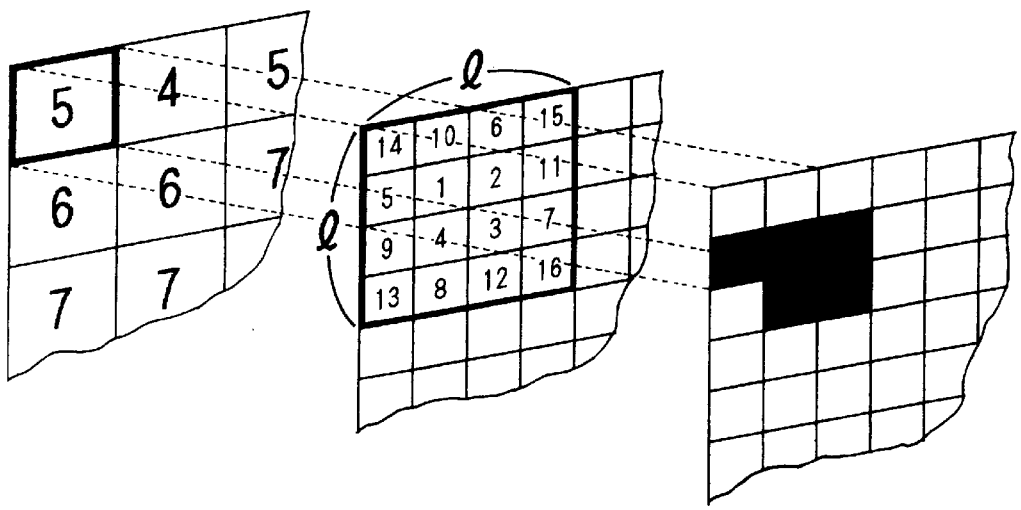
Figure 78C:
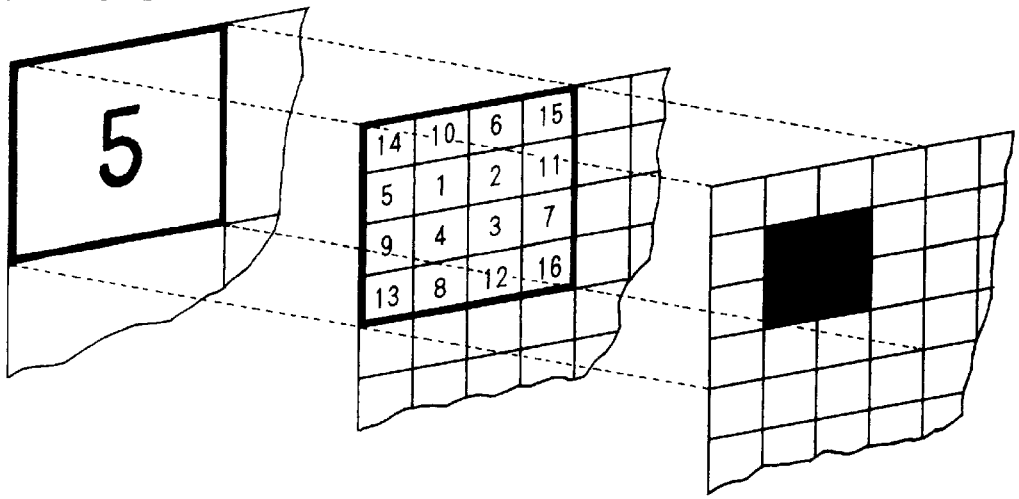

FIG. 74 shows an example of configuration of said window memory 112, capable of storing binary image data of 11 pixels and 9 pixels respectively in the main and sub scanning directions. The smoothing of a dither image is executed by the binary image data stored in said window memory 112. A pixel marked with "○" stores binary image data to be currently printed.

Also in this 4th embodiment, the processing circuit for dither smoothing, provided in the printer engine unit with a resolving power of 600 dot/inch is similar to that shown in FIG. 21. However, in case of the configuration shown in FIG. 21, the processing circuit 43 provides a first MDT signal (x1, x2, x3, x4) and a second MDT signal (y1, y2, y3, y4), and the parallel-to-serial conversion circuit 44 converts the input signals to corresponding serial signals.

On the other hand, in the 4th embodiment, the processing circuit 43 provides a first MDT signal (x1, x2) and a second MDT signal (y1, y2), and the conversion circuit 44 converts these input signals into serial signals.

More specifically, in the 4th embodiment, the parallel signal is composed of 2 bits as explained above, and the first MDT signal (x1, x2) and the second MDT signal (y1, y2) are alternately released in synchronization with the synchronization signal BD'. The clock generation circuit 45 receives the main scanning synchronization signal ED' and generates a clock signal VCK synchronized therewith. Said clock signal VCK has a frequency equal to twice of the clock frequency $f_0$ required for recording of 600 dot/inch in the main scanning direction.

Said serial signal VDOM (x1, x2 or y1, y2) is released in succession, in synchronization with said clock signal VCK. The frequency dividing circuit 46 divides the frequency of the received clock signal VCK into ½, thus generating a clock signal VCKN of a frequency $f_0$, which is used as the clock signal in fetching the dot data from said dot matrix memory to the processing circuit 43.

FIG. 75 explains a dither smoothing algorithm in the 4th embodiment, illustrating an example of dither patterns extracted by the dither smoothing circuit and results of smoothing on thus extracted patterns. In this example the dither pattern to be subjected to smoothing is prepared by an 8×8 dither matrix, which is composed of 4×4 concentrated sub matrixes.

In FIG. 75, matrixes represented by numerals 1 to 16 are 4×4 sub dither matrixes to be extracted, and an 8×8 matrix shown at the right side of each sub dither matrix indicates the result of smoothing conversion on said extracted 4×4 sub dither matrix. Thus, when a 4×4 matrix pattern is detected, it is replaced by an 8×8 matrix pattern shown at the right.

Now the smoothing conversion in the 4th embodiment will be explained in more details, with reference to FIGS. 76 and 77.

Let us consider a case of smoothing conversion from a 4×4 pattern at the left-hand side in FIG. 76 to an 8×8 matrix pattern at the right-hand side. In order to extract the pattern at the lower left portion in said 4×4 pattern with a window of 11×9 dots, there is seeked for a pattern matching FIG. 77, and, in case of matching, the pattern at the right-hand side in FIG. 76 is released.

In case a pixel in the extracted pattern and 2×2 pixels converted therefrom are all white or black, the number of gates can be reduced by effecting the extraction and conversion by a simple doubling circuit.

Figure 80:
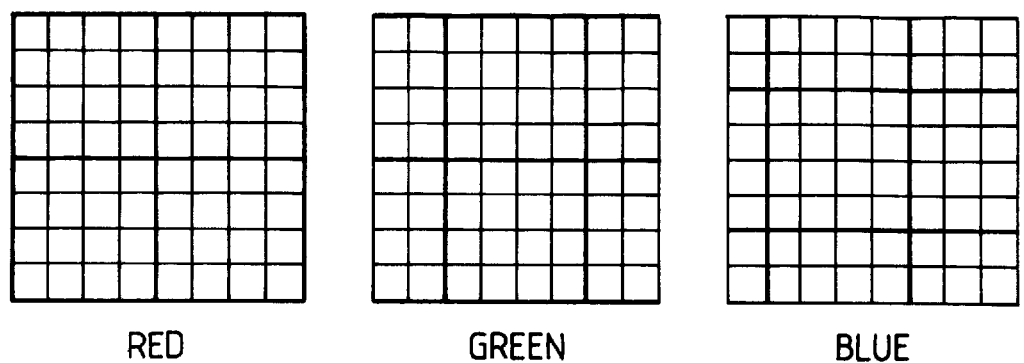
FIG. 80 is a view showing an example of shift of sub matrix for different colors in the 4th embodiment.
Figure 81:
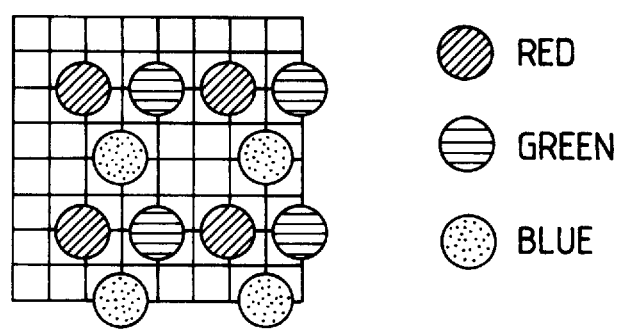
FIG. 81 is a view showing a developed example in case of shift of sub matrix for different colors in the 4th embodiment.

FIG. 79 shows an example of threshold matrix, and FIGS. 80 and 81 show the method of application of said threshold matrix to a color image.

The threshold matrix shown in FIG. 79 is a 4×4 sub matrix, while the actual threshold matrix has a size of 8×8 pixels. Said threshold matrix is a concentrated dither matrix, in which the dot cluster grows from the central portion of the matrix.

In converting a multi-value image into a dither image by the host computer or by the controller, the position of said 4×4 threshold sub matrix may be displaced among the red, green and blue image components, as shown in FIG. 80.

Such displacement provides a result as shown in FIG. 81, which shows a grid pattern indicating the pixels of 300 dot/inch, and circles representing the centers of the concentrated dither patterns of R, G and B colors. A clearer printing is rendered possible by mutually displacing the centers of the dither patterns of different colors. Also in this case, if the threshold sub matrixes are same for different colors, the images of different colors transmitted from the controller can be entered, as the input signal, to the circuit shown in FIG. 21.

The dither patterns 1–16 (15 patterns in effect) shown in FIG. 75 do not necessarily match all the patterns appearing in the dither image. Consequently, if an extracted and converted dither pattern is positioned adjacent to an unextracted but simply doubled dither pattern in the output, there may result a mismatching of the dither patterns at the boundary. For example, in case of a concentrated dither pattern, there are generated periodical dots, and the image quality is deteriorated if said periodical pattern is aberrated in the dither image. Such mismatching between the smoothed portion and the simply doubled portion, by selecting a pattern for the smoothed image similar to the matching dither pattern.

This method is also compatible with the technology for smoothing the character contour, thereby capable of achieving further improvement of the image quality, though the details will be omitted.

[5th embodiment]

In the 4th embodiment explained above, the dither patterns after smoothing process are common for yellow, magenta, cyan and black colors. However the toner properties and the visual characteristics are different for these colors, so that the dither patterns after smoothing are preferably varied for integral improvement of the image quality.

Figure 82:
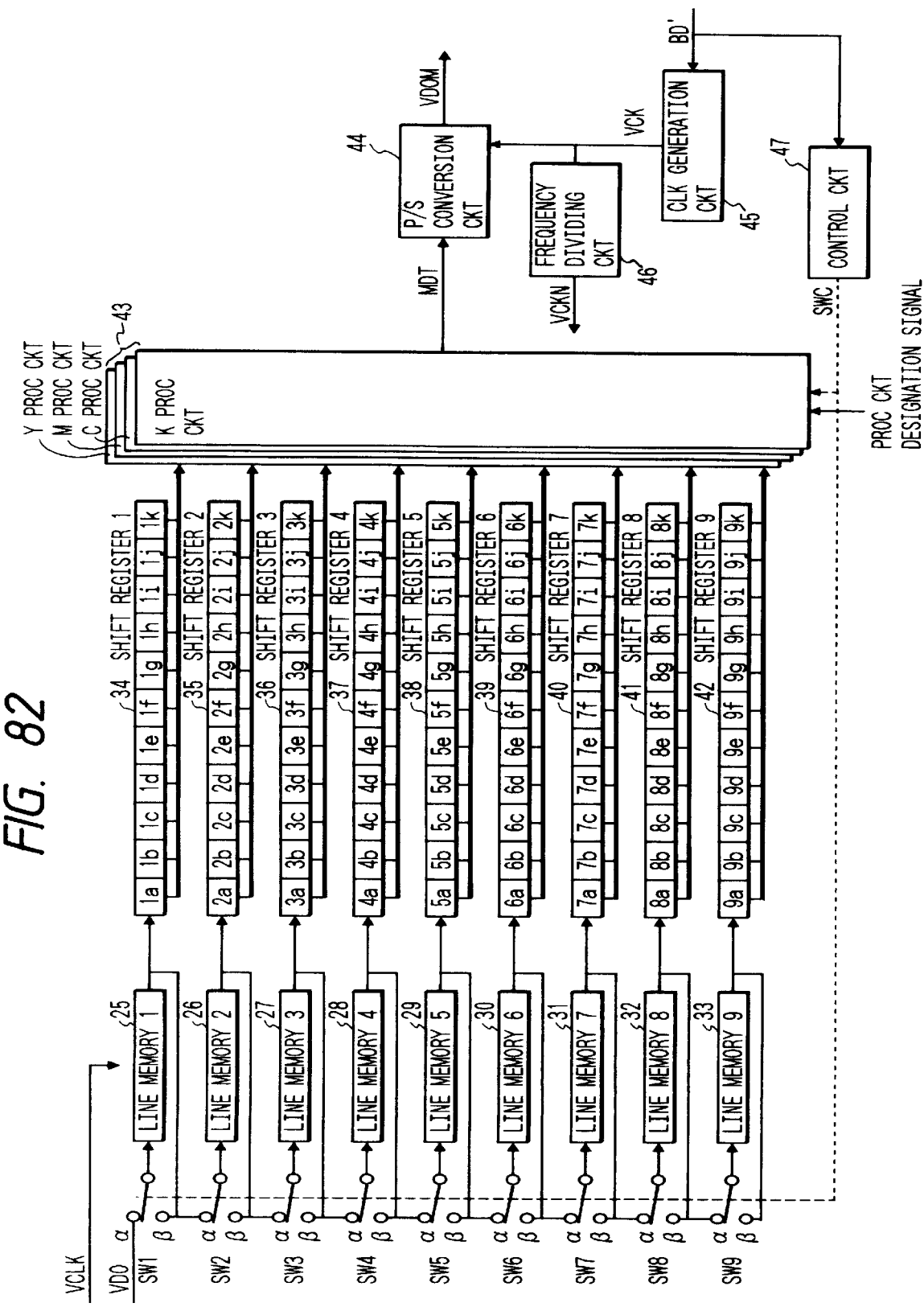
FIG. 82 is a diagram of a dither smoothing circuit in a 5th embodiment of the present invention.

FIG. 82 shows a circuit for dither smoothing, with variation of the dither patterns after the smoothing for each color.

In FIG. 82, the processing circuit can select the dither patterns after conversion, for each of Y, M, C and K colors. The processing circuit to be employed is selected by an unrepresented instruction signal.

This circuit structure can vary the dither pattern after smoothing conversion for each of the Y, M, C and K colors, or can increase or decrease the number of dots to be printed, thereby enhancing a less perceptible color or weakening an excessively strong color.

In the 4th and 5th embodiments, there have been explained methods for preparing, from a color dither image of 300 dot/inch, a dither image of 600 dot/inch by sub-division of dots in the main and sub scanning directions. These methods can be generalized, thereby preparing a color dither image by sub-division by M ($\geq 1$) in the vertical direction and by N ($\geq 1$) in the horizontal direction.

The present invention is applicable either to a system consisting of plural equipment, or to an apparatus consisting of an equipment.

Also the present invention is naturally applicable to a case in which it is achieved by the supply of a program to a system or an apparatus.

As explained in the foregoing, the present invention achieves smooth printing of the contour of a character or a pattern, and identifies a binary halftone image such as a dither image in the color image information signal and converts such image to another pattern composed of finer dots, thereby achieving an improvement in the image quality of such color halftone image, which has not been achieved in the prior art.

Also the present invention enables printing of a color dither image with high image quality, by extracting dither image information from a color image information signal and converting it to a sharper image in each color.

Furthermore, the image recording apparatus of the present invention can improve the image quality of a color dither image, by extracting a dither image area by extracting means capable of extracting a color dither image present in a color image, interpolating thus extracted color dither image and printing the image with a printer of a resolving power higher than that of the input image.

What is claimed is:

1. An information recording apparatus which performs a conversion process on a pixel based on whether the pixel comprises a part of one of plural predetermined images, the apparatus comprising:

color information signal generation means for generating plural color information signals which represent plural colors, the plural color information signals comprising pixels for plural color images;

temporary memory means for temporarily storing at least a part of the plural color information signals generated by said color information signal generation means;

selecting means for selecting a color information signal from among the plural color information signals stored in the temporary memory means;

detecting means for detecting whether the selected color information signal comprises a part of one of the plural predetermined images;

information conversion means for converting a pixel in the selected color information signal in a case where said detecting means detects that the selected color information signal comprises a part of one of the plural predetermined images; and output means for outputting the color information signal converted by said information conversion means and color information signals not converted by said information conversion means, wherein conversion performed by the information conversion means comprises smoothing a contour of the one of the plural predetermined images, and wherein the information conversion means does not perform conversion on the selected color information signal in a case that the selected color information signal does not comprise a part of one of the plural predetermined images.

2. An apparatus according to claim 1, further comprising recording means for recording a color image using the color information signals output by the output means, wherein said recording means comprises:

modulation means for modulating a light beam according to an output of said information conversion means;

scanning means for deflecting said light beam to scan a recording medium in order to form an electrostatic latent image on the recording medium; and developing means for converting said electrostatic latent image formed on the recording medium into a visible image.

3. An apparatus according to claim 1, further comprising recording means for recording a color image using the color information signals output by the output means, wherein said recording means comprises means for modulating ink discharge according to the plural color information signals generated by said color information signal generation means.

4. An apparatus according to claim 1, wherein the plural color information signals generated by said color information signal generation means include at least Y (yellow), M (Magenta) and C (cyan) color signals.

5. An apparatus according to claim 1, wherein said information conversion means performs converting on a binary halftone image.

6. An apparatus according to claim 5, further comprising:

first selection means for selecting whether to enable said information conversion means to perform smoothing processing for smoothing a contour of a character image; and second selection means for selecting whether to enable said information conversion means to perform converting on a binary halftone image.

7. An information recording apparatus comprising:

generation means for generating a color image information signal;

temporary memory means for temporarily storing the color image information signal generated by said generation means;

extraction means for extracting a color dither image information signal from the color image information signal stored in said temporary memory means; and modifying means for modifying the color dither image information signal extracted by said extraction means;

wherein the color dither image information signal extracted by the extraction means comprises a specific dither-processed image pattern; and wherein said modifying means increases a resolution of the specific dither-processed image pattern to generate a fine pattern.

8. An apparatus according to claim 7, wherein said modifying means modifies the color dither image information signal by varying algorithms for different colors.

9. An information recording apparatus which smooths contours of predetermined character images, the apparatus comprising:

color information signal generation means for generating plural color information signals corresponding to plural colors;

selection means for selecting a color information signal from said plural color information signals;

processing means for smoothing a contour of a character image in said plural color information signals using the color information signal selected by said selection means, wherein said processing means does not smooth other images in the plural color information signals which have not been selected by the selection means; and output means for outputting the color information signal which has been smoothed by said processing means and the color information signals which have not been smoothed by said processing means.

10. An apparatus according to claim 9, wherein the color information signals generated by said color information signal generation means include at least Y (yellow), M (magenta) and C (cyan) color signals.

11. An apparatus according to claim 9, further comprising dither processing means for extracting a dither image from the color information signal selected by said selection means, wherein said processing means performs the smoothing based on the dither image extracted by said dither processing means.

12. An information recording method which smooths contours of predetermined character images, the method comprising steps of:

entering plural color information signals for plural colors;

selecting a color information signal from the plural color information signals;

determining whether the selected color information signal forms part of a predetermined character image;

in a case that the selected color information signal forms part of the predetermined character image, smoothing a contour of the predetermined character image in the selected color information signal; and outputting the color information signal which has been smoothed in said smoothing step and others of the plural color information signals which have not been smoothed in said smoothing step.

13. A method according to claim 12, wherein said plural color information signals comprise Y (yellow), M (magenta), C (cyan) and K (black) color signals.

14. A method according to claim 12, wherein said selecting step selects the K (black) color signal.

* * * * *

UNITED STATES PATENT AND TRADEMARK OFFICE
CERTIFICATE OF CORRECTION

PATENT NO. : 5,828,396
DATED : October 27, 1998
INVENTOR(S) : KAORU SETO et al.

It is certified that error appears in the above-identified patent and that said Letters Patent is hereby corrected as shown below:

COLUMN 2

Line 2, "1x1" should read --$\ell \text{x} \ell$--.

COLUMN 5

Line 60, "36" should read --36A--.

COLUMN 6

Line 3, "43" should read --43A--.

COLUMN 15

Line 56, ""0" 1 as" should read --"0" as--.

COLUMN 16

Line 5, "FIG. 260." should read --FIG. 26C.--.

Line 9, "5e" should read --5f--.

Signed and Sealed this

First Day of June, 1999

Attest:

Q. TODD DICKINSON

*Attesting Officer*     *Acting Commissioner of Patents and Trademarks*